(12) United States Patent
Watanabe

(10) Patent No.: US 9,672,764 B2
(45) Date of Patent: Jun. 6, 2017

(54) LIQUID CRYSTAL DISPLAY DEVICE

(71) Applicant: FUJIFILM Corporation, Tokyo (JP)

(72) Inventor: Mikio Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 118 days.

(21) Appl. No.: 14/827,602

(22) Filed: Aug. 17, 2015

(65) Prior Publication Data

US 2015/0356905 A1    Dec. 10, 2015

Related U.S. Application Data

(63) Continuation of application No. PCT/JP2013/077771, filed on Oct. 11, 2013.

(30) Foreign Application Priority Data

Feb. 20, 2013  (JP) ................................. 2013-031055

(51) Int. Cl.
*G09G 3/20* (2006.01)
*G09G 3/36* (2006.01)
(Continued)

(52) U.S. Cl.
CPC ......... *G09G 3/2003* (2013.01); *G09G 3/3426* (2013.01); *G09G 3/36* (2013.01);
(Continued)

(58) Field of Classification Search
None
See application file for complete search history.

(56) References Cited

U.S. PATENT DOCUMENTS 7,009,627 B2 * 3/2006 Abe .................... G09G 3/22
345/690
2006/0256257 A1  11/2006 Nakano et al.
(Continued)

FOREIGN PATENT DOCUMENTS

CN    102930831 A    2/2013
JP    2002-99250 A    4/2002
(Continued)

OTHER PUBLICATIONS

International Preliminary Report on Patentability (PCT/IPEA/409), issued in PCT/JP2013/077771, dated Mar. 18, 2015.
(Continued)

*Primary Examiner* — Kenneth B Lee, Jr.
(74) *Attorney, Agent, or Firm* — Birch, Stewart, Kolasch & Birch, LLP

(57) ABSTRACT

A liquid crystal display device where the luminance control unit determines a coefficient KU, where KU<1, as the coefficient and repeatedly multiplies each of the luminance set values by the coefficient KU until the first integrated value is within the range of the first threshold value in a case where the first integrated value is larger than the range of the first threshold value, and the luminance control unit determines a coefficient KL, where KL>1, as the coefficient and repeatedly multiplies each of the luminance set values by the coefficient KL until the first integrated value is within the range of the first threshold value in a case where the first integrated value is smaller than the range of the first threshold value.

13 Claims, 44 Drawing Sheets

(51) Int. Cl.
  *G09G 3/34* (2006.01)
  *G09G 5/00* (2006.01)
  *G02F 1/1335* (2006.01)

(52) U.S. Cl.
  CPC ........... *G09G 3/3648* (2013.01); *G09G 5/003* (2013.01); *G02F 2001/133601* (2013.01); *G09G 2300/023* (2013.01); *G09G 2320/062* (2013.01); *G09G 2320/0626* (2013.01); *G09G 2320/0646* (2013.01); *G09G 2360/16* (2013.01)

(56) References Cited

U.S. PATENT DOCUMENTS

| | | | |
|---|---|---|---|
| 2009/0267890 A1 | 10/2009 | Park et al. | |
| 2011/0316829 A1* | 12/2011 | Oka | G09G 3/3426 345/207 |
| 2012/0038694 A1* | 2/2012 | Nakanishi | G09G 3/3426 345/694 |
| 2012/0044224 A1* | 2/2012 | Michisaka | G09G 3/3426 345/207 |

FOREIGN PATENT DOCUMENTS

| | | |
|---|---|---|
| JP | 2007-264659 A | 10/2007 |
| JP | 2008-287175 A | 11/2008 |
| JP | 2009-251331 A | 10/2009 |
| JP | 2009-265671 A | 11/2009 |
| JP | 2011-150127 A | 8/2011 |
| JP | 2011-158499 A | 8/2011 |
| JP | 2012-8388 A | 1/2012 |
| JP | 2012-137509 A | 7/2012 |
| JP | 2012-220717 A | 11/2012 |

OTHER PUBLICATIONS

International Search Report, issued in PCT/JP2013/077771, dated Dec. 10, 2013.

Written Opinion of the International Searching Authority, issued in PCT/JP2013/077771, dated Dec. 10, 2013.

Chinese Office Action and Search Report, dated Jan. 23, 2017, for corresponding Chinese Application No. 201380073401.3 with an English translation of the Office Action.

* cited by examiner

FIG.10
(A)
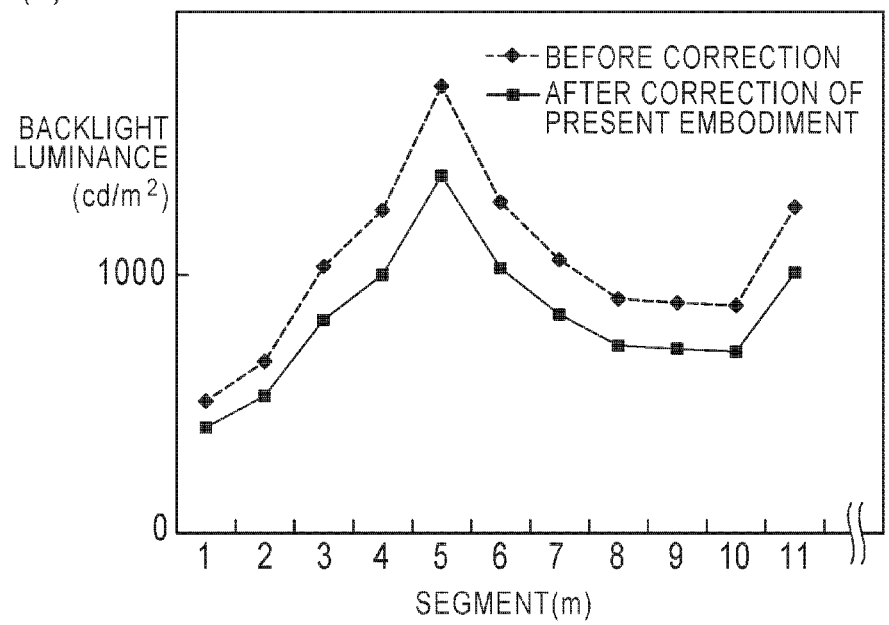
(B)
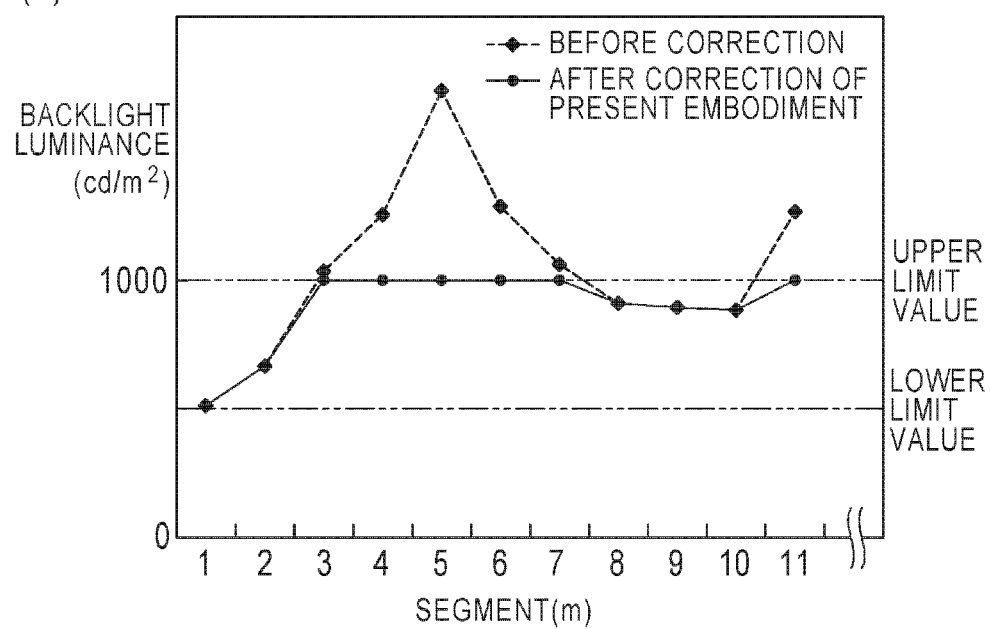

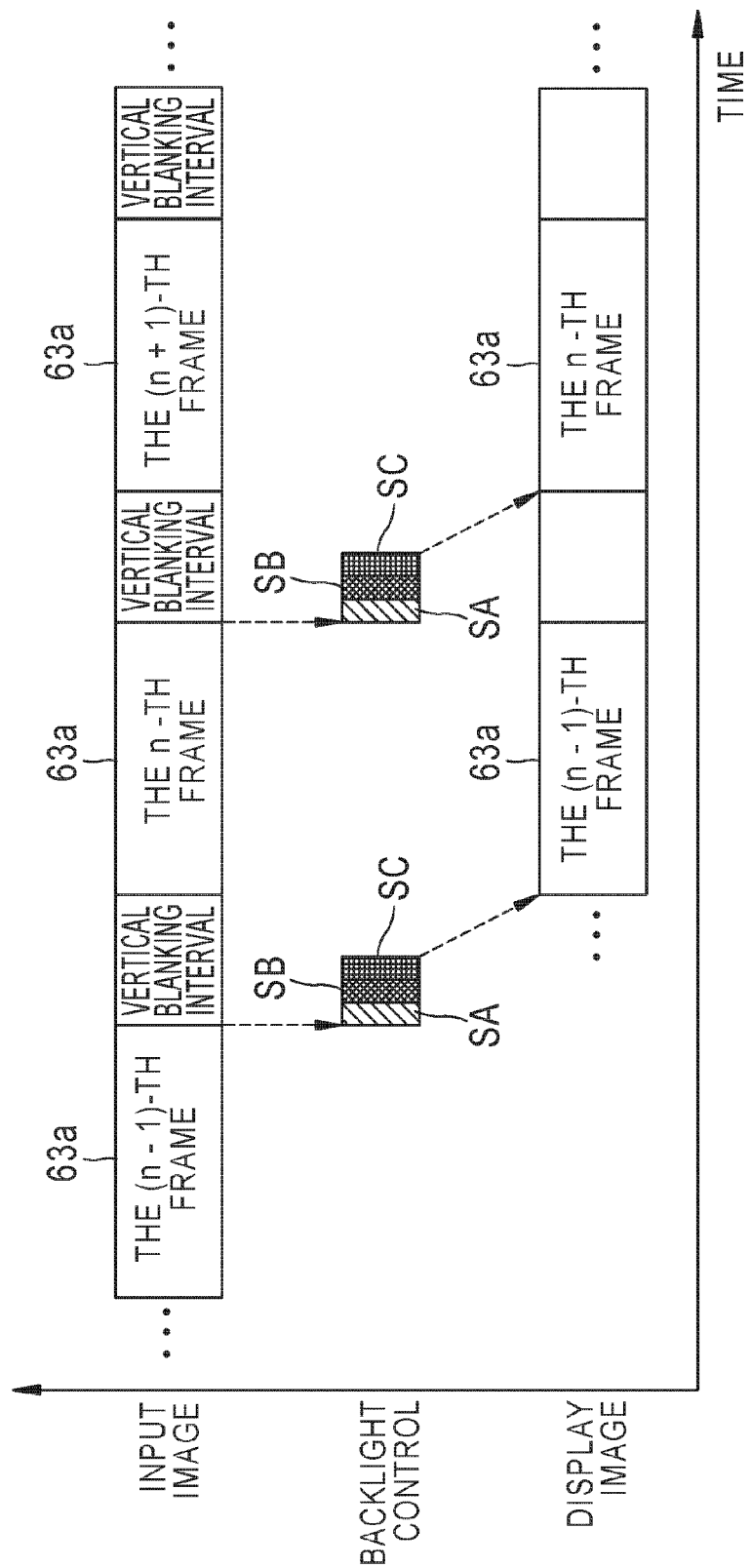

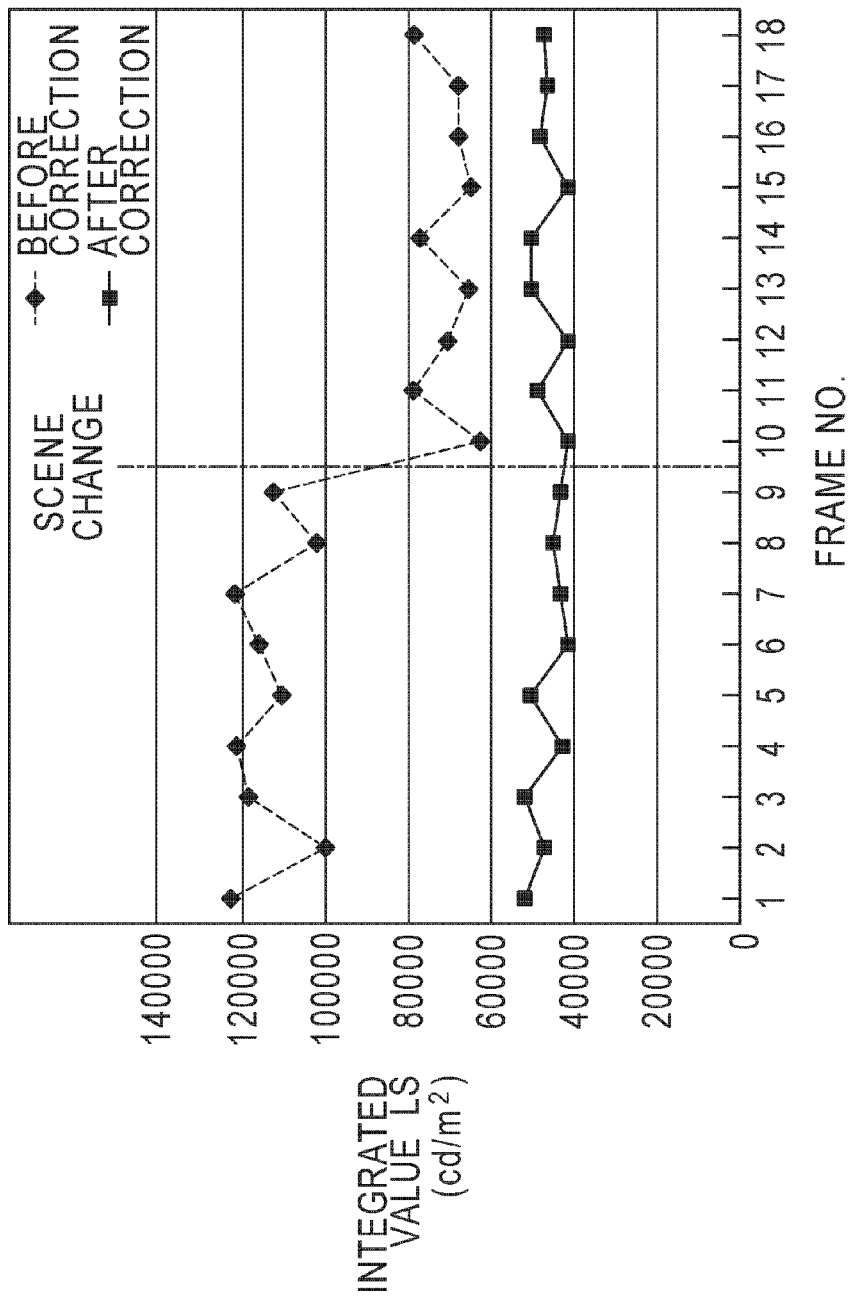

LIQUID CRYSTAL DISPLAY DEVICE

CROSS-REFERENCE TO RELATED APPLICATIONS

This application is a Continuation of PCT International Application No. PCT/JP2013/077771 filed on Oct. 11, 2013, which claims priority under 35 U.S.C. §119(a) to Japanese Patent Application No. 2013-31055 filed on Feb. 20, 2013. Each of the above application(s) is hereby expressly incorporated by reference, in its entirety, into the present application.

BACKGROUND OF THE INVENTION

Field of the Invention

The present invention relates to a liquid crystal display device that performs backlight local dimming control.

Description of the Related Art

A liquid crystal display device is provided in a portable terminal such as a tablet terminal and a smartphone, a digital camera, a TV, and various monitors, in many cases. The liquid crystal display device includes a liquid crystal display panel in which liquid crystal elements with adjustable light transmittance are arranged to form a two-dimensional array, and a backlight that irradiates the liquid crystal display panel with light.

In recent years, there has been known a liquid crystal display device that includes a backlight unit capable of individually illuminating each of a plurality of segment areas into which a display area of the liquid crystal display panel is divided, and that performs backlight local dimming control (hereinafter referred to as BLD control) to independently control luminance of each of the segment areas. In the BLD control, if an image locally includes a dark section at low luminance and a bright section at high luminance, backlight luminance of a segment area corresponding to the dark section is reduced to reduce a misadjusted black level of the dark section. Accordingly, a contrast ratio of a display image displayed in a display area increases to improve image quality of the display image.

A liquid crystal display device that performed this kind of the BLD control (hereinafter simply referred to as liquid crystal display device) controls display luminance of each of segment areas by various methods in order to further improve the image quality of a display image. The "display luminance" called in the present specification is luminance to be observed from pixels (liquid crystal elements) of the liquid crystal display panel, and is determined by the product of transmittance of the pixels and the luminance of a backlight unit (referred to as backlight luminance).

In a liquid crystal display device described in Japanese Patent Application Laid-Open No. 2009-265671 (hereinafter referred to as PTL 1), as a range of a high luminance area displayed at high luminance in each of segment areas decreases, backlight luminance (display luminance) of the high luminance area is increased. As a result, for example, in a case where a night scene image acquired by photographing the moon in the night sky is displayed, it is possible to increase the backlight luminance of segment areas corresponding to the moon in the night scene image. Therefore, it is possible to increase a contrast ratio of the night scene image.

In a liquid crystal display device described in Japanese Patent Application Laid-Open No. 2012-008388 (hereinafter referred to as PTL 2), an upper limit value and a lower limit value of backlight luminance (display luminance) of each of segment areas are set, and a backlight unit is controlled so that the backlight luminance of each of the segment areas is within a range between the upper limit value and the lower limit value (refer to a portion (B) of FIG. 10). As a result, if an image including a white pattern in a part of a background, most of which is black, such as the night scene image described before is displayed, occurrence of a so-called "halo" caused by light of the backlight unit leaking to a periphery of the white pattern is prevented.

In a liquid crystal display device described in Japanese Patent Application Laid-Open No. 2011-158499 (hereinafter referred to as PTL 3), if the amount of light of a light source of each of segment areas is equal to or larger than a preset reference value based on brightness of an input image, the amount of light of each light source is reduced. As a result, during a scene change in which a display image changes from a high luminance image to a low luminance image, occurrence of an abnormal illumination state in which each light source illuminates a screen with unnatural brightness is prevented.

SUMMARY OF THE INVENTION

In the liquid crystal display device of PTL 1, the backlight luminance of the high luminance area is increased as the range of the high luminance area decreases; however, viewability and glare of the display image is greatly affected by a size of a luminance area at middle luminance lower than the high luminance. As a result, in the liquid crystal display device of PTL 1, an image other than a specific night scene image such as that described before is not always easily visible. Particularly in PTL 1, attention is paid only to the high luminance area. Owing to this, in a case where an image including a lot of isolated bright points such as a starry sky is displayed, for example, a display image may be felt to be glaring. In addition, in a case where slide show display, moving image display or the like is performed, the number (ratio) of high luminance areas varies for each of display images, so that a variation of power consumption for each of the display images increases. As a result, power to be supplied to a backlight unit varies depending on the display image to cause a power source to increase in size, thereby increasing manufacturing costs as well as power consumption.

Furthermore, if the upper limit value and the lower limit value of the luminance of each of the segment areas are set as with the liquid crystal display device of PTL 2, merits of the local dimming control that increases the contrast ratio are impaired. In particular, if the upper limit value of the luminance is set as with PTL 2 to simply darken an image, an image of each of segment areas to be originally displayed at a high contrast ratio is displayed at a low contrast ratio (refer to a portion (B) of FIG. 10). As a result, the image quality of a display image may degrade.

Further, the liquid crystal display device of PTL 3 only reduces the amount of light (backlight luminance) of the light source of each of the segment areas on the basis of preset criteria during a scene change. As a result, in the liquid crystal display device of PTL 3, similarly to PTL 3, an image of each of segment areas to be originally displayed at a high contrast ratio may be displayed at a low contrast ratio, as with PTL 2.

Meanwhile, in order to display a high quality image in a liquid crystal display device, it is effective to set display luminance high. Since a liquid crystal display panel particularly with a higher resolution increases this effect, the display luminance is required to be set high. However, if the luminance is set high particularly in a display image with a high average luminance level (hereinafter referred to as APL), that is, in an entirely bright image, the amount of light incident on an eye increases to cause an ill effect that the image is felt to be glaring. There is a report that in a case, for example, where an image at an APL of 100% (that is, an entirely white image) is viewed at a viewing distance of 0.5 m in a bright indoor environment, the image is felt to be glaring if display luminance is 600 cd/m² or more.

On the other hand, there is a report that in a case where a display image including many dark sections at an APL of 10% or less is viewed under the same conditions as above, the display image is not felt to be glaring even if display luminance of a bright section in the display image is about 1000 cd/m², and conversely the display image looks clear. However, in this case, backlight luminance is increased throughout a screen, so that a problem arises that a misadjusted black level occurs in the dark section to degrade image quality.

In addition, if the display luminance is set at 600 cd/m² or less to reduce glare, the glare is eliminated in an image at a high APL. Conversely, however, a problem arises that display luminance is insufficient in an image at a low APL to impair clearness of a display image. Conventional liquid crystal display devices using a BLD control method only reproduce display luminance of a non-BLD control method of uniformly illuminating an entire screen of a display area, in a bright section of a display image, so that the problems described above cannot be solved.

It is an object of the present invention to provide a liquid crystal display device capable of displaying a clear image suitable for viewing without making a viewer feel the image to be glaring, with low power consumption.

A liquid crystal display device for achieving the object of the present invention includes: a liquid crystal display unit that includes a liquid crystal display panel, and a backlight unit capable of individually controlling luminance of each of a plurality of segment areas into which a display area of the liquid crystal display panel is divided; an image data acquisition unit that acquires image data; a luminance set value calculation unit that calculates a luminance set value of each of the segment areas on the basis of luminance information in the image data corresponding to each of the segment areas; and a luminance control unit that controls luminance of each of the segment areas by multiplying the luminance set value of each of the segment areas by a coefficient determined on the basis of a statistic of a video signal level of the image data.

According to the present invention, it is possible to display a clear image suitable for viewing without making a viewer feel the image to be glaring. Particularly, in a case where an image at a low average luminance level (APL) is displayed, since occurrence of a misadjusted black level in a dark section and insufficient display luminance are prevented, it is possible to display an image at a high contrast ratio.

It is preferable that liquid crystal display device include: an integrated value calculation unit that calculates a first integrated value as the statistic by adding up the luminance set value of each of the segment areas for one screen in the image data on the basis of a calculation result of the luminance set value calculation unit; and a threshold value storage unit that stores a preset range of the first integrated value suitable for viewing as a first threshold value, and it is preferable that the luminance control unit determines the coefficient for correcting the first integrated value so that the first integrated value is within a range of the first threshold value, and corrects the first integrated value by multiplying the luminance set value of each of the segment areas by the coefficient in a case where the first integrated value calculated by the integrated value calculation unit is out of the range of the first threshold value. Accordingly, it is possible to display a clear image suitable for viewing without making a viewer feel the image to be glaring. In addition, it is possible to reduce variation of a maximum luminance for each of images.

It is preferable that the luminance control unit determines a coefficient KU, where KU<1, as the coefficient and repeatedly multiplies each of the luminance set values by the coefficient KU until the first integrated value is within the range of the first threshold value in a case where the first integrated value is larger than the range of the first threshold value, and the luminance control unit determines a coefficient KL, where KL>1, as the coefficient and repeatedly multiplies each of the luminance set values by the coefficient KL until the first integrated value is within the range of the first threshold value in a case where the first integrated value is smaller than the range of the first threshold value. Accordingly, it is prevented that a viewer feels a display image to be glaring. In addition, it is prevented that the display image becomes too dark to become clear.

It is preferable that, in a case where the image data acquisition unit acquires moving image data, the luminance set value calculation unit calculates the luminance set value of each of the segment areas for each of frame image data sets constituting the moving image data, the integrated value calculation unit adds up the luminance set value for each of a plurality of frame groups into which the respective frame image data sets are divided to calculate a second integrated value for each of the frame groups, and the luminance control unit preforms first acquisition processing of acquiring a second threshold value showing a preset range of the second integrated value suitable for viewing, and in a case where the second integrated value calculated by the integrated value calculation unit is out of the range of the second threshold value, the luminance control unit preforms first correction processing of determining the coefficient for correcting the second integrated value so that the second integrated value is within the range of the second threshold value, and correcting the second integrated value by multiplying each of the luminance set values of the frame group corresponding to the second integrated value by the coefficient. Accordingly, it is possible to display a clear moving image suitable for viewing without making a viewer feel the image to be glaring. As compared with a case of correcting the luminance set value in units of frame images, it is possible to reduce a flicker of the moving image as well as to reduce a calculation load.

It is preferable that the luminance control unit performs the first acquisition processing in such a manner that the luminance control unit acquires the second threshold value determined on the basis of the first threshold value and the number of the frame image data sets belonging to the frame group.

It is preferable that the luminance control unit performs the first correction processing in such a manner that the luminance control unit determines a coefficient KU, where KU<1, as the coefficient and repeatedly multiplies each of the luminance set values by the coefficient KU until the second integrated value is within the range of the second threshold value in a case where the second integrated value is more than the range of the second threshold value, and that the luminance control unit determines a coefficient KL, where KL>1, as the coefficient and repeatedly multiplies each of the luminance set values by the coefficient KL until the second integrated value is within the range of the second threshold value in a case where the second integrated value is less than the range of the second threshold value. Accordingly, it is prevented that a viewer feels a display image to be glaring. In addition, it is prevented that the display image becomes too dark to become clear.

It is preferable that the liquid crystal display device includes a scene change detector that detects a scene change in the frame group, and it is preferable that the integrated value calculation unit adds up the luminance set value of each of the segment areas for each of scenes in the frame group to calculate a third integrated value for each of the scenes in a case where the scene change detector detects a scene change, and that the luminance control unit performs second acquisition processing of acquiring a third threshold value for each of the scenes showing a preset range of the third integrated value suitable for viewing in a case where the scene change is detected, and the luminance control unit performs second correction processing of determining the coefficient for correcting the third integrated value so that the third integrated value is within the range of the third threshold value to correct the third integrated value by multiplying each of the luminance set values of the scene corresponding to the third integrated value by the coefficient in a case where the third integrated value calculated by the integrated value calculation unit is out of the range of the corresponding third threshold value. Accordingly, even if a scene change occurs in the frame group, it is possible to provide optimum correction for each of the luminance set values.

It is preferable that the luminance control unit performs in the second acquisition processing in such a manner that the luminance control unit acquires the third threshold value determined on the basis of the first threshold value and the number of the frame image data sets belonging to each of the scenes.

It is preferable that the luminance control unit performs the second correction processing in such a manner that the luminance control unit determines a coefficient KU, where KU<1, as the coefficient and repeatedly multiplies each of the luminance set values by the coefficient KU until the third integrated value is within the range of the third threshold value in a case where the third integrated value is larger than the range of the third threshold value, and that the luminance control unit determines a coefficient KL, where KL>1, as the coefficient and repeatedly multiplies each of the luminance set values by the coefficient KL until the third integrated value is within the range of the third threshold value in a case where the third integrated value is smaller than the range of the third threshold value. Accordingly, it is prevented that a viewer feels a display image to be glaring. In addition, it is prevented that the display image becomes too dark to become clear.

It is preferable that the liquid crystal display device includes an illuminance detector that detects illuminance of a periphery of the liquid crystal display device, and a first threshold value change control unit that increases an upper limit value and a lower limit value of the first threshold value as the illuminance increases, and that reduces the upper limit value and the lower limit value as the illuminance decrease, on the basis of a detection result of the illuminance detector. Accordingly, it is possible to display a clear image suitable for viewing without making a viewer feel the image to be glaring regardless of intensity of the illuminance.

It is preferable that the first threshold value change control unit fixes each of the upper limit value and the lower limit value of the first threshold value to a constant value in a case where the illuminance detected by the illuminance detector is higher than a preset upper limit value of the illuminance.

It is preferable that the liquid crystal display device includes: a viewing distance determination unit that determines a viewing distance from the display area to a viewer; and a second threshold value change control unit that increases the upper limit value and the lower limit value of the first threshold value as the viewing distance becomes longer, and that reduces the upper limit value and the lower limit value thereof as the viewing distance becomes shorter, on the basis of a determination result of the viewing distance determination unit. Accordingly, it is possible to display a clear image suitable for viewing without making a viewer feel the image to be glaring regardless of a viewing distance.

It is preferable that the second threshold value change control unit fixes each of the upper limit value and the lower limit value of the first threshold value to a constant value in a case where the viewing distance determined by the viewing distance determination unit is more than a preset upper limit value of the viewing distance.

It is preferable that the liquid crystal display device includes: a power supply unit that receives power from any one of an external power source and a battery; a power source determination unit that determines whether or not the power supply unit receives the power from the battery or not; and a third threshold value change control unit that reduces the upper limit value and the lower limit value of the first threshold value in a case where the power supply unit receives the power from the battery as compared with a case where the power supply unit receives the power from the external power source, on the basis of a determination result of the power source determination unit. Accordingly, while power is supplied from the battery, it is possible to reduce power consumption.

It is preferable that the first threshold value defines a range of the first integrated value so that a peak of display luminance is not less than 500 cd/m$^2$ and not more than 1000 cd/m$^2$ in a case where an average luminance level of a display image displayed in the display area is 100%. Accordingly, it is possible to acquire a clear image suitable for viewing without making a viewer feel the image to be glaring.

It is preferable that the liquid crystal display device includes: an average luminance level calculation unit that calculates an average luminance level for one screen in the image data as the statistic, on the basis of the image data acquired by the image data acquisition unit; and a correspondence storage unit that stores correspondence between the preset average luminance level suitable for viewing and the coefficient, and it is preferable that the luminance control unit determines the coefficient on the basis of a calculation result of the average luminance level calculation unit with reference to the correspondence stored in the correspondence storage unit, and multiplies the luminance set value of each of the segment areas by the coefficient. Accordingly, it is possible to display a clear image suitable for viewing without making a viewer feel the image to be glaring. In addition, since the calculation is simple to allow the coefficient to be acquired in parallel with processing for the BLD control, it is possible to speed up the processing as well as to reduce costs of the device (system).

It is preferable that, in a case where the image data acquisition unit acquires moving image data, the luminance set value calculation unit calculates the luminance set value of each of the segment areas for each of frame image data sets constituting the moving image data, the average luminance level calculation unit calculates the average luminance level of any frame image data included in the frame groups for each of a plurality of frame groups into which the respective frame image data sets are divided, and the luminance control unit determines the coefficient for each of the frame groups on the basis of a calculation result of the average luminance level calculation unit for each of the frame groups with reference to the correspondence and multiplies each of the luminance set values of the corresponding frame group by the coefficient. Accordingly, it is possible to display a clear moving image suitable for viewing without making a viewer feel the image to be glaring. As compared with a case of correcting the luminance set value in units of frame images, it is possible to reduce a flicker of the moving image as well as to reduce a calculation load.

It is preferable that the liquid crystal display device includes a scene change detector that detects a scene change in each of the frame groups, and it is preferable that the average luminance level calculation unit calculates the average luminance level of any frame image data included in the scene, for each of scenes in the frame group in a case where the scene change detector detects the scene change, and the luminance control unit determines the coefficient for each of the scenes on the basis of a calculation result of the average luminance level calculation unit for each of the scenes with reference to the correspondence and multiplies each of the luminance set values of the corresponding scene by the coefficient in a case where the scene change is detected. Accordingly, even if a scene change occurs in the frame group, it is possible to provide optimum correction for each of the luminance set values.

It is preferable that the liquid crystal display device includes an illuminance detector that detects illuminance of a periphery of the liquid crystal display device, and it is preferable that the correspondence storage unit stores the plurality of correspondences determined for respective different illuminance levels, and the luminance control unit selects the correspondence corresponding to a detection result of the illuminance detector from among the plurality of correspondences stored in the correspondence storage unit and determines the coefficient on the basis of the correspondence. Accordingly, it is possible to display a clear image suitable for viewing without making a viewer feel the image to be glaring regardless of intensity of the illuminance.

It is preferable that the liquid crystal display device includes a viewing distance determination unit that determines a viewing distance from the display area to a viewer, and it is preferable that correspondence storage unit stores the plurality of correspondences determined for a plurality of different viewing distances, respectively, and the luminance control unit selects the correspondence corresponding to a determination result of the viewing distance determination unit from among the plurality of correspondences stored in the correspondence storage unit and determines the coefficient on the basis of the correspondence. Accordingly, it is possible to display a clear image suitable for viewing without making a viewer feel the image to be glaring regardless of a viewing distance.

It is preferable that the liquid crystal display device includes: a power supply unit that receives power from any one of an external power source and a battery; and a power source determination unit that determines whether or not the power supply unit receives the power from the battery or not, and it is preferable that the correspondence storage unit stores two kinds of the correspondences each of which is determined depending on a state of power supply to the power supply unit, and that the luminance control unit selects the correspondence corresponding to a determination result of the power source determination unit from among the two kinds of the correspondence stored in the correspondence storage unit and determines the coefficient on the basis of the correspondence. Accordingly, it is possible to increase and decrease the luminance set value depending on a kind of a power source. As a result, in a case where power is supplied from a battery, for example, if the luminance set value is decreased, power consumption can be reduced.

It is preferable that the luminance control unit defines the coefficient satisfying a peak of display luminance that is not less than 500 $cd/m^2$ and not more than 1000 $cd/m^2$ in a case where an average luminance level of a display image displayed in the display area is 100%. Accordingly, it is possible to acquire a clear image suitable for viewing without making a viewer feel the image to be glaring.

Since the liquid crystal display device of the present invention controls luminance of each of segment areas by multiplying the luminance set value of each of the segment areas by a coefficient determined on the basis of a statistic of video signal levels of image data, it is possible to display a clear image suitable for viewing without making a viewer feel the image to be glaring with low power consumption.

BRIEF DESCRIPTION OF THE DRAWINGS

FIG. 10 is an illustration for describing an effect (high contrast ratio) of the correction processing of a luminance set value.

FIG. 14 is an illustration for describing timing of calculation, integration, and correction, of a luminance set value when a moving image is displayed in the second embodiment.

FIG. 15 is an illustration for describing an effect (low power consumption) of correction processing of a luminance set value of the second embodiment.

DETAILED DESCRIPTION OF THE EMBODIMENTS

First Embodiment

Configuration of Tablet Terminal

Figure 1:
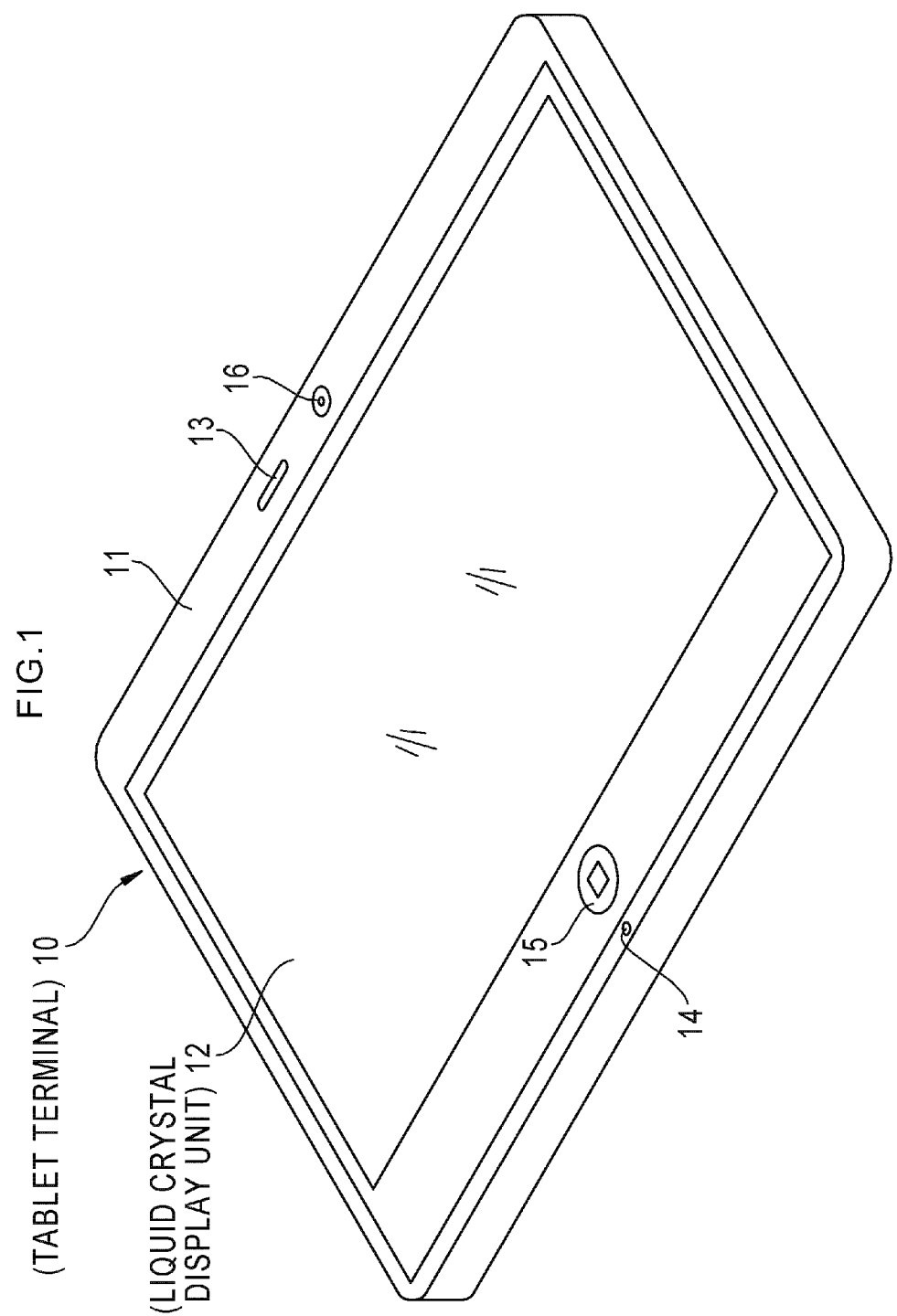
FIG. 1 is a perspective view of a tablet terminal.

As shown in FIG. 1, a tablet terminal 10 corresponding to a liquid crystal display device of the present invention includes a tabular housing 11. The housing 11 is provided on one surface thereof with a liquid crystal display unit 12, a loudspeaker 13, a microphone 14, an operation unit 15, and a camera unit 16. A configuration of the housing 11 is not limited to the configuration described above, and a configuration in which the liquid crystal display unit, and various input units such as another operation unit are provided separately is also applicable.

Figure 2:
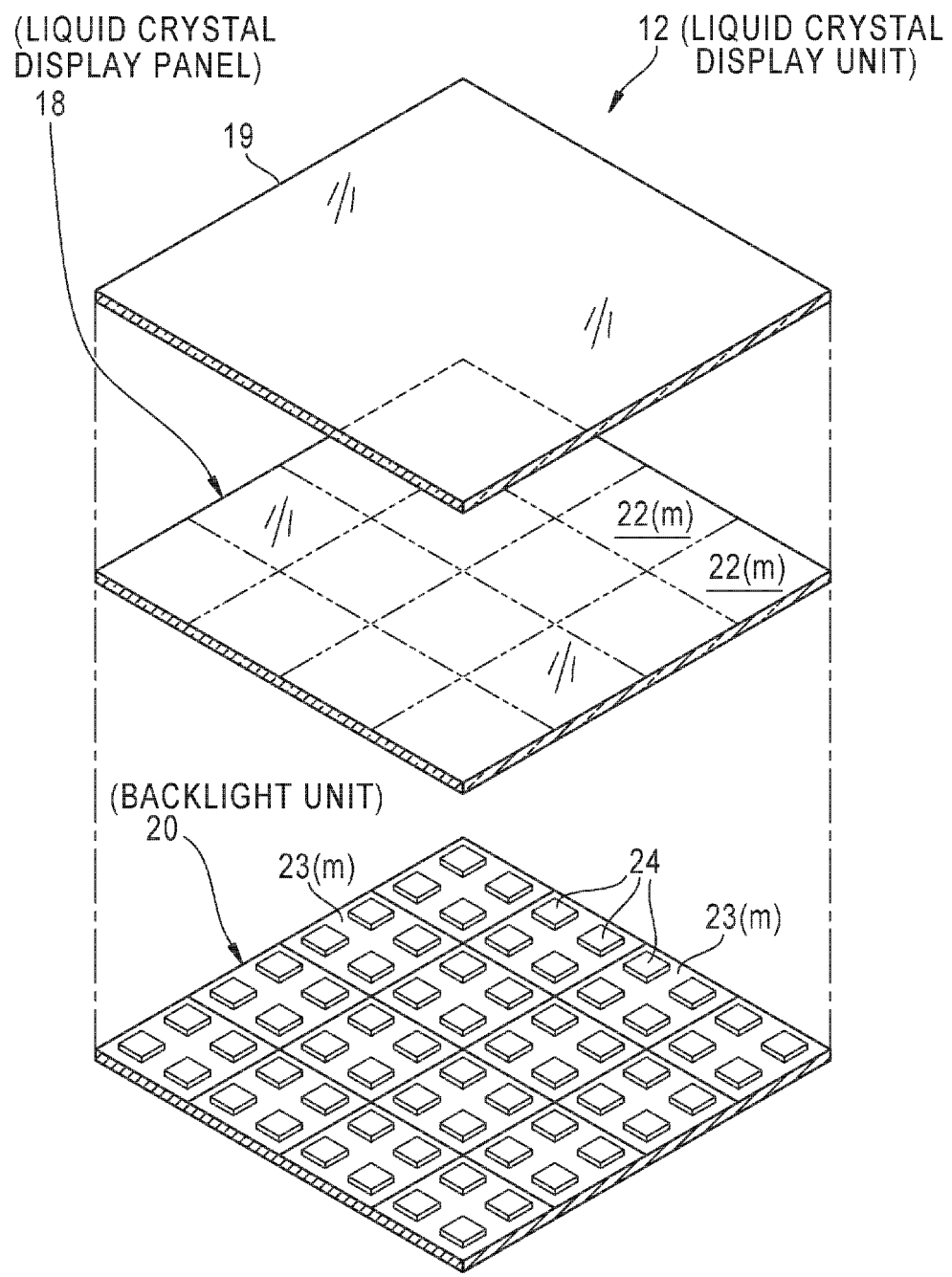
FIG. 2 is an exploded perspective view of a liquid crystal display device.

As shown in FIG. 2, the liquid crystal display unit 12 has a so-called touch panel structure in which an image (such as a still image and a moving image) and character information are displayed, as well as user's operation with respect to displayed information is detected. The liquid crystal display unit 12 is composed of a liquid crystal display panel (hereinafter, referred to as LCD panel) 18, an operation panel 19, and a backlight unit 20. While a display size of the liquid crystal display unit 12 may range from a small size to a large size without being limited to a specific size, the display size in the first embodiment is 20 inches, for example.

The LCD panel 18 is composed of a large number of liquid crystal elements 18a (refer to FIG. 3) that can adjust light transmittance thereof and that are arranged so as to form a two-dimensional array. Examples of the LCD panel 18 to be used may include various types of the LCD panel 18 for viewing a stereoscopic image, such as the LCD panel 18 provided with a lenticular lens.

The operation panel 19 has light permeability, and is mounted in a display area of the LCD panel 18. The operation panel 19 is a device that detects one or more coordinates operated with a finger of a user (viewer) or a stylus. When the device is operated with the finger of the user or the stylus, a detection signal caused by the operation is output to the CPU of the tablet terminal 10. The CPU detects an operation position (such as coordinates) on the LCD panel 18 on the basis of the received detection signal.

The LCD panel 18 is arranged so as to be completely covered with the operation panel 19. In a case where the arrangement above is applied, the operation panel 19 may include a function of detecting a user's operation also in an area outside the LCD panel 18. That is, the operation panel 19 may include a detection area (hereinafter this area is also referred to as a display area) for an overlapping portion overlapped with the LCD panel 18, and a detection area (hereinafter referred to as a non-display area) for an outer periphery other than the display area. Examples of a position detection method to be adopted in the operation panel 19 above may include a matrix switch method, a resistive film method, a surface elastic wave method, an infrared ray method, an electromagnetic induction method, and a capacitance method.

The backlight unit 20 is arranged on a back face side of the LCD panel 18. The backlight unit 20 includes a plurality of illumination units 23(m) that individually illuminates each of a plurality of segment areas 22(m) into which the display area of the LCD panel 18 is divided. Here, the segment area 22(m) is composed of horizontal 16 pixels by vertical 16 pixels, for example. In addition, "m" shows the number of segment areas 22(m), and is indicated as 0 to 63

(or 1 to 64) in a case where the display area of the LCD panel 18 is divided into 64 segment areas, for example.

Each of the illumination units 23(*m*) is provided with one or more light emitting diodes (hereinafter referred to as an LED) 24. Since each of the illumination units 23(*m*) can be independently controlled, it is possible to perform local dimming control so that luminance of each of the segment areas 22(*m*) is individually controlled.

Figure 3:
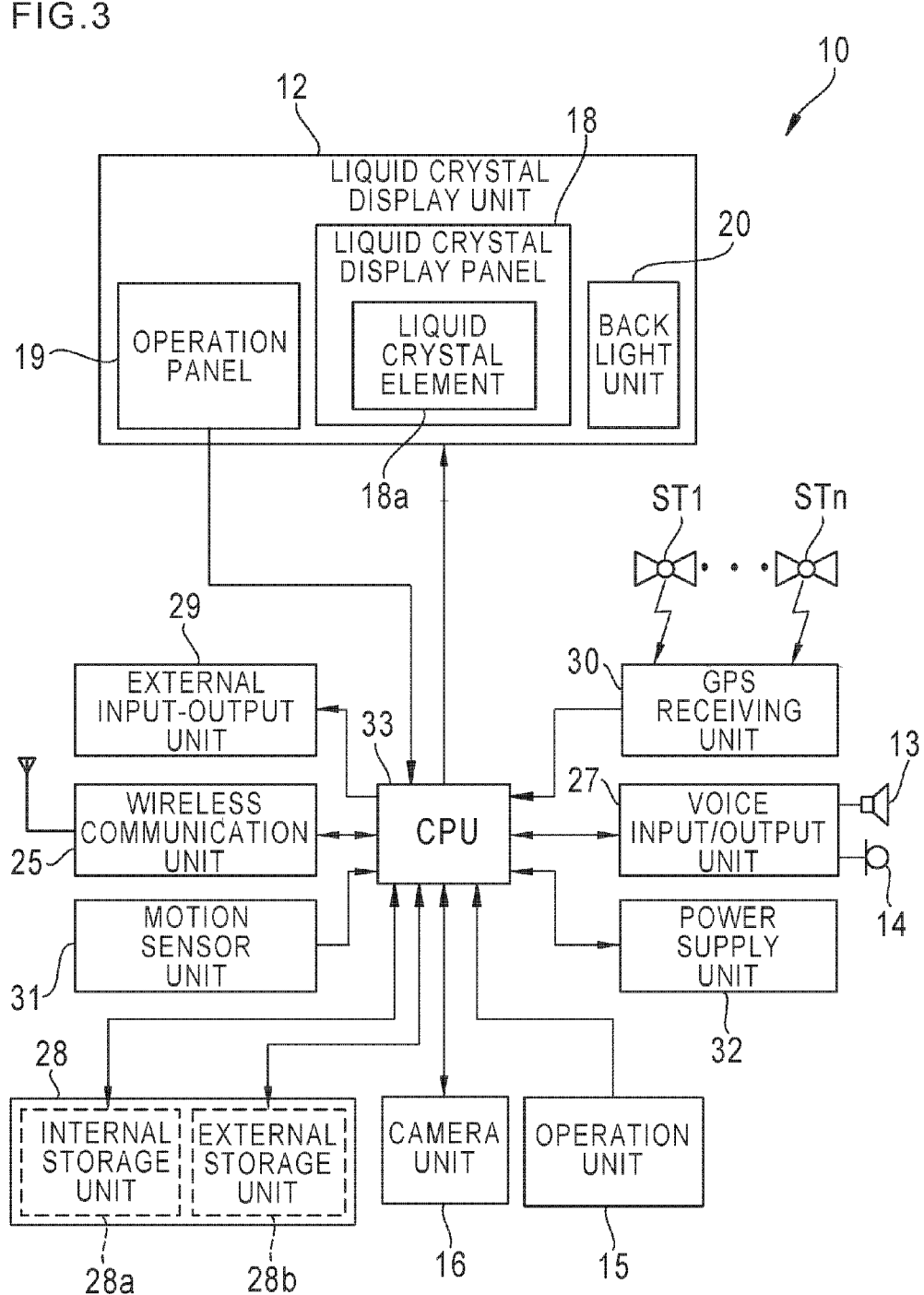
FIG. 3 is a block diagram showing an electrical configuration of the tablet terminal.

As shown in FIG. 3, the tablet terminal 10 includes the liquid crystal display unit 12 described before, the loudspeaker 13, the microphone 14, the operation unit 15, and the camera unit 16 along with a wireless communication unit 25, a voice input/output unit 27, a storage unit 28, an external input-output unit 29, a global positioning system (GPS) receiving unit 30, a motion sensor unit 31, a power supply unit 32, and a CPU 33.

The loudspeaker 13 outputs a voice, and the like. The microphone 14 is used to input a voice and the like. The operation unit 15 is a hardware key using a push button type switch, a cross key, or the like, for example, and receives a command from a user. The operation unit 15 is mounted in a lower portion of a display unit of the housing 11, or in a side face of the housing 11, for example.

The camera unit 16 performs electronic photographing by using various types of an imaging element such as a complementary metal-oxide semiconductor (CMOS), and a charge-coupled device (CCD). Image data 35 (refer to FIG. 4) acquired by the electronic photographing can be converted into various types of compression image data to be recorded in the storage unit 28, as well as can be output through the external input-output unit 29 and the wireless communication unit 25. The camera unit 16 may be mounted on a back face of the housing 11, or a plurality of camera units 16 may be mounted. In addition, the camera unit 16 is available for various functions of the tablet terminal 10. For example, it is possible to display an image acquired by the camera unit 16 in the LCD panel 18, as well as possible to use an image acquired by the camera unit 16 as one of operation inputs of the operation panel 19.

The wireless communication unit 25 performs wireless communication with respect to a base station device installed in a mobile communication network in response to a command of the CPU 33. The wireless communication is used to transmit and receive various file data sets such as image data, electronic mail data, and the like, and is used to receive Web data, streaming data, and the like.

The voice input/output unit 27 includes the loudspeaker 13 and the microphone 14, described before. The voice input/output unit 27 converts a user's voice input through the microphone 14 at the time of using an internet calling service using a peer-to-peer (P2P) technique, for example, into voice data, and outputs the voice data to the CPU 33. The voice data is output to the wireless communication unit 25 from the CPU 33. In addition, the voice input/output unit 27 decodes voice data received by wireless communication unit 25 and the like at the time of using the Internet calling service, for example, and allows the loudspeaker 13 to output the decoded voice data. Further, the voice input/output unit 27 allows the loudspeaker 13 to output various voice messages or an alarm in response to a command from the CPU 33. A mounting position of each of the loudspeaker 13 and the microphone 14 is not limited to the position shown in FIG. 1 but can be appropriately changed.

The storage unit 28 stores a control program and control data of the CPU 33, an application software, address data in which a name of a communication partner, a telephone number, and the like are associated with each other, data of electronic mails that are transmitted and received, the image data 35 output from the camera unit 16 or the wireless communication unit 25, and the like. In addition, the storage unit 28 also temporarily stores streaming data and the like. The storage unit 28 is composed of an internal storage unit (a threshold value storage unit, and a correspondence storage unit) 28*a* that is built in the tablet terminal, and an external storage unit 28*b* that is detachable to an external memory slot (not shown). As for the internal storage unit 28*a* and the external storage unit 28*b*, well-known various storage media such as a flash memory type and a hard disk type are used.

The internal storage unit 28*a* stores data described before, such as the control program and the control data, the application software, the address data, and data of electronic mails, for example. The external storage unit 28*b* stores the image data 35, and the like.

The external input-output unit 29 serves as an interface with all external devices to be connected to the tablet terminal 10, and is used to be directly or indirectly connected to another external device by communication and the like.

The GPS receiving unit 30 receives GPS signals transmitted from GPS satellites ST1 to STn, and performs positioning calculation processing based on a plurality of GPS signals received to detect a position of the tablet terminal 10, defined by a latitude, a longitude, and an altitude. The detection result is output to the CPU 33.

The motion sensor unit 31 includes a triaxial acceleration sensor and the like, for example, to detect a physical motion of the tablet terminal 10. Accordingly, moving direction and acceleration of the tablet terminal 10 are detected. The detection result is output to the CPU 33.

The power supply unit 32 supplies power stored in a battery (not shown) to each of units of the tablet terminal 10. In a case where an external power source is connected to the power supply unit 32, the power supply unit 32 supplies power supplied from the external power source to each of the units of the tablet terminal 10.

The CPU 33 operates in accordance with a control program and control data read out from the storage unit 28 to integrally control each of the units of the tablet terminal 10. In addition, the CPU 33 performs display control of the LCD panel 18, and operation detection control of detecting user's operation performed through the operation unit 15 or the operation panel 19.

The CPU 33 performs the display control to allow the liquid crystal display unit 12 to display a software key such as an icon for starting up application software and a scroll bar, or to allow the liquid crystal display unit 12 to display a window for creating an electronic mail. The scroll bar refers to a software key for receiving a command for moving a displaying portion of an image that is too large to fit in a display area of the LCD panel 18, and the like.

In addition, the CPU 33 performs the operation detection control to detect user's operation through the operation unit 15, and to receive operation with respect to the icon described above and input of a character string into an entry field of the window described above through the operation panel 19, or to receive a request for scrolling a display image through the scroll bar.

Further, the CPU 33 performs the operation detection control to have a touch panel control function of determining whether an operation position with respect to the operation panel 19 is an overlapping portion (display area) overlapped with the LCD panel 18, or an outer periphery (non-display area) other than the overlapping portion, which outer periphery does not overlap with the LCD panel 510, in order to control a sensitive area of the operation panel 19 and a display position of the software key.

The CPU 33 is also capable of detecting a gesture operation with respect to the operation panel 19 to perform a preset function in response to the detected gesture operation. The gesture operation means not a conventional simple touch operation, but an operation such as drawing a trail with a finger, designating a plurality of positions at the same time, and drawing a trail from at least one of the plurality of positions in combination with both of the operations above.

(Configuration Related to Display Control Processing on Image)

Figure 4:
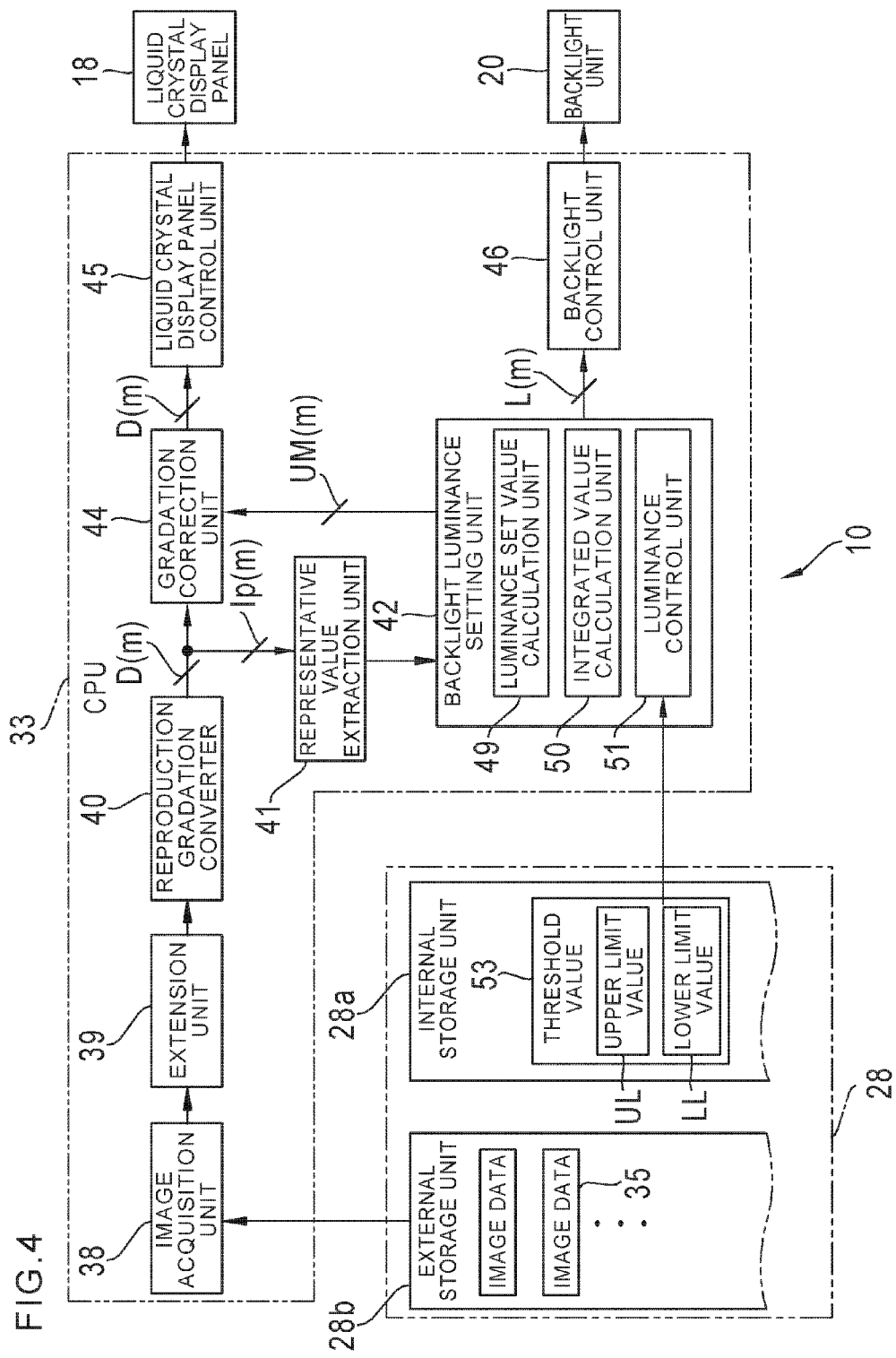
FIG. 4 is a functional block diagram of a CPU of a tablet terminal of a first embodiment.

As shown in FIG. 4, when executing display control, the CPU 33 reads out a control program and application software for the display control from the internal storage unit 28a and executes them to serve as an image data acquisition unit 38, an extension unit 39, a reproduction gradation converter 40, a representative value extraction unit 41, a backlight luminance setting unit 42, a gradation correction unit 44, a LCD panel control unit 45, and a backlight control unit 46.

The image data acquisition unit 38 serves as the image data acquisition unit of the present invention together with the camera unit 16 described before and the wireless communication unit 25. The image data acquisition unit 38 reads out the image data 35 from the external storage unit 28b to output the image data 35 to the extension unit 39. In a case where a still image is displayed, for example, the image data acquisition unit 38 acquires (reads) the image data 35 selected by the operation unit 15 and the operation panel 19 from the external storage unit 28b to output the image data 35 to the extension unit 39. In addition, in a case where a slide show of still images is displayed, the image data acquisition unit 38 sequentially reads out the image data 35 from the external storage unit 28b in a predetermined order to output the image data 35 to the extension unit 39.

The extension unit 39 applies extension processing to the image data 35, to which compression processing has been applied, received from the image data acquisition unit 38, and then outputs the image data 35 to the reproduction gradation converter 40. If the image data 35 is uncompressed data, the extension unit 39 outputs uncompressed image data 35 as it is to the reproduction gradation converter 40.

The reproduction gradation converter 40 applies reproduction gradation conversion processing (also referred to as luminance linear conversion) to the image data 35 received from the extension unit 39. Gradation conversion processing called gamma correction (generally, 0.45th power) is applied to the image data 35 acquired by photographing with the camera unit 16, another digital camera, or the like, for example. Thus, in the reproduction gradation conversion processing, conversion with 2.2th power of the inverse of 0.45th power is applied to the image data 35. Then, the reproduction gradation converter 40 divides the image data 35, to which reproduction conversion processing has been applied, for each of the segment areas 22(m) (such as 64-part division), and outputs image data D(m) corresponding to each of the segment areas 22(m) to the gradation correction unit 44 in order.

The representative value extraction unit 41 extracts a representative value (luminance information) Ip(m) from the image data set D(m) for each of the segment areas 22(m), output to the gradation correction unit 44 from the reproduction gradation converter 40 in order. The representative value Ip(m) is a peak value of pixel values of respective pixels (i) in the segment area 22(m). Symbol "i" shows the number of pixels in the segment area 22(m), and is indicated as 1 to 256 (or 0 to 255) in a case where the segment area 22(m) is composed of 16 by 16 pixels. Here, the pixel value is a value that defines transmittance of a pixel (liquid crystal element 18a). In the LCD panel 18 capable of 8-bit display, for example, if the pixel value is 255, transmittance of the pixel is maximum. Conversely, if the pixel value is 0, the pixel is in a light-shielding state. The representative value Ip(m) for each of the segment areas 22(m) is output to the backlight luminance setting unit 42.

The backlight luminance setting unit 42 includes a luminance set value calculation unit 49, an integrated value calculation unit 50, and a luminance control unit 51. The luminance set value calculation unit 49, as discussed below, acquires a luminance set value L(m) of backlight luminance for each of the segment areas 22(m) (or for each of the illumination units 23(m)) on the basis of the representative value Ip(m) for each of the segment areas 22(m), received from the representative value extraction unit 41.

The integrated value calculation unit 50 adds up the luminance set value L(m) for each of the segment areas 22(m) to calculate the integrated value LS (refer to FIG. 9) corresponding to the first integrated value of the present invention. Since the integrated value LS is acquired by adding up the luminance set value L(m) determined on the basis of the representative value Ip(m) of pixel values of each of image data sets D(m), the integrated value LS corresponds to the statistic of video signal levels of image data of the present invention.

The luminance control unit 51 determines whether the integrated value LS is within a preset range, and if it is determined in negative, each of the luminance set values L(m) is corrected. Each of the luminance set values L(m) after correction (here, each of the luminance set values L(m) that are not necessary to correct is included) is output to the backlight control unit 46.

The gradation correction unit 44 applies gradation correction processing described later to each of the image data sets D(m), received from the reproduction gradation converter 40, and outputs each of the image data sets D(m), to which the gradation correction processing has been applied, to the LCD panel control unit 45.

The LCD panel control unit 45 controls light transmittance of each of pixels (i) in the respective segment areas 22(m) on the basis of each of the image data sets D(m), received from the gradation correction unit 44. In addition, the backlight control unit 46 controls backlight luminance of each of the illumination units 23(m) on the basis of each of the luminance set values L(m) received from the backlight luminance setting unit 42.

(Luminance Set Value Calculation Processing and Gradation Correction Processing)

Next, calculation processing of the luminance set value L(m), and gradation correction processing will be specifically described. Display luminance of each of pixels in the segment area 22(m) is determined by the product of a pixel value from 0 to 225 (or light transmittance of the liquid crystal element 18a) of each of the pixels, and backlight luminance of the illumination unit 23(m). Thus, in order to increase a contrast ratio of a display image while power consumption in the liquid crystal display unit 12 is reduced, in the present embodiment, if a pixel value has a margin for gain-up (increase in light transmittance), backlight luminance is reduced as well as gradation correction is performed to increase a gain in the pixel value.

Figure 5:
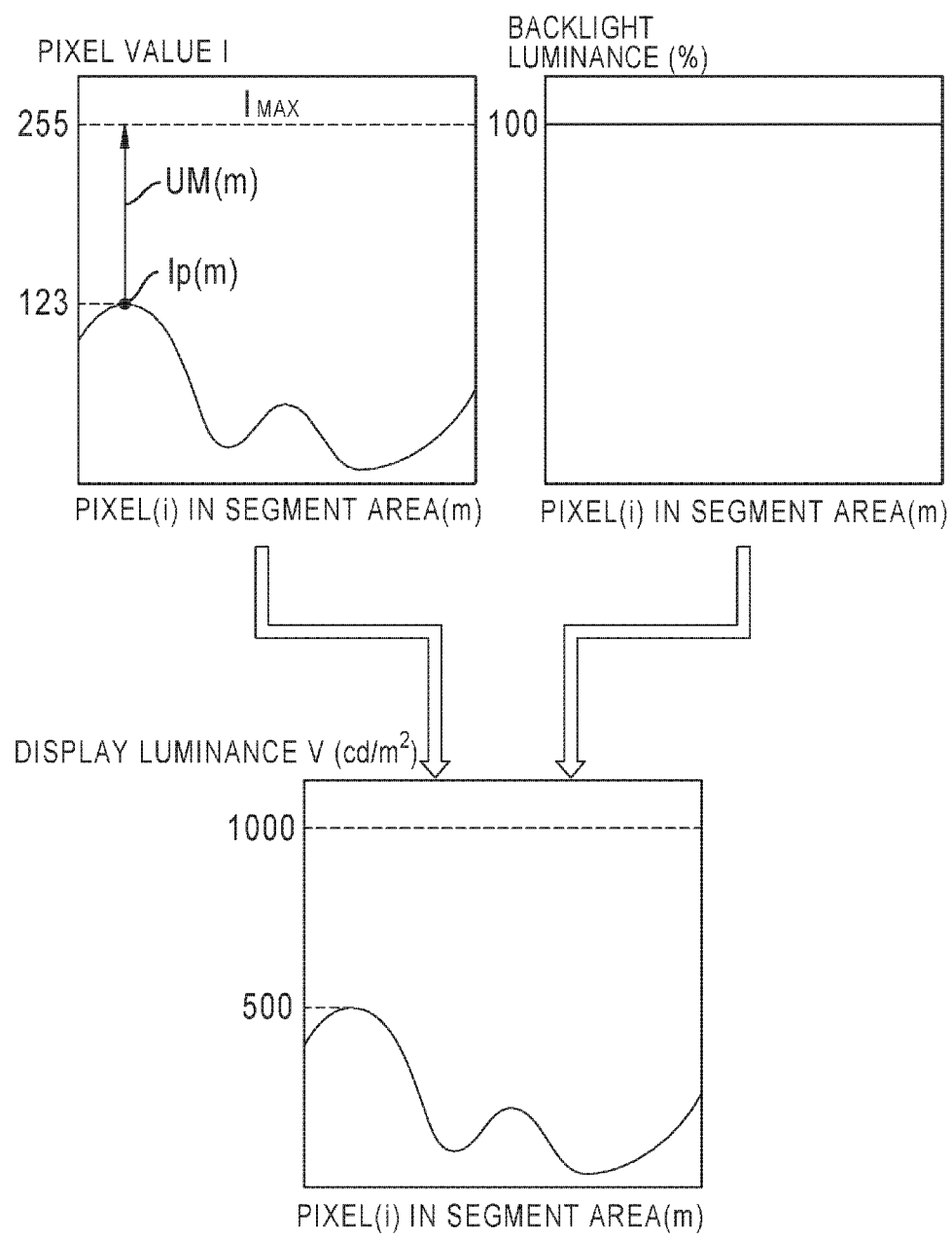
FIG. 5 is an illustration for describing conventional gradation correction processing.

As shown in FIG. 5, the luminance set value calculation unit 49 acquires a UM(m) indicating a margin for gain-up (upper margin) for each of the segment areas 22(m) on the basis of the representative value Ip(m) for each of the segment areas 22(m), received from the representative value extraction unit 41. For example, in a case where the representative value Ip(m) of pixel values I of the respective pixels (i) in the segment area 22(m) is "123" that is about a half of a maximum pixel value $I_{MAX}$ (255), there is a margin of 2.0 as a ratio between the $I_{MAX}$ and the Ip(m). The ratio is the UM(m), and can be acquired by Expression: UM(m)=$I_{MAX}$/Ip(m).

Figure 6:
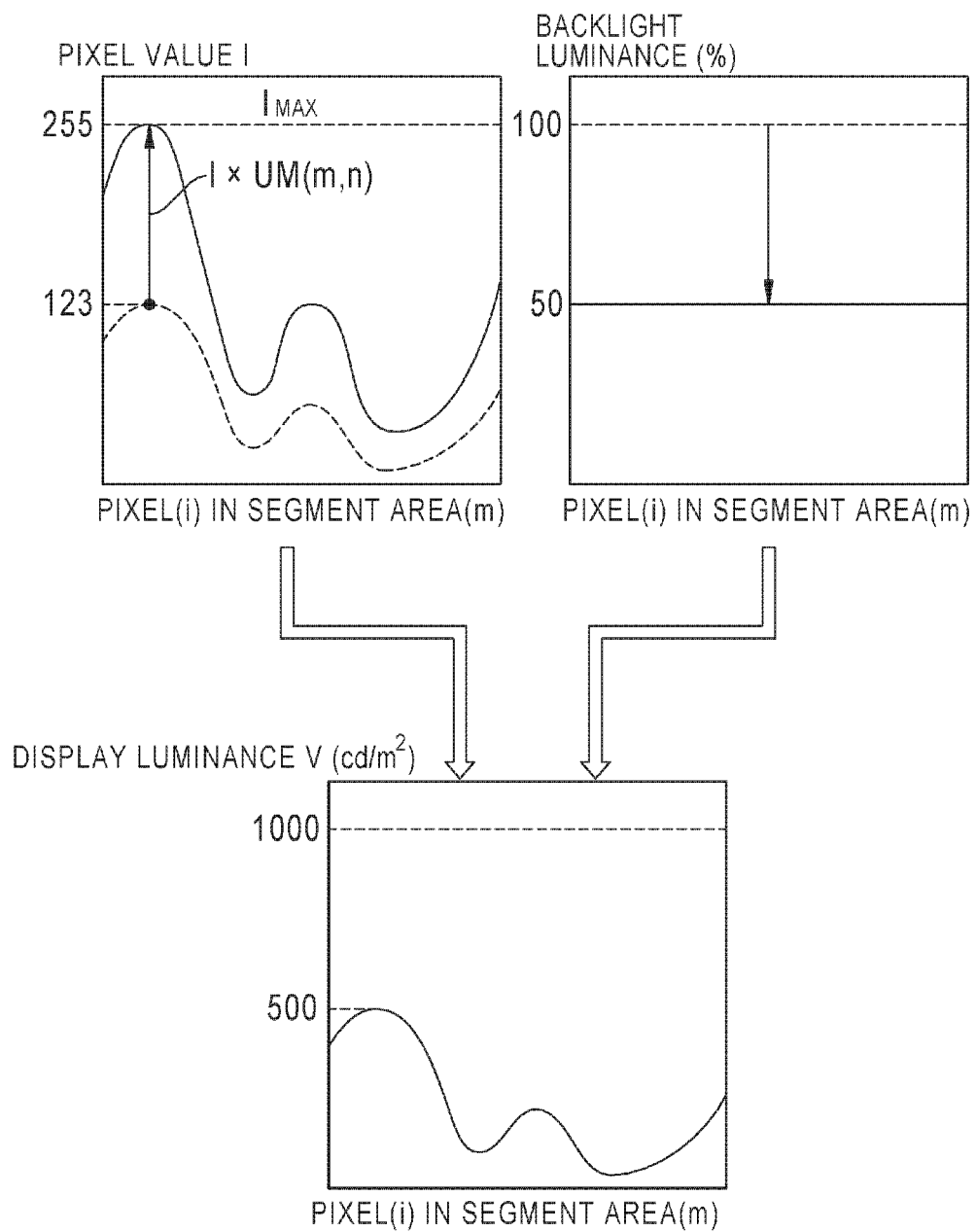
FIG. 6 is an illustration for describing gradation correction processing of the present invention.

As shown in FIG. 6, in a case where the UM(m) is 2.0, for example, even if the backlight luminance (luminance set value L(m)) is reduced by the inverse of the UM(m) times (1/UM(m)=1/2 times), increase in a gain of the pixel value I of each of the pixels (i) by the UM(m) allows the display luminance to be identical with that shown in FIG. 5. Furthermore, as compared with a case shown in FIG. 5, it is possible to reduce power consumption by as much as the dimming-controlled luminance set value L(m), that is, the dimming-controlled backlight luminance. Further, since the backlight luminance is reduced more for the segment area 22(m) with a darker display image, black display becomes clear to increase a contrast ratio of a display image.

The luminance set value calculation unit 49 calculates each of the luminance set values L(m) on the basis of a calculation result of the UM(m) for each of the segment areas 22(m). For example, in a case where a set value of backlight luminance of a conventional liquid crystal display unit using a non-BLD method is indicated as $E_0$, each of the luminance set values L(m) is calculated by the following expression (1).

$$L(m)=E_0/UM(m): \quad \text{expression (1)}$$

The gradation correction unit 44 applies gradation correction processing to each of the pixels (i) of the respective image data sets D(m) received from the reproduction gradation converter 40 to increase a gain of each of the pixels by the UM(m) on the basis of the UM(m) of each of the segment areas 22(m) calculated by the luminance set value calculation unit 49. The gradation correction unit 44 outputs each of the image data sets D(m), to which the gradation correction processing has been applied, to the LCD panel control unit 45.

(Correction Processing of Luminance Set Value)

Returning to FIG. 4, the luminance control unit 51 determines whether the integrated value LS calculated by the integrated value calculation unit 50 is within the threshold value (first threshold value) 53 stored in the internal storage unit 28a or not, and corrects each of the luminance set values L(m) on the basis of the determination result. Here, the threshold value 53 defines a range of the integrated value LS, capable of displaying a clear image suitable for viewing without allowing a user to feel glare, or an upper limit value UL and a lower limit value LL of the range. Each of the upper limit value UL and the lower limit value LL is a predetermined value.

Figure 7:
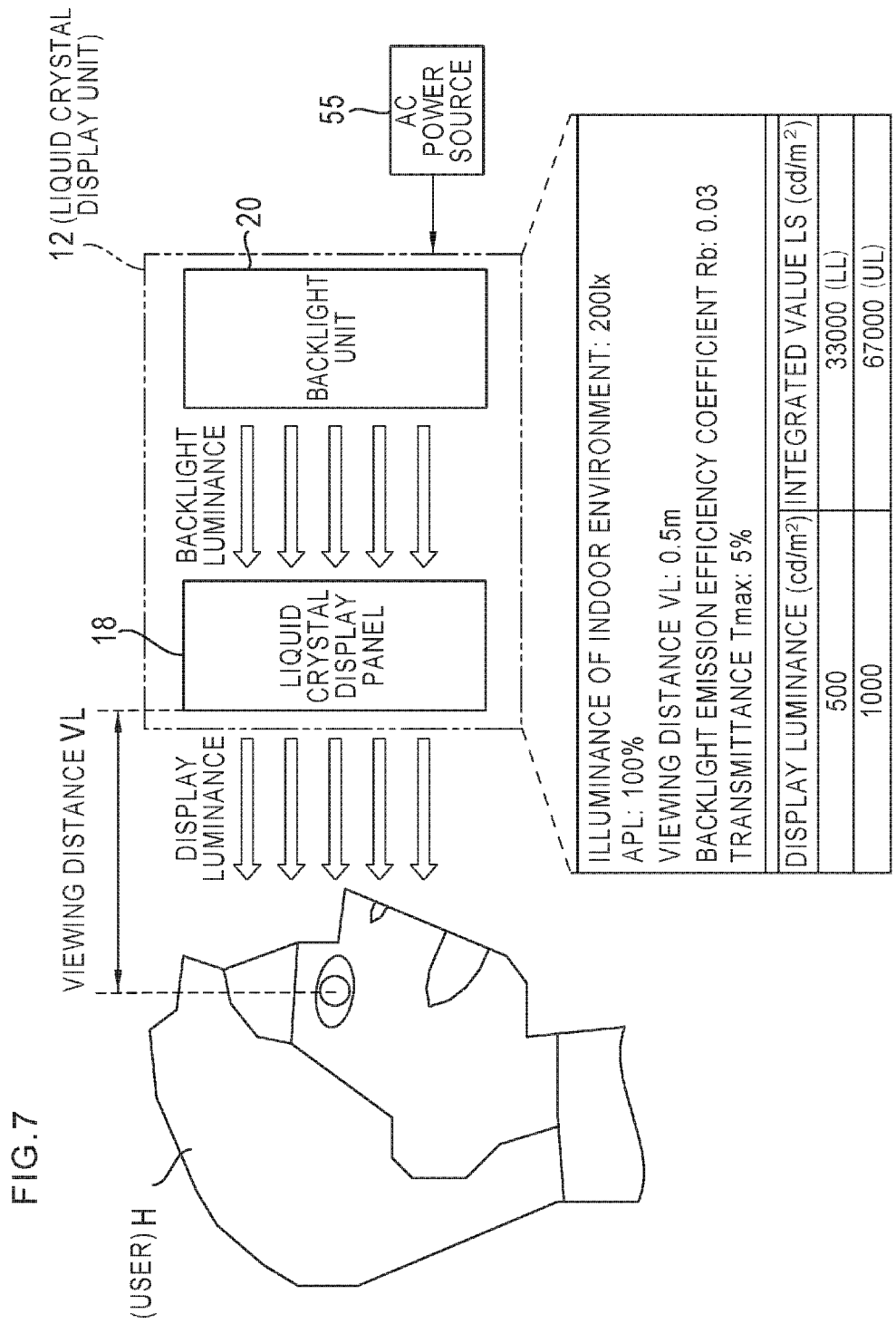
FIG. 7 is an illustration for describing an upper limit value UL and a lower limit value LL of a threshold value.

As shown in FIG. 7, the upper limit value UL and the lower limit value LL may be set in accordance with external conditions (such as illuminance, a viewing distance, a power source). For example, in a case where illuminance of indoor environment is 200 (lx) corresponding to illuminance of a bright indoor environment, and a viewing distance VL from a display area to a user (viewer) H is 0.5 m, and further an AC power source 55 is used for operation, it is preferable that, in a case where a full white image is displayed in a display area of the liquid crystal display unit 12 (APL of 100%), a peak of display luminance is set to be not less than 500 cd/m² and not more than 1000 cd/m². Here, a peak of display luminance is set to be equal to or less than 1000 cd/m² in an image at the APL of 100%, because people feel most glare in an image at the APL of 100%. As a result, the peak luminance is empirically set to be equal to or less than 1000 cd/m² so that the luminance is adjusted at a level suitable for viewing without feeling glare. On the other hand, in an image at an APL of less than 100%, peak luminance thereof is set to be higher than the peak luminance of the image at the APL of 100% by luminance control of the present application. For example, in a case where an image at a low APL such as an image of the night sky is displayed, although luminance of a bright section (such the moon and a star) in the display image is equal to or more than 1000 cd/m², it is empirically known that a user views the image as a clear image without feeling glare. In addition, the peak of the display luminance is set to be equal to or more than 500 cd/m², because it is empirically known that a contrast ratio decreases to degrade image quality if a peak of display luminance is less than 500 cd/m² in an image at the APL of 100%. For example, in a case where an image at a low APL such as an image of the night sky is displayed, peak luminance of a bright section (such the moon and a star) in the display image is set to be higher than the peak luminance of the image at the APL of 100% by the luminance control of the present application. As a result, a contrast ratio does not decrease so that a clear image suitable for viewing can be acquired.

At this time, in the following conditions: display luminance in a case where an average luminance level of a display image is the APL of 100%, or a full screen is white, is indicated as Bw; the integrated value LS in this case is indicated as LSmax; transmittance at the time of full white display of the LCD panel 18 is indicated as Tmax; and a backlight light emission efficiency coefficient determined depending on a structure of the backlight unit 20 and light emission efficiency of the LED 24 is indicated as Rb, a relationship of the properties above is expressed by the following expression 2.

$$Bw=LSmax \times Rb \times Tmax: \quad \text{expression 2}$$

For example, in the liquid crystal display unit 12 in which Rb is 0.3, and Tmax is 5%, in order to set a peak of display luminance at the APL of 100% to be equal to or more than 500 cd/m², the integrated value LS should be nearly equal to or more than 33000 cd/m². In addition, in order to set a peak of display luminance at the APL of 100% to be equal to or less than 1000 cd/m², the integrated value LS should be nearly equal to or less than 67000 cd/m². Thus, in the present embodiment, in order to set a peak of display luminance at the time of full white display (APL of 100%) to be not less than 500 cd/m² and not more than 1000 cd/m², the threshold value 53 of the integrated value LS should be set in a range from 33000 cd/m² (lower limit value LL) to 67000 cd/m² (upper limit value UL).

In this way, since a control range of the integrated value LS is set on the basis of the display luminance in the full white display (APL of 100%), an image at a low APL becomes a clear image without feeing glare by the same control, because a backlight control method of the present application coincides with human visual characteristics. It is said that a lower limit value of display luminance at which people begin to feel glare has characteristics expressed by an exponential function with respect to an APL of an image, and an index is in proportion to −0.2 power of the APL (hereinafter referred to as characteristics A). On the other hand, a relationship between the integrated value LS and the APL has characteristics expressed by an exponential function, and an index is almost in proportion to 0.2 power of the APL (hereinafter referred to as characteristics B). Thus, controlling the integrated value LS at a value in a fixed range corresponds to changing a maximum luminance value at the time of displaying an image at a low APL to inverse characteristics of the characteristics B, or changing the maximum luminance value in proportion to −0.2 power of the APL. As a result, the relationship between the display luminance and the APL becomes characteristics similar to the characteristics A, and a clear image without feeing glare is displayed.

Returning to FIG. 4, in a case where the integrated value LS is larger than the upper limit value UL (LS>UL), the luminance control unit 51 performs multiplication processing (hereinafter referred to as KU multiplication processing) of multiplying each of the luminance set values L(m) before correction by a coefficient KU (KU<1), and subtraction processing of subtracting a fixed value U1 (U1<KU) from the coefficient KU after the multiplication processing. In addition, the luminance control unit 51 acquires a new integrated value LS for each of the luminance set values L(m) to which the KU multiplication processing has been applied whenever the KU multiplication processing is performed, and performs subsequent KU multiplication processing if this integrated value LS is larger than the upper limit value UL. Accordingly, the KU multiplication processing and the subtraction processing are repeatedly performed until the integrated value LS becomes equal to or less than the upper limit value UL (LS≤UL).

On the other hand, in a case where the integrated value LS is smaller than the lower limit value LL (LS<LL), the luminance control unit 51 performs multiplication processing (hereinafter referred to as KL multiplication processing) of multiplying each of the luminance set values L(m) before correction by a coefficient KL (KL>1), and addition processing of adding a fixed value U2 (U2<U1) to the coefficient KL after the KL multiplication processing. In addition, the luminance control unit 51 acquires a new integrated value LS for each of the luminance set values L(m) to which the KL multiplication processing is applied whenever the KL multiplication processing is performed, and performs subsequent KL multiplication processing if this integrated value LS is smaller than the lower limit value LL. Accordingly, the KL multiplication processing and the subtraction processing are repeatedly performed until the integrated value LS becomes equal to or more than the lower limit value LL (LS≥LL).

In the preset embodiment, the luminance control unit 51 determines whether the integrated value LS is larger than the upper limit value UL or not, and performs the correction (the KU multiplication processing, and the subtraction processing), and then determines whether the integrated value LS is smaller than the lower limit value LL or not, and performs the correction (the KL multiplication processing, and the addition processing). Accordingly, if the fixed value U2 is set at a large value, the integrated value LS may exceed the upper limit value UL after the correction (the KL multiplication processing, and the addition processing). Thus, the fixed value U2 is set at a value smaller than the fixed value U1.

(Operation of First Embodiment (Display Control Processing on Still Image))

Figure 8:
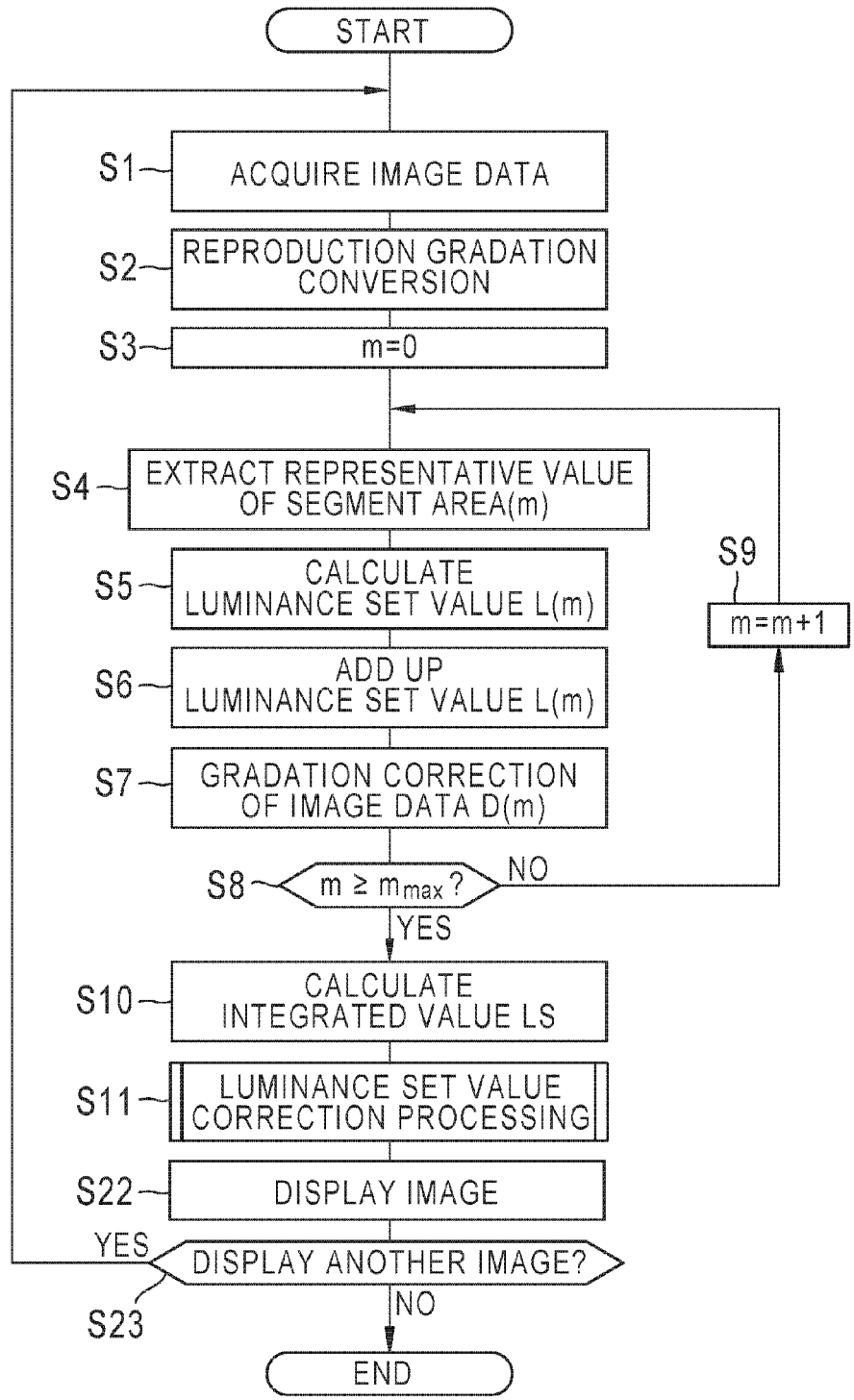
FIG. 8 is a flow chart showing a flow of display control processing of the first embodiment.

Next, with reference to the flow chart shown in FIG. 8, operation of the tablet terminal 10 having the configuration above, particularly display control processing on a still image in the liquid crystal display unit 12, will be described. The external storage unit 28b previously stores the image data 35 acquired by photographing with the camera unit 16, or the image data 35 acquired by the wireless communication unit 25 through the Internet or the like.

When operation of starting image display is performed in the operation unit 15 or the operation panel 19, the CPU 33 reads out a control program for display control and application software from the internal storage unit 28a, and executes them. Accordingly, the CPU 33 serve as the image data acquisition unit 38, the extension unit 39, the reproduction gradation converter 40, the representative value extraction unit 41, the backlight luminance setting unit 42, the gradation correction unit 44, the LCD panel control unit 45, and the backlight control unit 46.

When operation of displaying a list of the image data 35 stored in the external storage unit 28b is performed in the operation unit 15 or the operation panel 19, the liquid crystal display unit 12 displays the list (including a file name, an thumbnail image, and the like) of the image data 35. Subsequently, when selection operation of the image data 35 is performed in the operation unit 15 or the operation panel 19, the image data acquisition unit 38 acquires the image data 35 corresponding to the selection operation from the external storage unit 28b, and outputs the image data 35 to the extension unit 39 (step S1). The extension unit 39 applies the extension processing to the image data 35, and then the image data 35 is input into the reproduction gradation converter 40.

The reproduction gradation converter 40 applies the reproduction gradation conversion processing to the image data 35 received from the extension unit 39 (step S2). Then, the reproduction gradation converter 40 divides the image data 35, to which the reproduction conversion processing has been applied, for each of the segment areas 22($m$), and outputs image data D(m) corresponding to each of the segment areas 22($m$) to the gradation correction unit 44.

At the time, as shown in FIGS. 5 and 6 described before, the representative value extraction unit 41 extracts a representative value Ip(0) from image data 35(0) of a segment area 22(0) output from the reproduction gradation converter 40 (step S3 and step S4). Subsequently, the luminance set value calculation unit 49 acquires a UM(0) corresponding to the segment area 22(0) on the basis of the representative value Ip(0) extracted by the representative value extraction unit 41. Then, the luminance set value calculation unit 49 calculates a luminance set value L(0) of the segment area 22(0) on the basis of a calculation result of the UM(0) and the expression (1) described above (step S5). In addition, the integrated value calculation unit 50 adds up a calculation result of the luminance set value L(0) (step S6).

Meanwhile, the gradation correction unit 44 applies the gradation correction processing to each of pixels (i) of image data D(0) received from the reproduction gradation converter 40 on the basis of the UM(0) of the segment area 22(0) calculated by the luminance set value calculation unit 49 (step S7). Each of image data sets D(m), to which the gradation correction processing has been applied, is output to the LCD panel control unit 45.

In like manner, whenever the reproduction gradation converter 40 outputs image data 35(1) to image data 35 (63:$m_{max}$), the processing from step S4 to step S7, described before, is repeatedly performed (NO in step S8, and step S9). Accordingly, the UM(m) and the luminance set value L(m), corresponding to each of the segment areas 22($m$), are calculated, as well as each of the luminance set values L(m) is sequentially added up.

When calculation of the UM(m) and the luminance set value L(m) for every segment area 22($m$), and addition of each of the luminance set values L(m), are completed (YES in step S8), the integrated value calculation unit 50 calculates an integrated value LS (step S10). The calculation result of the integrated value LS is output to the luminance control unit 51.

(Luminance Set Value Correction Processing)

After the integrated value calculation unit 50 calculates the integrated value LS, the luminance control unit 51 starts correction processing for each of the luminance set values L(m) (step S11).

Figure 9:
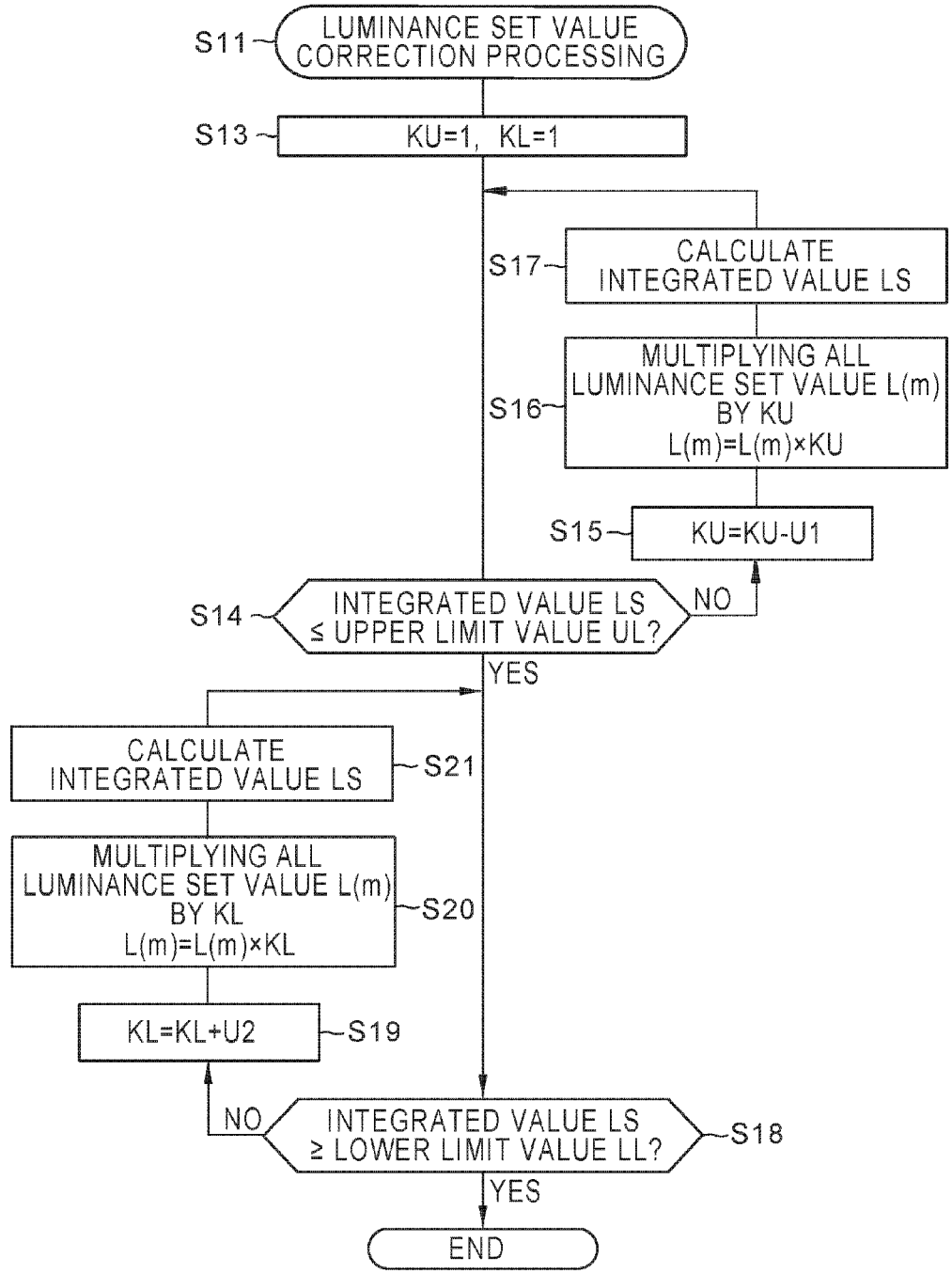
FIG. 9 is a flow chart showing a flow of correction processing of a luminance set value of the first embodiment.

As shown in FIG. 9, when the correction processing is started, each of the coefficient KU and the coefficient KL are set at "1" (step S13). The luminance control unit 51 determines whether the integrated value LS is equal to or less than the upper limit value UL (LS≤UL) (step S14). If the integrated value LS is larger than the upper limit value UL (NO in step S14), the luminance control unit 51 applies the KU multiplication processing to each of the luminance set values L(m), that is multiplies each of the luminance set values L(m) by the coefficient KU (KU=(1−U1), or KU<1) (step S15 and step S16).

Subsequently, the luminance control unit 51 acquires a new integrated value LS of each of the luminance set values L(m) to which the KU multiplication processing has been applied (step S17). If the new integrated value LS is still larger than the upper limit value UL (NO in step S14), the luminance control unit 51 performs the subtraction processing of subtracting the fixed value U1 from the coefficient KU above (KU=KU−U1) (step S15). After the subtraction processing, the luminance control unit 51 applies the KU multiplication processing to each of the luminance set values L(m) to which the KU multiplication processing is previously applied, that is multiplies each of the luminance set values L(m) by a new coefficient KU (step S16).

In like manner, until the integrated value LS becomes equal to or less than the upper limit value UL (LS≤UL) (YES in step S14), each processing of step S15 to step S17 (the subtraction processing, the KU multiplication processing, and the integrated value calculation processing) is repeatedly performed.

If it is determined as YES in step S14, the luminance control unit 51 determines whether the integrated value LS is equal to or more than the lower limit value LL (LS≥LL) (step S18). If the integrated value LS is smaller than the lower limit value LL (NO in step S18), the luminance control unit 51 applies the KL multiplication processing to each of the luminance set values L(m), that is multiplies each of the luminance set values L(m) by the coefficient KL (KL=(1+U2), or KL>1) (step S19 and step S20).

Subsequently, the luminance control unit 51 acquires a new integrated value LS of each of the luminance set values L(m) to which the KL multiplication processing has been applied (step S21). If the new integrated value LS is still smaller than the lower limit value LL (NO in step S18), the luminance control unit 51 performs the addition processing of adding the fixed value U2 to the coefficient KL above (KL=KL+U2) (step S19). After the addition processing, the luminance control unit 51 applies the KL multiplication processing to each of the luminance set values L(m) to which the KL multiplication processing is previously applied, that is multiplies each of the luminance set values L(m) by a new coefficient KL (step S20).

In like manner, until the integrated value LS becomes equal to or more than the lower limit value LL (LS≥LL) (YES in step S18), each processing of step S19 to step S21 (the addition processing, the KL multiplication processing, and the integrated value calculation processing) is repeatedly performed. At the time, since the fixed value U2 is set to be smaller than the fixed value U1, the integrated value LS, to which the KL multiplication processing has been applied, does not exceed the upper limit value UL.

As above, in the present embodiment, each of the luminance set values L(m) is multiplied by the integrated value LS corresponding to the first integrated value (the statistic of video signal levels) of the present invention, and by the coefficient KU determined on the basis of a result of comparison between the upper limit value UL and the lower limit value LL so that the integrated value LS is corrected to be within the threshold value 53.

If it is determined as YES in step S18, correction processing of each of the luminance set values L(m) is ended. The luminance control unit 51 outputs each of the corrected luminance set values L(m) to the backlight control unit 46.

Returning to FIG. 8, the LCD panel control unit 45 controls transmittance of each of pixels of the LCD panel 18 on the basis of the image data D(m) to which the gradation correction has been applied. In addition, the backlight control unit 46 controls backlight luminance of each of the illumination units 23(m) of the backlight unit 20 on the basis of each of the corrected luminance set values L(m). Accordingly, an image based on the image data 35 is displayed in a display area of the LCD panel 18 (step S22).

When selection operation of new image data 35 (such as display switching operation) is performed in the operation unit 15 or the operation panel 19 (YES in step S23), the processing of each of step S1 to step S22 described before is repeatedly performed so that an image based on the new image data 35 is displayed. In addition, when operation of slide show display is performed in the operation unit 15 or the like, the processing of each of step S1 to step S22 described before is repeatedly performed at a fixed time interval.

(Operation and Effect of First Embodiment)

As above, in the present invention, the integrated value LS of the luminance set value L(m) of each of the segment areas 22(m) is acquired, and each of the luminance set values L(m) is corrected so that the integrated value LS becomes within the preset threshold value 53. As a result, it is possible to acquire a clear display image without reducing a contrast ratio.

For example, in general, in an image at a high APL, an upper limit of a peak of display luminance at which a user H feels glare is 1000 cd/m² or less (in a case where the APL is 100%). However, as described before, in a case where an image at a low APL (such as an image in which the moon or a star is displayed in a part of the night sky) is displayed, even if display luminance of a bright section (such as the moon or the star) in the display image is equal to or more than 1000 cd/m², the user H does not feel glare. Thus, if the integrated value LS is controlled to be within the threshold value 53 like the present embodiment shown in a portion (A) of FIG. 10, luminance of a display image decreases to a level at which the user H does not feel glare, as well as display luminance of a bright section (backlight luminance) is maintained at a high level. In addition, in a dark section of the display image, the backlight luminance decreases, so that a misadjusted black level is prevented. As a result, a contrast ratio of the display image increases to improve image quality. In the portion (A) of FIG. 10, a "dotted line" shows a state before correction, as well as a "solid line" shows a stare after the correction.

On the other hand, in a portion (B) of FIG. 10 showing a comparative example, if an upper limit value and a lower limit value of display luminance (backlight luminance) of each of segment areas 22(m) are set like PTL 2 described before, backlight luminance of a bright section becomes equal to or less than the upper limit value in a case where particularly an image at a low APL is displayed. As a result, a contrast ratio of a display image decreases to degrade image quality of the display image.

As compared with the comparative example above, in the present invention, the integrated value LS is controlled to be within the threshold value 53 so that it is possible to display a clear image suitable for viewing without making a viewer feel the image to be glaring. In addition, the lower limit value LL is set to the integrated value LS to prevent a contrast ratio from decreasing to degrade image quality. Further, a control method of the present invention is simple to require no complicated calculation, so that high speed processing and low power consumption are possible.

Figure 11:
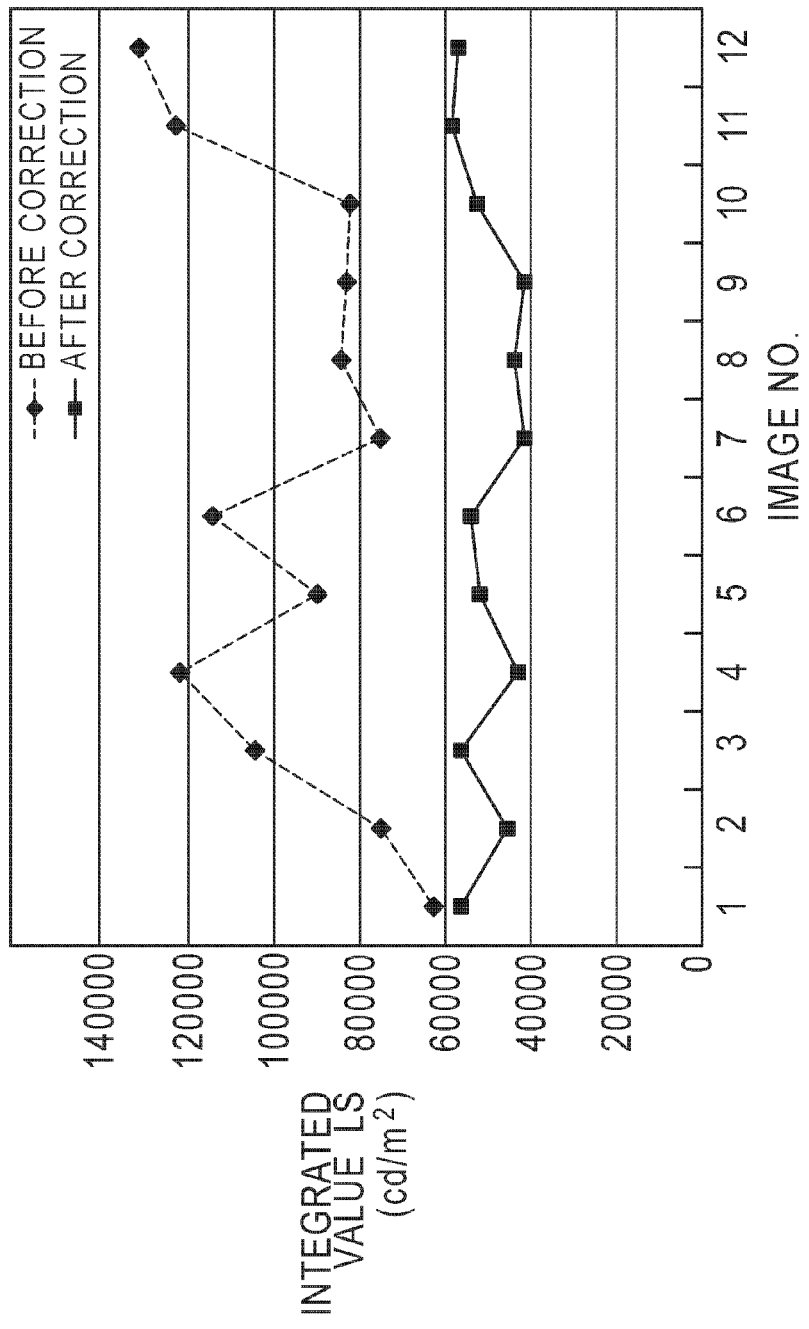
FIG. 11 is an illustration for describing an effect (low power consumption) of the correction processing of a luminance set value.

In addition, as shown in FIG. 11, in a case where an image based on a plurality of different kinds of (corresponding to respective image numbers in FIG. 11) image data 35 is sequentially displayed (such as slide show display), the present invention allows the integrated value LS to become a fixed value regardless of a kind of display image, thereby reducing fluctuations of the integrated value LS. Here, as the APL increases, the integrated value LS (before correction) increases. Accordingly, for example, since glare is felt to an image No. 4, each of the luminance set values L(m) is magnified by a uniform coefficient (for UL or LL) so that the image is reset to comfortable luminance. As a result, the integrated value LS becomes a value indicated as "after correction" in FIG. 11. In addition, similar resetting also allows the integrated value LS of another image to become within a fixed range. As a result, variation of power consumption of the backlight unit 20 for each of display images is reduced, so that power consumption is prevented from extremely differing depending on a kind of display image. Accordingly, since it is unnecessary to increase a power source in size to correspond to increase in power consumption, it is possible to prevent a rise in manufacturing costs as well as to reduce power consumption.

Second Embodiment

Configuration of Tablet Terminal of Second Embodiment

Figure 12:
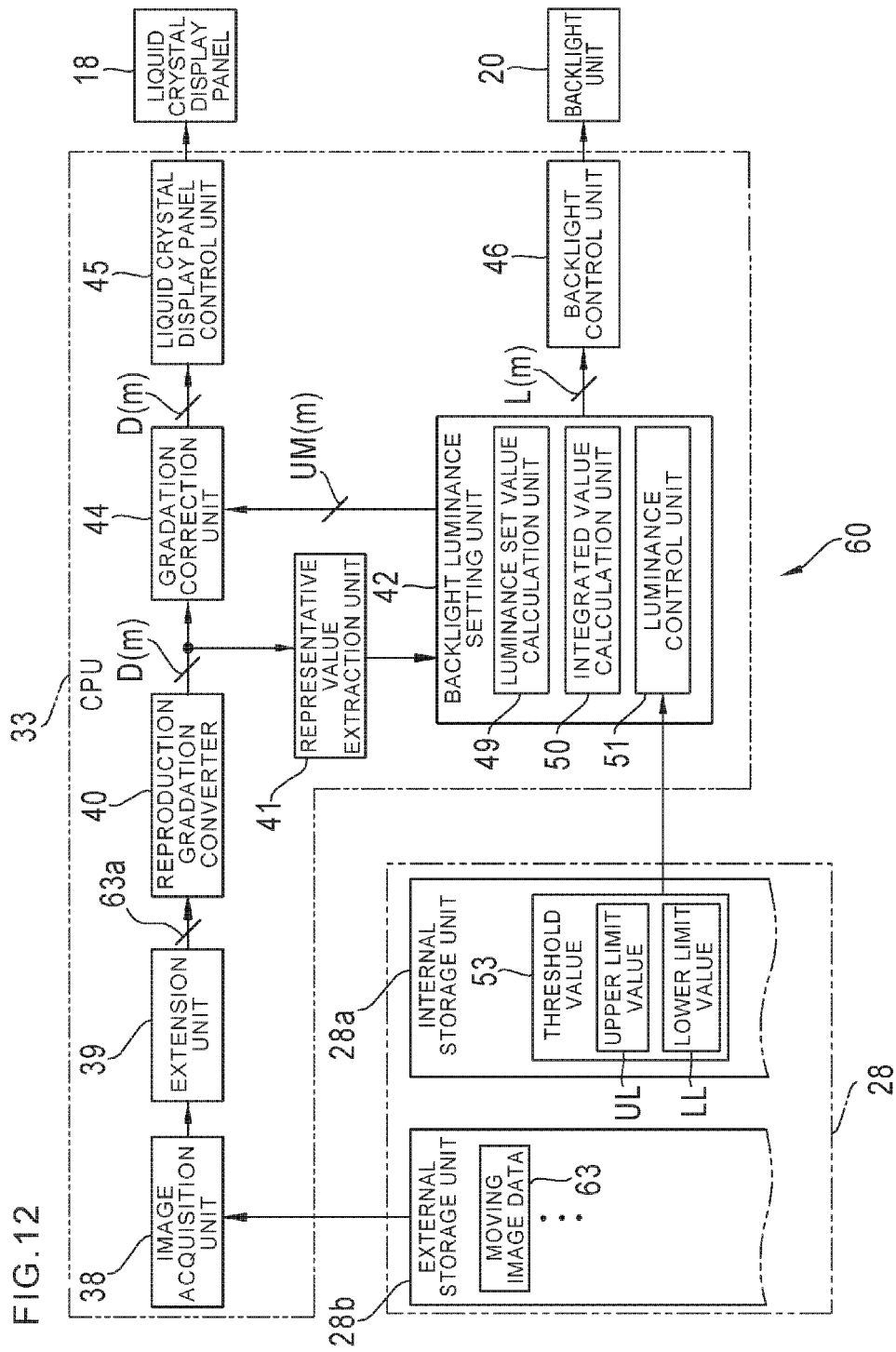
FIG. 12 is a functional block diagram of a CPU of a tablet terminal of a second embodiment.

Next, with reference to FIG. 12, a tablet terminal 60 of the second embodiment of the present invention will be described. In the first embodiment described above, although there has been described a case where a still image is displayed, the tablet terminal 60 has a function of displaying a moving image. The tablet terminal 60 has the essentially same configuration as that of the first embodiment except that the external storage unit 28b stores moving image data 63 previously acquired by the camera unit 16 and the wireless communication unit 25. Thus, a component having the same function and configuration as those of the first embodiment described above is designated by the same reference numeral as that of the first embodiment so that description of the component is appropriately omitted.

The image data acquisition unit 38 sequentially acquires (reads) each of frame image data sets 63a of the moving image data 63 selected in the operation unit 15 and the operation panel 19 from the external storage unit 28b and outputs each of the frame image data sets 63a to the extension unit 39. The extension unit 39 applies extension processing to each of the frame image data sets 63a of the moving image data 63, and then outputs each of the frame image data sets 63a, to which the extension processing has been applied, to the reproduction gradation converter 40 in order. The term "frame image" referred here indicates one frame image of a moving image.

The reproduction gradation converter 40 applies the reproduction gradation conversion processing to the frame image data 63a received from the extension unit 39. Then, the reproduction gradation converter 40 divides the frame image data 63a, to which the reproduction conversion processing has been applied, for each of the segment areas 22(m), and sequentially outputs image data D(m) corresponding to each of the segment areas 22(m) to the gradation correction unit 44.

The representative value extraction unit 41 has the essentially same configuration as that of the first embodiment except that the representative value Ip(m) is extracted from the image data D(m) composed of divided frame image data sets 63a.

As with the first embodiment, the backlight luminance setting unit 42 acquires a luminance set value L(m) for each of the segment areas 22(m), and an integrated value LS of each of the luminance set values L(m), and then corrects each of the luminance set values L(m) on the basis of the integrated value LS. Each of the corrected luminance set values L(m) is output to the backlight control unit 46.

As with the first embodiment, the gradation correction unit 44 applies the gradation correction processing to each of the image data sets D(m) received from the reproduction gradation converter 40, and outputs each of the image data sets D(m), to which the gradation correction processing has been applied, to the LCD panel control unit 45.

(Operation of Second Embodiment (Display Control Processing on Moving Image))

With reference to the flow chart shown in FIG. 13, operation of the tablet terminal 60 having the configuration above, particularly display control processing on a moving image, will be described. After operation of starting displaying a moving image is performed in the operation unit 15 or the operation panel 19, if operation of displaying a list of moving image data 63 is performed, the list of the moving image data 63 stored in the external storage unit 28b is displayed in a display area of the liquid crystal display unit 12.

Subsequently, when selection operation of the moving image data 63 is performed in the operation unit 15 or the operation panel 19, the image data acquisition unit 38 acquires the moving image data 63 corresponding to the selection operation from the external storage unit 28b, and outputs the moving image data 35 to the extension unit 39 (step S1-1). The extension unit 39 applies the extension processing to each of the frame image data sets 63a constituting the moving image data 63, and then the reproduction gradation converter 40 applies the reproduction conversion processing to each of the frame image data sets 63a. Subsequently, display control processing on first frame image data 63a (gradation correction, and setting of backlight luminance) is started (step S2-1 and step S2-2).

First, the reproduction gradation converter 40 outputs image data D(m) on each of the segment areas 22(m) of the first frame image data set 63a to the gradation correction unit 44. Then, as with the first embodiment, the following is performed: extraction of the representative value Ip(m); calculation of the luminance set value L(m); calculation of the integrated value LS; gradation correction of the image data D(m); and correction of the luminance set value L(m) (from step S3 to step S21). Accordingly, a first frame image based on the first frame image data set 63a is displayed in the display area of the LCD panel 18 (step S29).

In like manner, a second frame image and each of subsequent frame images are similarly, continuously displayed in the display area of the LCD panel 18 (NO in step S30, and step S31).

At the time, as shown in FIG. 14, during a vertical blanking interval between each of the frame image data sets 63a ("input image" in FIG. 14), to be input into the CPU 33, calculation SA of each of the luminance set values L(m), gradation correction SB, and correction SC of each of the luminance set values L(m) are performed with respect to a previous frame image data set 63a. For example, during a vertical blanking interval between the n-th (n is any natural number) frame image data 63a and the (n+1)-th frame image data set 63a, to be input into the CPU 33, each processing of SA to SC is performed with respect to the n-th frame image data set 63a. Then, after the correction SC, the n-th frame image based on the n-th frame image data set 63a is displayed ("display image" in FIG. 14).

Returning to FIG. 13, after all frame images are displayed (YES in step S30, and step S31), if selection operation of new moving image data 63 is performed in the operation unit 15 or the operation panel 19 (YES in step S32), the processing of each step described before is repeatedly performed. Accordingly, a moving image based on the new moving image data 63 is displayed.

(Operation and Effect of Second Embodiment)

In the tablet terminal 60 of the second embodiment, since each processing as with the first embodiment is performed for each of the frame image data sets 63a of the moving image data 63, it is possible to acquire the same effect as that described in the first embodiment.

In addition, as shown in FIG. 15, the integrated value LS of each of the frame image data sets 63a can be set within a fixed range. Heretofore, it is required that a scene change is predicted in accordance with an APL for each of the frame image data sets 63a to change a contrast ratio and brightness of each of the frame image data sets 63a before and after the scene change, however, this kind of processing becomes unnecessary in the second embodiment. As a result, high speed processing is possible.

Third Embodiment

Configuration of Tablet Terminal of Third Embodiment

Figure 16:
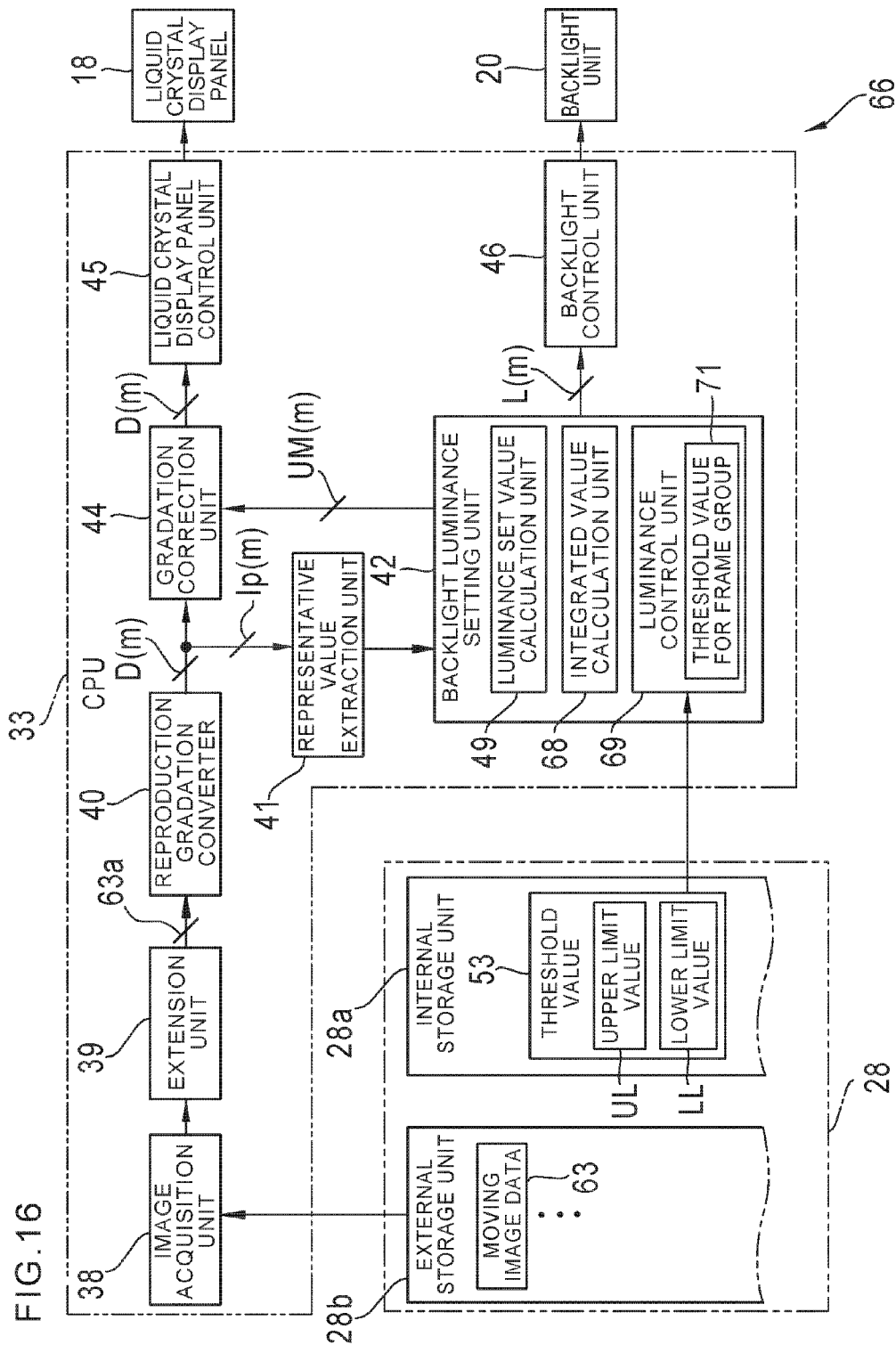
FIG. 16 is a functional block diagram of a CPU of a tablet terminal of a third embodiment.

Next, with reference to FIG. 16, a tablet terminal 66 of the third embodiment of the present invention will be described. In the second embodiment described above, when a moving image is displayed, each of the luminance set values L(m) is corrected for every frame image data 63a. Thus, there is a possibility that fluctuations of backlight luminance between frame images increase to cause a flicker to occur in a moving image. In addition, if each of the luminance set values L(m) is corrected for every frame image, a calculation load of the CPU 33 increased. Because of this, in the tablet terminal 66, each of the luminance set values L(m) is corrected for each of a plurality of frame groups FG into which the respective frame image data sets 63a of the moving image data 63 are divided (refer to FIG. 19).

The tablet terminal 66 has the essentially same configuration as that of the second embodiment except that the backlight luminance setting unit 42 is provided with an integrated value calculation unit 68 and a luminance control unit 69 that are different from those of the second embodiment. Thus, a component having the same function and configuration as those of the second embodiment described above is designated by the same reference numeral as that of the second embodiment so that description of the component is appropriately omitted.

When a still image is displayed, the integrated value calculation unit 68 performs the same processing as that performed by the luminance set value calculation unit 49 described before. On the other hand, when a moving image is displayed, the integrated value calculation unit 68 calculates an integrated value LSa by adding up the luminance set value L(m) of each of the segment areas 22(m) calculated by the luminance set value calculation unit 49 in units of a frame group FG. The integrated value LSa corresponds to the second integrated value (the statistic of video signal levels of image data) of the present invention.

When a still image is displayed, the luminance control unit 69 performs the same processing as that performed by the luminance control unit 51 described before. On the other hand, when a moving image is displayed, the luminance control unit 69 performs first determination processing of determining a threshold value for a frame group (second threshold value) 71 for determining a range of the integrated value LSa, and first correction processing of correcting each of the luminance set values L(m) of a frame group FG.

The threshold value 71 for a frame group defines a range of the integrated value LSa, capable of displaying a clear image suitable for viewing without allowing a user to feel glare, or an upper limit value ULa and a lower limit value LLa of the range. In the first determination processing, the luminance control unit 69 determines the upper limit value ULa and the lower limit value LLa (refer to FIG. 18) on the basis of the upper limit value UL and the lower limit value LL of the threshold value 53, described before, and the number of the frame image data sets 63a constituting the frame group FG (or the number of frames). For example, in a case where: the number of frames of the frame group FG is indicated as "k+1"; the upper limit value UL is set at 5600 cd/m$^2$; and the lower limit value LL is set at 3800 cd/m$^2$, the upper limit value ULa and the lower limit value LLa are indicated as "5600×(k+1)" and "3800×(k+1)", respectively.

The number of frames of the frame group FG can be set in the operation unit 15 or the operation panel 19. In addition, if the number of frames of the frame group FG is a fixed value, the first determination processing may be eliminated by previously storing also the upper limit value ULa and the lower limit value LLa in the internal storage unit 28a.

In the first correction processing, in a case where the integrated value LSa is larger than the upper limit value ULa (LSa>ULa), the luminance control unit 69 performs the KU multiplication processing with respect to each of the luminance set values L(m) of the frame group FG before correction, and the subtraction processing with respect to the coefficient KU. In addition, whenever the KU multiplication processing is performed, the luminance control unit 69 acquires a new integrated value LSa, and performs subsequent KU multiplication processing if this integrated value LSa is larger than the upper limit value ULa. Then, the luminance control unit 69 repeatedly performs the KU multiplication processing and the subtraction processing until the integrated value LSa becomes equal to or less than the upper limit value ULa (LSa≤ULa).

On the other hand, in a case where the integrated value LSa is smaller than the lower limit value LLa (LSa<LLa), the luminance control unit 69 performs the KL multiplication processing with respect to each of the luminance set values L(m) of the frame group FG before the correction, and the addition processing with respect to the coefficient KL. In addition, whenever the KL multiplication processing is performed, the luminance control unit 69 acquires a new integrated value LSa for each of the luminance set values L(m) to which the KL multiplication processing has been applied, and performs subsequent KL multiplication processing if this integrated value LSa is smaller than the lower limit value LLa. Then, the luminance control unit 69 repeatedly performs the KL multiplication processing and the addition processing until the integrated value LSa becomes equal to or more than the lower limit value ULa (LSa≥ULa).

(Operation of Third Embodiment (Display Control Processing on Moving Image))

Figure 17:
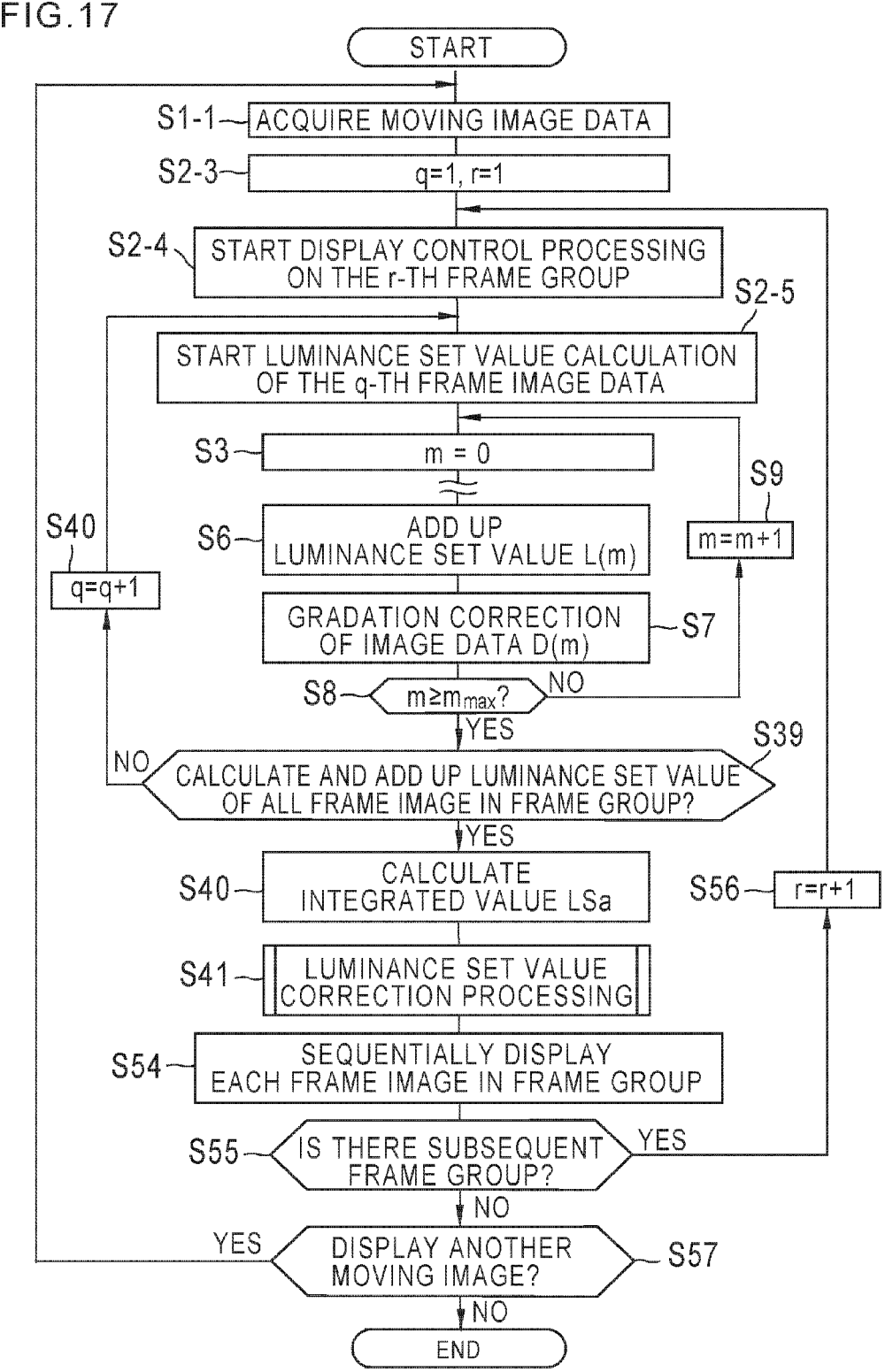
FIG. 17 is a flow chart showing a flow of display control processing of the third embodiment.

With reference to the flow chart shown in FIG. 17, operation of the tablet terminal 60 having the configuration above, particularly display control processing on a moving image, will be described. As with the second embodiment described before, when the processing up to step S1-1 is completed, the extension unit 39 performs the extension processing on each of the frame image data sets 63*a* constituting the moving image data 63, and then the reproduction gradation converter 40 performs the reproduction conversion processing on the frame image data sets 63*a*. Subsequently, the display control processing starts being applied to the frame image data sets 63*a* belonging to a first frame group FG among the respective frame image data sets 63*a* (step S2-3, and step S2-4).

First, with respect to the first frame image data sets 63*a* belonging to the first frame group FG, calculation and addition of the luminance set value L(m) for each of the segment areas 22(*m*), and the gradation correction of the image data D(m) are performed (step S2-5, and step S3 to step S9) as with the first embodiment described before.

Likewise, with respect to other frame image data sets 63*a* belonging to the first frame group FG, the calculation and the addition of the luminance set value L(m) for each of the segment areas 22(*m*), and the gradation correction processing of each of the image data sets D(m) are performed (NO in step S39, and step S40). Each of the image data sets D(m) (each of the frame image data sets 63*a*), to which the gradation correction processing has been applied, is stored in a frame memory or the like.

When the calculation and the addition of the luminance set value L(m) of all of the frame image data sets 63*a* belonging to the first frame group FG are completed (YES in step S39), the integrated value calculation unit 68 calculates the integrated value LSa of the luminance set values L(m) in units of a frame group FG (step S40).

(Luminance Set Value Correction Processing)

After the integrated value calculation unit 68 calculates the integrated value LSa, the luminance control unit 69 starts correction processing for each of the luminance set values L(m) (step S41).

Figure 18:
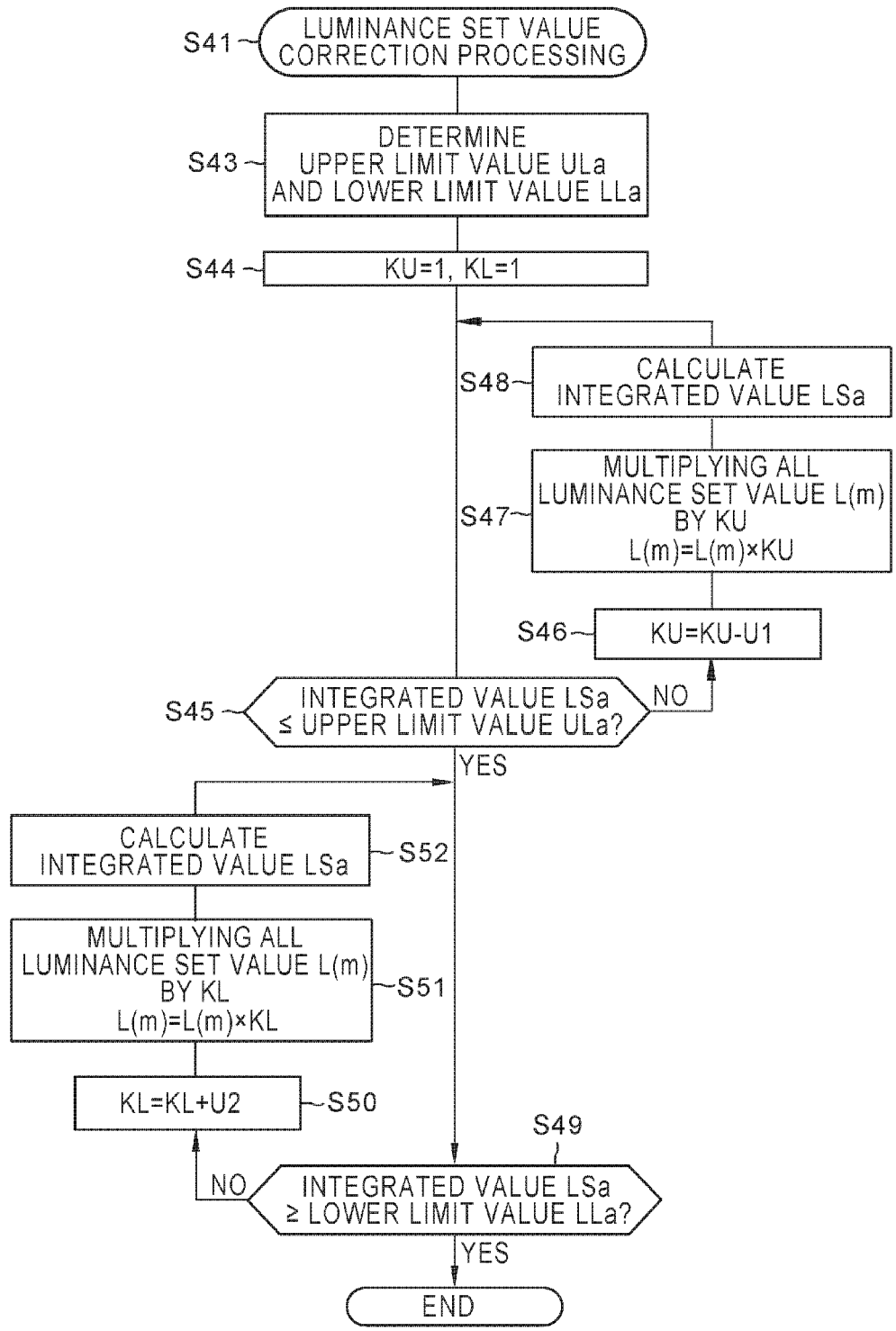
FIG. 18 is a flow chart showing a flow of correction processing of a luminance set value of the third embodiment.

As shown in FIG. 18, the luminance control unit 69 determines the upper limit value ULa and the lower limit value LLa of the threshold value 71 for a frame group on the basis of the number of frames of the first frame group FG, and the upper limit value UL and the lower limit value LL of the threshold value 53 in the internal storage unit 28*a* (first determination processing in step S43).

After the first determination processing, the luminance control unit 69 starts the first correction processing. In this case, each of the coefficient KU and the coefficient KL are set at "1" (step S44). The luminance control unit 69 determines whether the integrated value LSa is equal to or less than the upper limit value ULa (LSa≤ULa) (step S45). If the integrated value LSa is larger than the upper limit value ULa (NO in step S45), the luminance control unit 69 performs the subtraction processing with respect to the coefficient KU, and the KU multiplication processing with respect to each of the luminance set values L(m) (step S46 and step S47).

Subsequently, the luminance control unit 69 acquires a new integrated value LSa of each of the luminance set values L(m) to which the KU multiplication processing has been applied (step S48). Hereinafter, the luminance control unit 69 repeatedly performs each of processing of step S46 to step S48 until the integrated value LSa becomes equal to or less than the upper limit value ULa (LSa≤ULa) (YES in step S45).

If it is determined as YES in step S45, the luminance control unit 69 determines whether the integrated value LSa is equal to or more than the lower limit value LLa (LSa≥LLa) (step S49). If the integrated value LSa is smaller than the lower limit value LLa (NO in step S49), the luminance control unit 69 performs the addition processing with respect to the coefficient KL, and the KL multiplication processing with respect to each of the luminance set values L(m) (step S50 and step S51).

Subsequently, the luminance control unit 69 acquires a new integrated value LSa of each of the luminance set values L(m) to which the KL multiplication processing has been applied (step S52). Hereinafter, the luminance control unit 69 repeatedly performs each of processing of step S50 to step S52 until the integrated value LSa becomes equal to or more than the lower limit value LLa (LSa≥LLa) (YES in step S49).

If it is determined as YES in step S49, the correction processing of each of the luminance set values L(m) in the first frame group FG is ended. The luminance control unit 69 outputs each of the corrected luminance set values L(m) to the backlight control unit 46 in numerical order of frames.

Returning to FIG. 17, the LCD panel control unit 45 reads out each of the image data sets D(m), to which the gradation correction processing has been applied, from the frame memory in numerical order of frames, to control transmittance of each of pixels of the LCD panel 18 on the basis of each of the image data sets D(m) for every frame. In addition, the backlight control unit 46 controls backlight luminance of the backlight unit 20 on the basis of each of the luminance set values L(m) received from the luminance control unit 69 in numerical order of frames. Accordingly, a frame image based on each of the frame image data sets 63*a* of the first frame group FG is sequentially displayed in a display area of the LCD panel 18 (step S54).

In like manner, display control processing identical with the display control processing on the first frame group FG described above is applied to also other frame groups FG (YES in step S55, and step S56). Accordingly, a moving image based on the moving image data 63 is displayed.

If selection operation of new moving image data 63 is performed in the operation unit 15 or the operation panel 19 (YES in step S57), the processing of each step described before is repeatedly performed. Accordingly, a moving image based on the new moving image data 63 is displayed.

Figure 19:
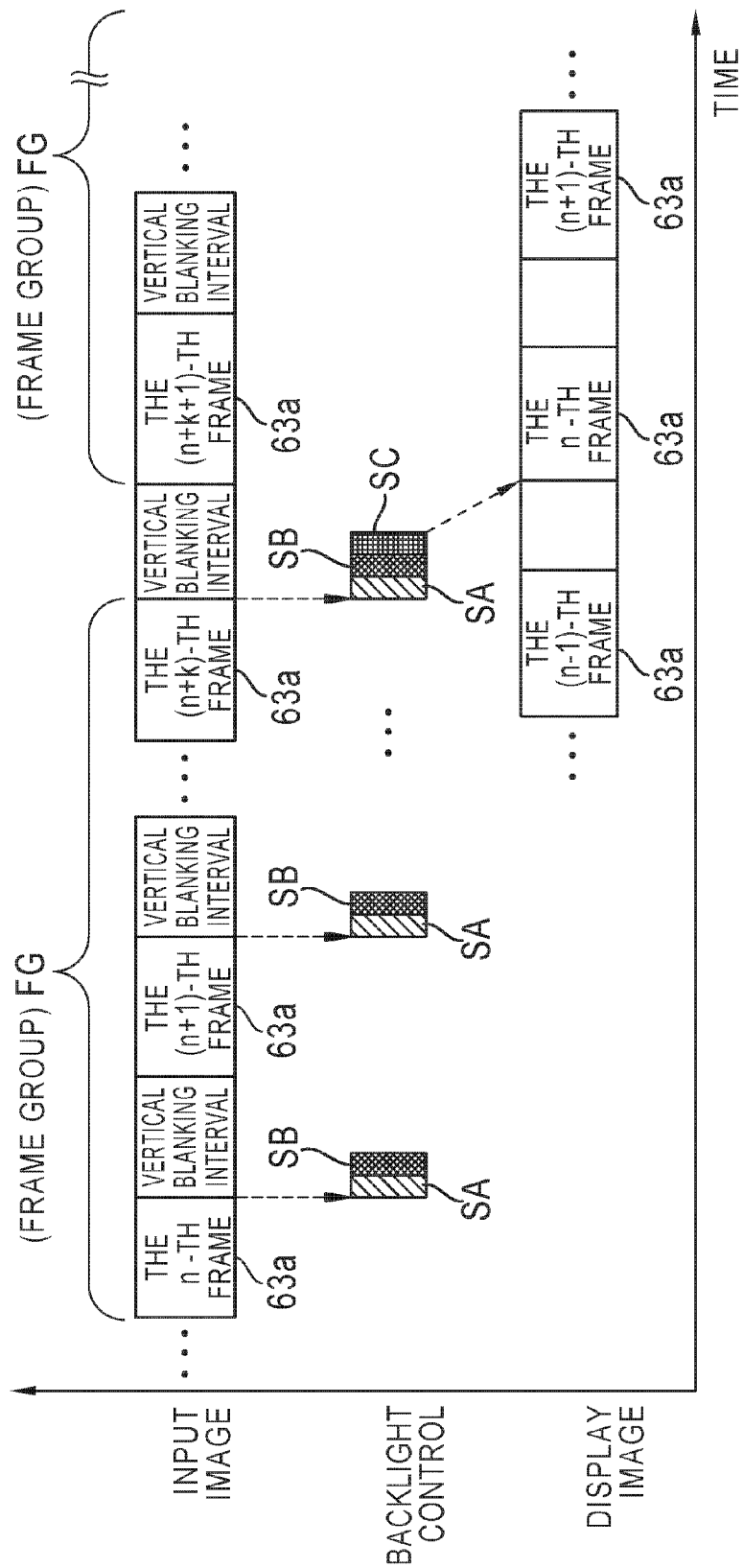
FIG. 19 is an illustration for describing timing of calculation, integration, and correction, of a luminance set value when a moving image is displayed in the third embodiment.

As shown in FIG. 19, in the third embodiment, during a vertical blanking interval between each of the frame image data sets 63*a* ("input image" in FIG. 19) in the frame group FG, the calculation SA of each of the luminance set values L(S) and the gradation correction SB are performed with respect to a previous frame image data set 63*a*. In addition, during a vertical blanking interval between each of the frame groups FG, not only the calculation SA of each of the luminance set values L(S) and the gradation correction SB, but also correction SC of each of the luminance set values L(m) in a previous frame group is performed. Then, after the correction SC, a frame image based on each of the frame image data sets 63a in the previous frame group FG is displayed.

(Operation and Effect of Third Embodiment)

In the tablet terminal 66 of the third embodiment, since each of the luminance set values L(m) is corrected for every frame group, a flicker of a moving image is reduced as compared with the second embodiment in which each of the luminance set values L(m) is corrected for every frame image. In addition, it is possible to reduce a calculation load of the CPU 33.

Fourth Embodiment

Configuration of Tablet Terminal of Fourth Embodiment

Figure 20:
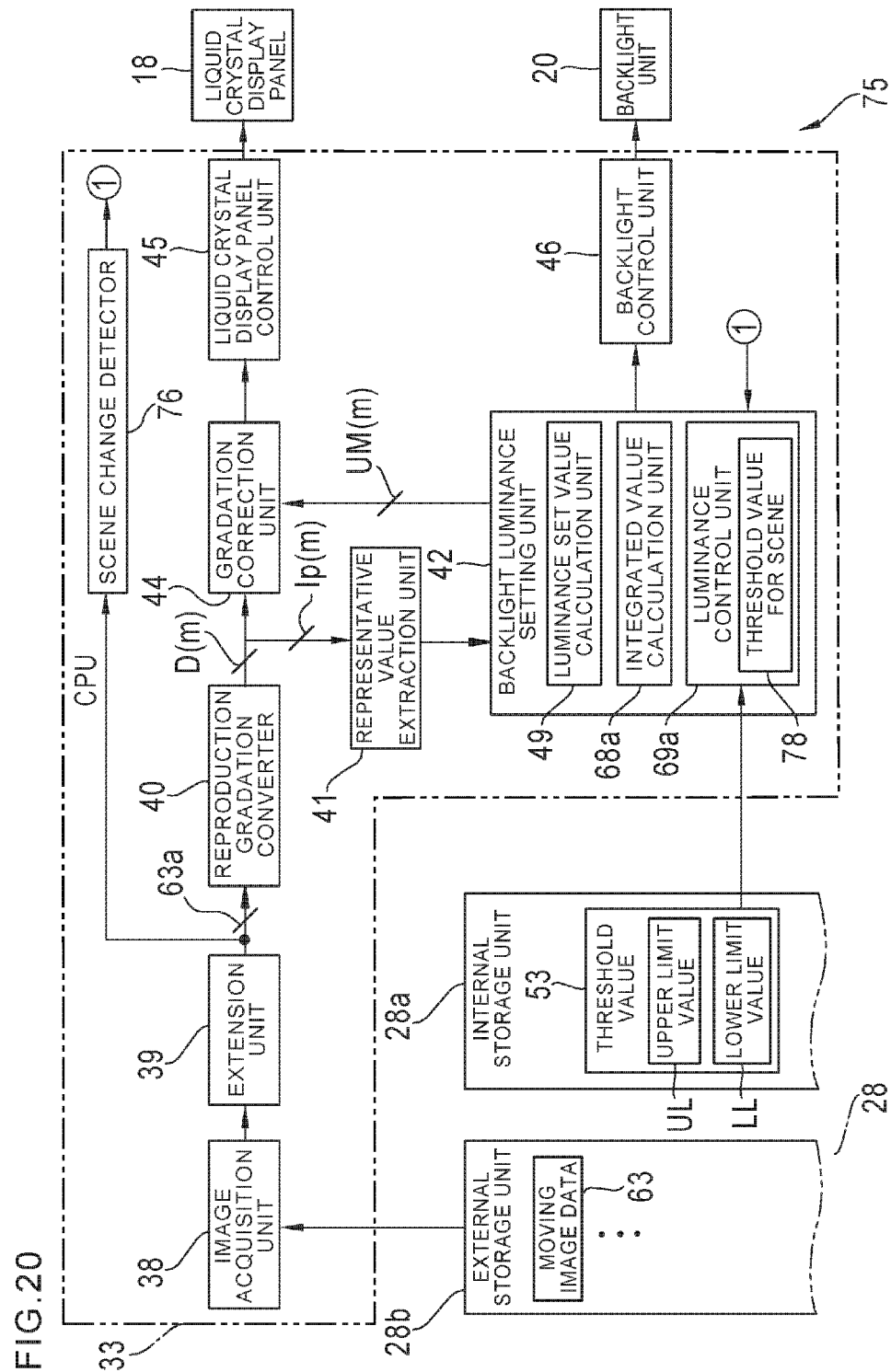
FIG. 20 is a functional block diagram of a CPU of a tablet terminal of a fourth embodiment.

Next, with reference to FIG. 20, a tablet terminal 75 of the fourth embodiment of the present invention will be described. In the third embodiment described above, if a scene change (such as a change from an image of a dark portion to an image of a bright portion) occurs in the frame group FG, uniform correction is applied to each of luminance set values L(m) acquired from frame image data 63a on a different scene (pattern). As a result, there is a possibility that optimum correction may not be applied to the luminance set values L(m). Thus, in the tablet terminal 75, each of the luminance set values L(m) is corrected every scene in the frame group FG, or in units of a scene. Each scene includes one or more frame image data sets 63a.

The tablet terminal 75 has the essentially same configuration as that of the third embodiment except that the CPU 33 serves as a scene change detector 76, and the backlight luminance setting unit 42 is provided with an integrated value calculation unit 68a and a luminance control unit 69a. Thus, a component having the same function and configuration as those of the third embodiment described above is designated by the same reference numeral as that of the third embodiment so that description of the component is appropriately omitted.

The scene change detector 76 extracts the amount of characteristic and luminance distribution of an image from the frame image data 63a sequentially output from the extension unit 39 to detect whether a scene change has occurred between two continuous frame image data sets 63a or not on the basis of the extraction result. Accordingly, it is possible to detect an occurrence of a scene change in the frame group FG. A detection method of a scene change and detection timing thereof are not particularly limited, and public known various types of a method and timing may be applicable. For example, APLs of respective two continuous frame image data sets 63a are calculated so that it is determined whether a difference between the APLs exceeds a preset threshold value or not. As a result, it is possible to detect whether there is an occurrence of a scene change (refer to FIG. 36). The detection result of a scene change by the scene change detector 76 is input into the backlight luminance setting unit 42.

The integrated value calculation unit 68a is essentially identical with the integrated value calculation unit 68 of the third embodiment described before. In a case where a scene change is detected in the frame group FG, differently from the third embodiment, the integrated value calculation unit 68a adds up each of the luminance set values L(m) in units of a scene to calculate an integrated value LSb corresponding to the third integrated value (a statistic of video signal levels of image data) of the present invention.

For example, a case where the frame group FG is composed of the n-th frame image data set 63a, the (n+1)-th frame image data set 63a, ..., and the (n+k)-th frame image data set 63a, and where a scene change has occurred between the (n+1)-th frame image data set 63a and the (n+2)-th frame image data set 63a, will be described. In this case, the integrated value calculation unit 68a adds up values of each of the luminance set values L(m) corresponding to the n-th frame image data set 63a to each of the luminance set values L(m) corresponding to the (n+1)-th frame image data set 63a to calculate the integrated value LSb. Subsequently, the integrated value calculation unit 68a adds up values of each of the luminance set values L(m) corresponding to the (n+2)-th frame image data set 63a to each of the luminance set values L(m) corresponding to the (n+k)-th frame image data set 63a to calculate the integrated value LSb.

The luminance control unit 69a is essentially identical with the luminance control unit 69a of the third embodiment described before. In a case where a scene change is detected in the frame group FG, differently from the third embodiment, the luminance control unit 69a corrects each of the luminance set values L(m) in units of a scene. Specifically, the luminance control unit 69a performs second determination processing of determining a threshold value for a scene (third threshold value) 78 for determining a range of the integrated value LSb, and second correction processing of correcting each of the luminance set values L(m) in units of a scene.

Figure 22:
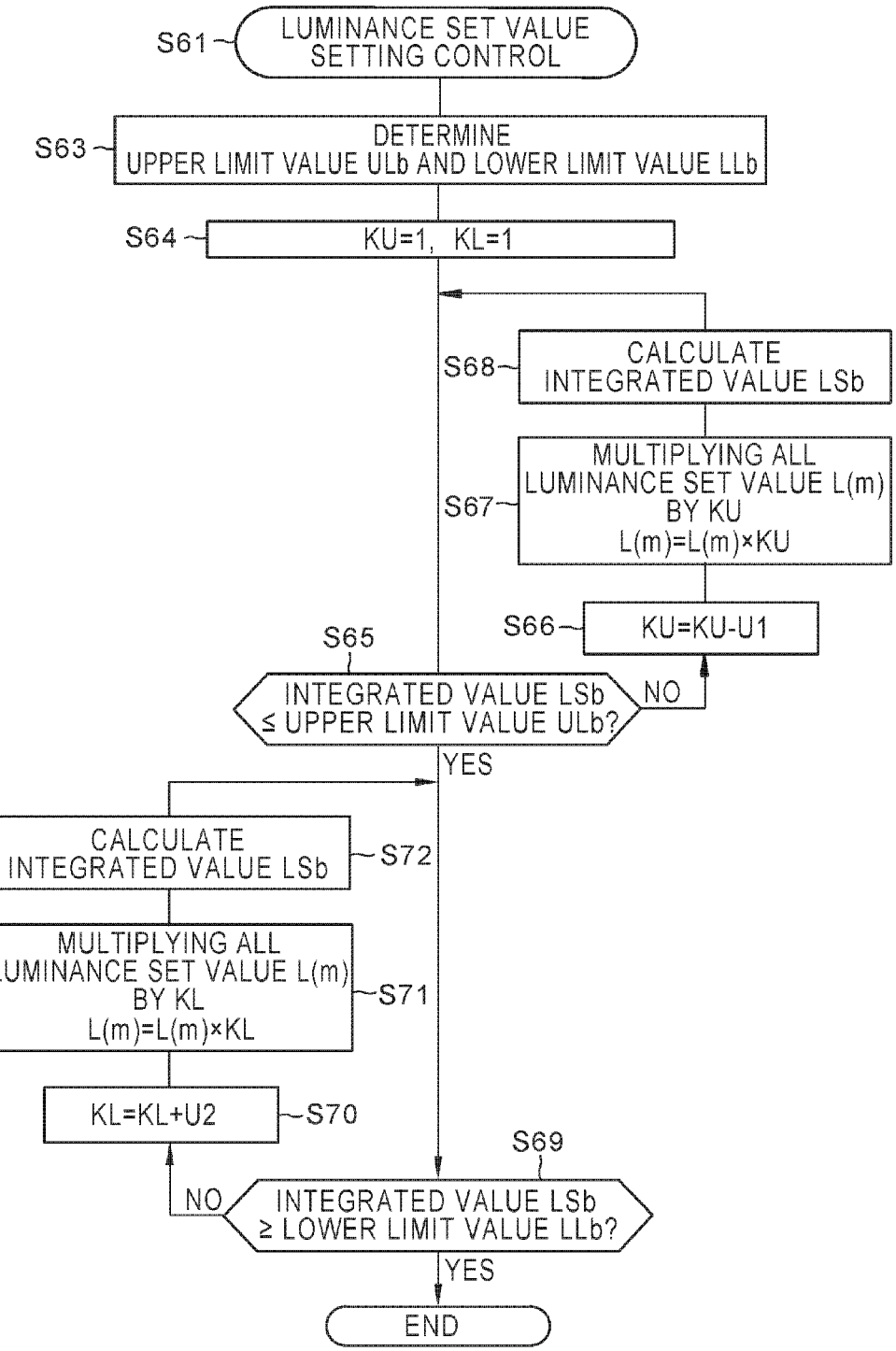
FIG. 22 is a flow chart showing a flow of correction processing of a luminance set value of the fourth embodiment.

The threshold value 78 for a scene defines a range of the integrated value LSb, capable of displaying a clear image suitable for viewing without allowing a user to feel glare, or an upper limit value ULb and a lower limit value LLb of the range (refer to FIG. 22). In the second determination processing, the luminance control unit 69a determines the upper limit value ULb and the lower limit value LLb on the basis of the upper limit value UL and the lower limit value LL of the threshold value 53 described before, and the number of frames for every scene. Specifically, the upper limit value ULb is expressed as follows: "the upper limit value UL×(the number of frames of a scene)", and the lower limit value LLb is expressed as follows: "the lower limit value LL×(the number of frames of a scene)".

In the second correction processing, in a case where the integrated value LSb is larger than the upper limit value ULb (LSb>ULb), the luminance control unit 69a repeatedly performs the KU multiplication processing and the subtraction processing until the integrated value LSb becomes equal to or less than the upper limit value ULb (LSb≤ULb).

On the other hand, in a case where the integrated value LSb is smaller than the lower limit value LLb (LSb<LLb), the luminance control unit 69a repeatedly performs the KL multiplication processing and the addition processing until the integrated value LSb becomes equal to or more than the lower limit value LLb (LSb≥LLb).

(Operation of Fourth Embodiment (Display Control Processing on Moving Image))

Figure 21:
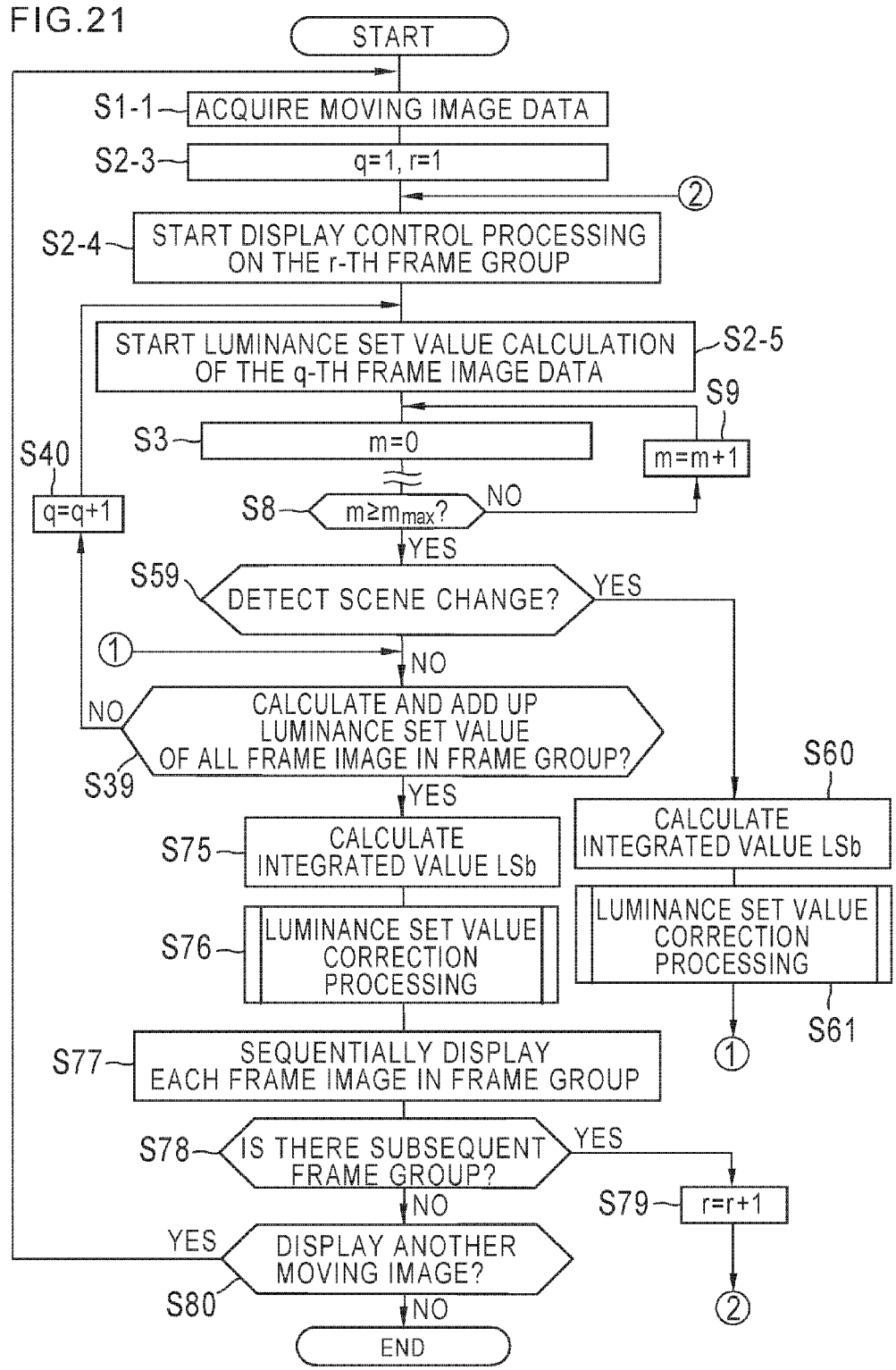
FIG. 21 is a flow chart showing a flow of display control processing of the fourth embodiment.

With reference to the flow chart shown in FIG. 21, operation of the tablet terminal 75 of the fourth embodiment, particularly display processing on a moving image, will be described. Since a flow of processing in a case where no scene change is detected in the frame group FG is the same as that of the third embodiment shown in FIGS. 17 and 18, hereinafter only a case where a scene change is detected will be described.

After the moving image data 63 is acquired (step S1-1), as with the third embodiment, calculation and addition of each of the luminance set values L(m) for every frame image data 63a belonging to the first frame group FG, and the gradation correction processing of each of image data sets D(m), are started (step S2-3 to step S2-5, and step S3 to step S9). In the fourth embodiment, the scene change detector 76 detects whether a scene change has occurred between each of the frame image data sets 63a or not to output the detection result to the backlight luminance setting unit 42.

In a case where a scene change is detected in the (n+2)-th frame image data set 63a, for example, the scene change detector 76 outputs the detection result to the backlight luminance setting unit 42 (YES in step S59).

The integrated value calculation unit 68a determines that frame image data of the first frame image data set 63a to the (n+1)-th frame image data set 63a, in the first frame group FG, belongs to the same scene on the basis of the detection result of the scene change detector 76. Subsequently, the integrated value calculation unit 68a adds up values of each of the luminance set values L(m) corresponding to the first frame image data set 63a to each of the luminance set values L(m) corresponding to the (n+1)-th frame image data set 63a to calculate the integrated value LSb (step S60). Then, the integrated value calculation unit 68a outputs the calculation result of the integrated value LSb to the luminance control unit 69a.

(Luminance Set Value Correction Processing)

After the integrated value calculation unit 68a calculates the integrated value LSb, the luminance control unit 69a starts correction processing for each of the luminance set values L(m) (step S61).

As shown in FIG. 22, the luminance control unit 69a counts the number of frames of the first frame image data set 63a to the (n+1)-th frame image data set 63a, or the number of frames of the same scene. Subsequently, the luminance control unit 69a determines the upper limit value ULb and the lower limit value LLb of the threshold value 78 for a scene on the basis of the number of frames of the same scene and the upper limit value UL and the lower limit value LL of the threshold value 53 stored in the internal storage unit 28a (second determination processing in step S63).

After the second determination processing, the luminance control unit 69a starts the second correction processing. In this case, each of the coefficient KU and the coefficient KL are set at "1" (step S64). If the integrated value LSb is larger than the upper limit value ULb (LSb>ULb), the luminance control unit 69a performs the subtraction processing with respect to the coefficient KU, and the KU multiplication processing with respect to each of the luminance set values L(m) of the same scene (step S65 to step S67). Subsequently, the luminance control unit 69a acquires a new integrated value LSb of each of the luminance set values L(m) to which the KU multiplication processing has been applied (step S68). Hereinafter, the luminance control unit 69a repeatedly performs each of processing of step S66 to step S68 until the integrated value LSb becomes equal to or less than the upper limit value ULb (LSb≤ULb).

Next, if the integrated value LSb is smaller than the lower limit value LLb (LSb<LLb), the luminance control unit 69a performs the addition processing with respect to the coefficient KL, and the KL multiplication processing with respect to each of the luminance set values L(m) of the same scene (step S69 to step S71). Subsequently, the luminance control unit 69a acquires a new integrated value LSb of each of the luminance set values L(m) to which the KL multiplication processing has been applied (step S72). Hereinafter, the luminance control unit 69a repeatedly performs each of processing of step S70 to step S72 until the integrated value LSb becomes equal to or more than the lower limit value LLb (LSb≥LLb).

If it is determined as YES in step S69, the correction processing of each of the luminance set values L(m) in the same scene is ended. The luminance control unit 69a outputs each of the corrected luminance set values L(m) to the backlight control unit 46 in numerical order of frames. The backlight control unit 46 temporarily stores each of the corrected luminance set values L(m).

Returning to FIG. 21, calculation and addition of each of the luminance set values L(m) of other frame image data sets 63a of the first frame group FG, and the gradation correction processing of the image data D(m), are performed (step S2-5, step S3 to step S9, NO in step S39, and step S40). In this case, if the scene change detector 76 detects a scene change (YES in step S59), the processing of step S63 to step S72 shown in FIG. 22 is performed again. In order to prevent description from being complicated, there is provided a description with the assumption that no scene change is detected between each of the other frame image data sets 63a (NO in step S59).

When the calculation and the addition of each of the luminance set values L(m) of other frame image data sets 63a of the first frame group FG, and the like are completed (YES in step S39), the integrated value calculation unit 68a starts operating. Then, the integrated value calculation unit 68a determines that the other frame image data sets 63a of the first frame group FG (from the (n+2)-th frame image data set 63a to the (n+k)-th frame image data set 63a) belong to the same scene. Subsequently, the integrated value calculation unit 68a adds up values of each of the luminance set values L(m) corresponding to the (n+2)-th frame image data set 63a to each of the luminance set values L(m) corresponding to the (n+k)-th frame image data set 63a to calculate the integrated value LSb (step S75). The calculation result of the integrated value LSb is input to the luminance control unit 69a.

After the integrated value calculation unit 68a calculates the integrated value LSb, the luminance control unit 69a restarts correction processing for each of the luminance set values L(m) (step S76). Accordingly, the processing of step S63 to step S72 shown in FIG. 22 is performed again to perform the correction processing of each of the luminance set values L(m) in a different scene from that in previous step S61. Each of the corrected luminance set values L(m) is also temporarily stored in the backlight control unit 46.

Next, the LCD panel control unit 45 controls transmittance of each of pixels of the LCD panel 18 on the basis of the image data set D(m) for each of frames of the first frame group FG. In addition, the backlight control unit 46 reads out each of the luminance set values L(m) previously stored, in numerical order of frames, to control backlight luminance of the backlight unit 20 on the basis of each of the luminance set values L(m). Accordingly, a frame image based on each of the frame image data sets 63a of the first frame group FG is sequentially displayed in a display area of the LCD panel 18 (step S77).

In like manner, display control processing identical with the display control processing on the first frame group FG described above is applied to also other frame groups FG (YES in step S78, and step S79). Accordingly, a moving image based on the moving image data 63 is displayed.

If selection operation of new moving image data 63 is performed in the operation unit 15 or the operation panel 19 (YES in step S80), the processing of each step described before is repeatedly performed. Accordingly, a moving image based on the new moving image data 63 is displayed.

Figure 23:
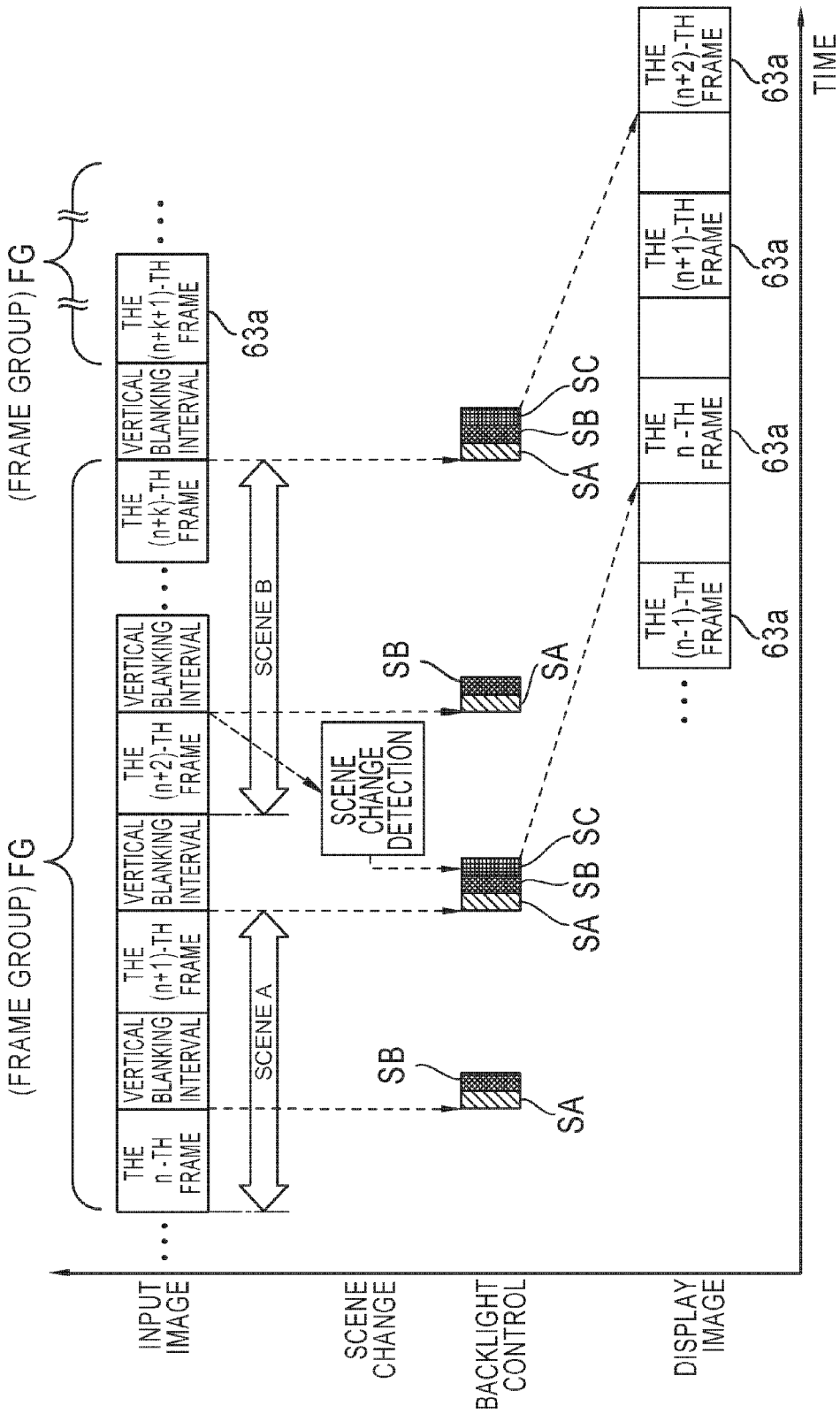
FIG. 23 is an illustration for describing timing of calculation, integration, and correction, of a luminance set value when a moving image is displayed in the fourth embodiment.

As shown in FIG. 23, in the fourth embodiment, during a vertical blanking interval between each of the frame image data sets 63a ("input image" in FIG. 23) belonging to the same scene in the frame group FG, the calculation SA of each of the luminance set values L(m) and the gradation correction SB are performed with respect to a previous frame image data set 63a. In addition, during a vertical blanking interval between different scenes in the frame group FG and during a vertical blanking interval between each of the frame groups FG, not only the calculation SA of each of the luminance set values L(m) and the gradation correction SB, but also correction SC of each of the luminance set values L(m) in a previous scene is performed. Then, after the correction SC, a frame image based on each of the frame image data sets 63a in a previous frame group FG is displayed.

(Operation and Effect of Fourth Embodiment)

In the tablet terminal 75 of the fourth embodiment, since each of the luminance set values L(m) is corrected for every scene, it is possible to apply optimum correction to each of the luminance set values L(m) even if a scene change occurs in the frame group FG. That is, if a luminance set value is changed for each of the frame image data sets 63a in a case where there is few difference between frames (in a case where no scene change occurs), a flicker occurs, however, in the present embodiment, the luminance set value is changed in a case where a difference between frames is a specified value or more (in a case where a scene change occurs). Accordingly, if a scene change occurs in the frame group FG, it is possible to display a clear image suitable for viewing as compared with the third embodiment.

Fifth Embodiment

Figure 24:
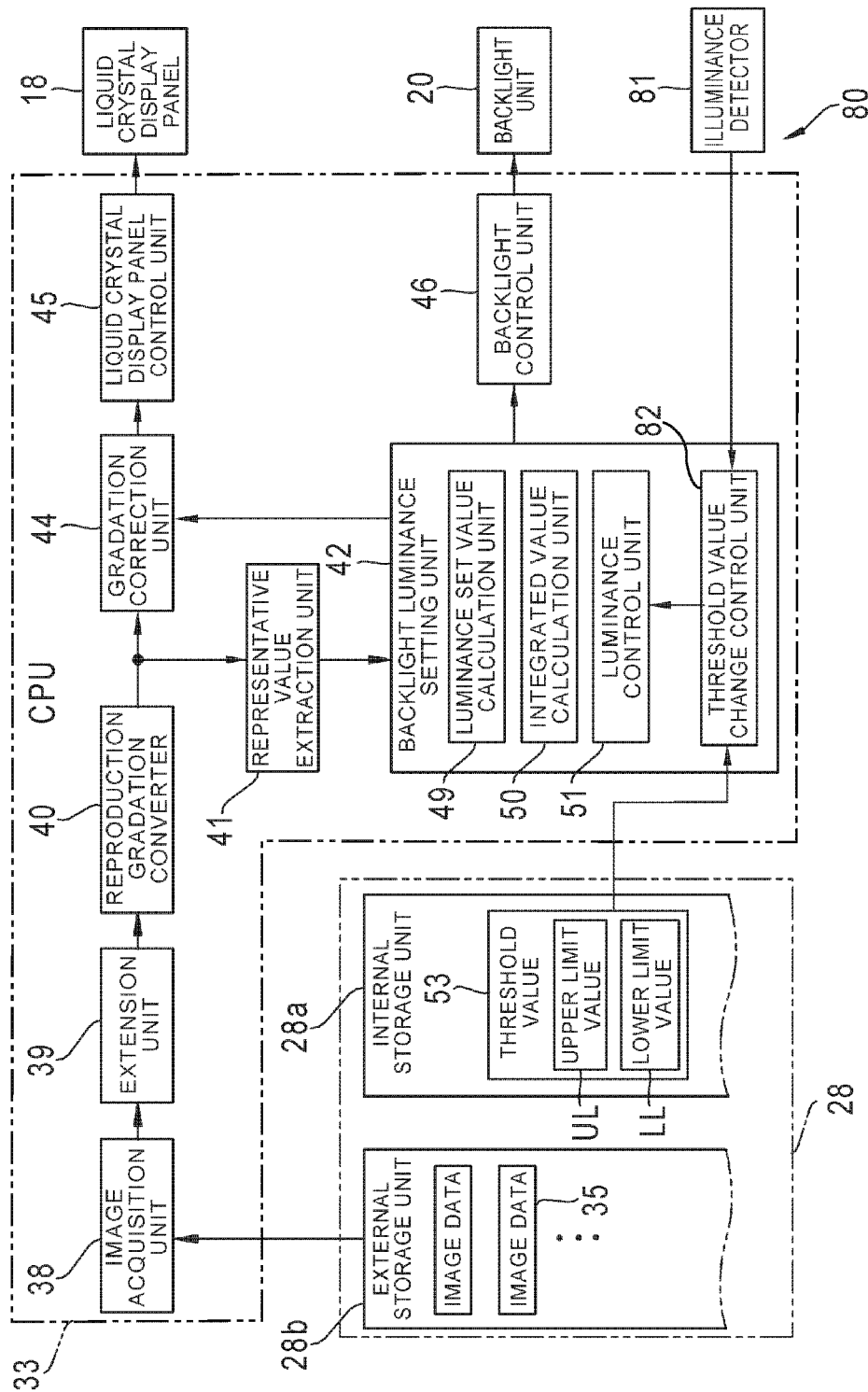
FIG. 24 is a functional block diagram of a CPU of a tablet terminal of a fifth embodiment.

Next, with reference to FIG. 24, a tablet terminal 80 of the fifth embodiment of the present invention will be described. Although the threshold value 53 (the upper limit value UL, and the lower limit value LL) is a fixed value regardless of illuminance of a periphery of the liquid crystal display unit 12 in each of the embodiments described above, it depends on the illuminance of the periphery of the liquid crystal display unit 12 whether the user H feels glare of a display image. For example, in a case where the illuminance of the periphery of the liquid crystal display unit 12 is high, even if backlight luminance (display luminance) is set to be high, a viewer feels no glare of a display image. In such a case, as the backlight luminance is set to be higher, the display image becomes clearer to be suitable for viewing. Thus, in the tablet terminal 80, the upper limit value UL and the lower limit value LL are changed in accordance with the illuminance of the periphery of the liquid crystal display unit 12.

The tablet terminal 80 has the essentially same configuration as that of the first embodiment except that the tablet terminal 80 includes an illuminance detector 81 and the backlight luminance setting unit 42 is provided with a threshold value change control unit (first threshold value change control unit) 82. Thus, a component having the same function and configuration as those of the first embodiment described above is designated by the same reference numeral as that of the first embodiment so that description of the component is appropriately omitted.

The illuminance detector 81 is arranged in the periphery of the liquid crystal display unit 12 to detect illuminance of the periphery of the liquid crystal display unit 12. Here, the "illuminance" is a physical amount that expresses brightness of light emitted to a planar object, and that is equal to luminous flux emitted per unit area. Public known various illuminance sensors are available for the illuminance detector 81. The illuminance detector 81 outputs a detection result of the illuminance to the threshold value change control unit 82.

Figure 25:
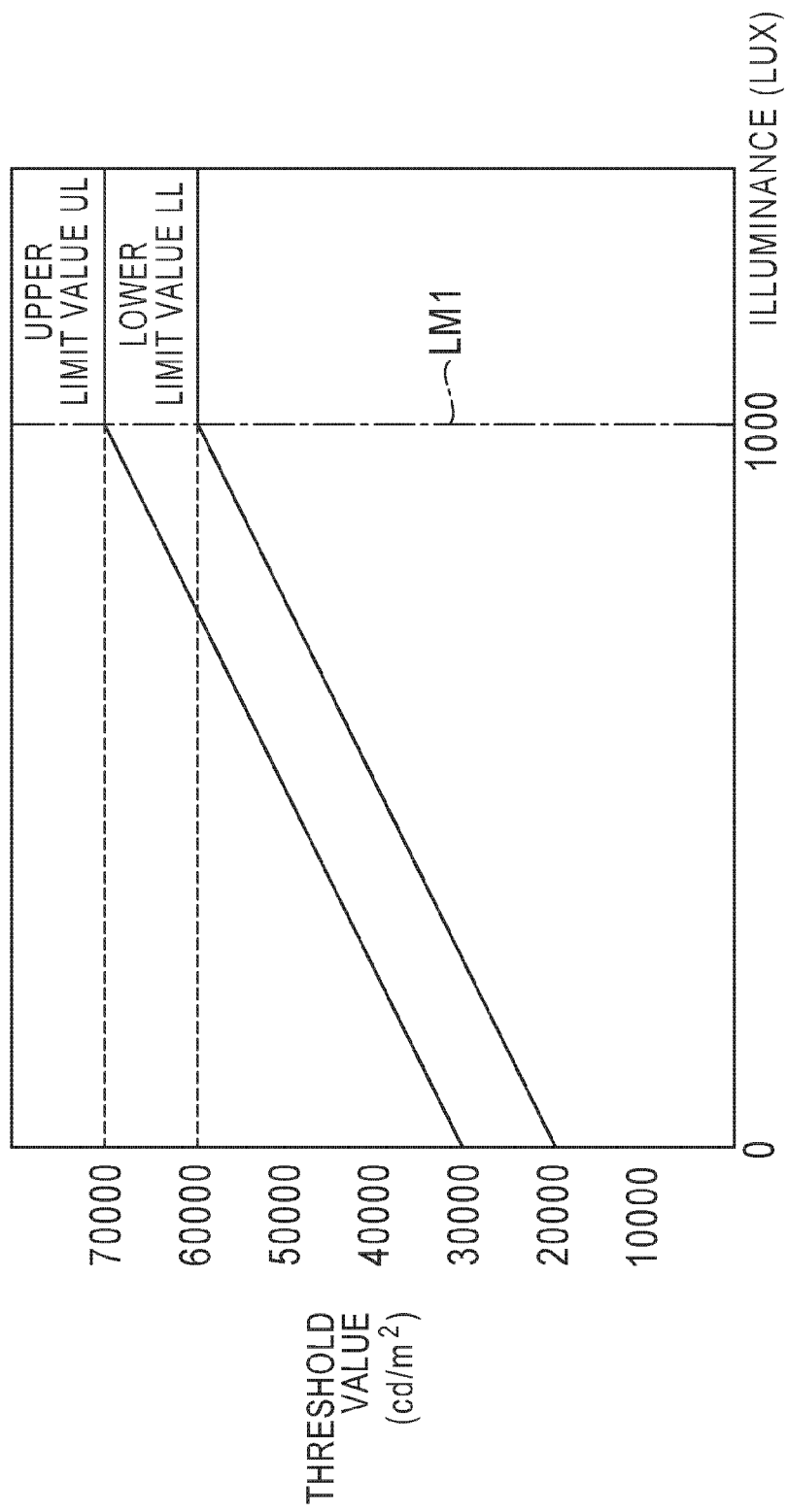
FIG. 25 is a graph showing correspondence between illuminance, and an upper limit value and a lower limit value of an integrated value.

As shown in FIG. 25, the threshold value change control unit 82 changes the upper limit value UL and the lower limit value LL of the threshold value 53 read out from the internal storage unit 28a, on the basis of the detection result of the illuminance detector 81. Specifically, the threshold value change control unit 82 increases the upper limit value UL and the lower limit value LL as the illuminance of the periphery of the liquid crystal display unit 12 increases, and conversely reduces the upper limit value UL and the lower limit value LL as the illuminance of the periphery decreases.

In this case, there is an upper limit in intensity of backlight luminance. Thus, the threshold value change control unit 82 fixes each of the upper limit value UL and the lower limit value LL at a fixed value (the UL is 70000 cd/m$^2$, and the LL is 60000 cd/m$^2$, in FIG. 25) if the illuminance exceeds a preset illuminance upper limit value LM1.

Returning to FIG. 24, the threshold value change control unit 82 outputs the upper limit value UL and the lower limit value LL corresponding to the illuminance to the luminance control unit 51. The luminance control unit 51 performs correction processing of each of the luminance set values L(m) on the basis of the upper limit value UL and the lower limit value LL, received from the threshold value change control unit 82, and the integrated value LS described before. Since the correction processing is essentially identical with that of the first embodiment, hereinafter description of the correction processing is omitted.

As above, since the threshold value 53 is changed in accordance with the illuminance of the periphery of the liquid crystal display unit 12 in the tablet terminal 80 of the fifth embodiment, it is possible to display a clear image suitable for viewing without making a viewer feel the image to be glaring in the liquid crystal display unit 12 regardless of intensity of the illuminance.

Sixth Embodiment

Figure 26:
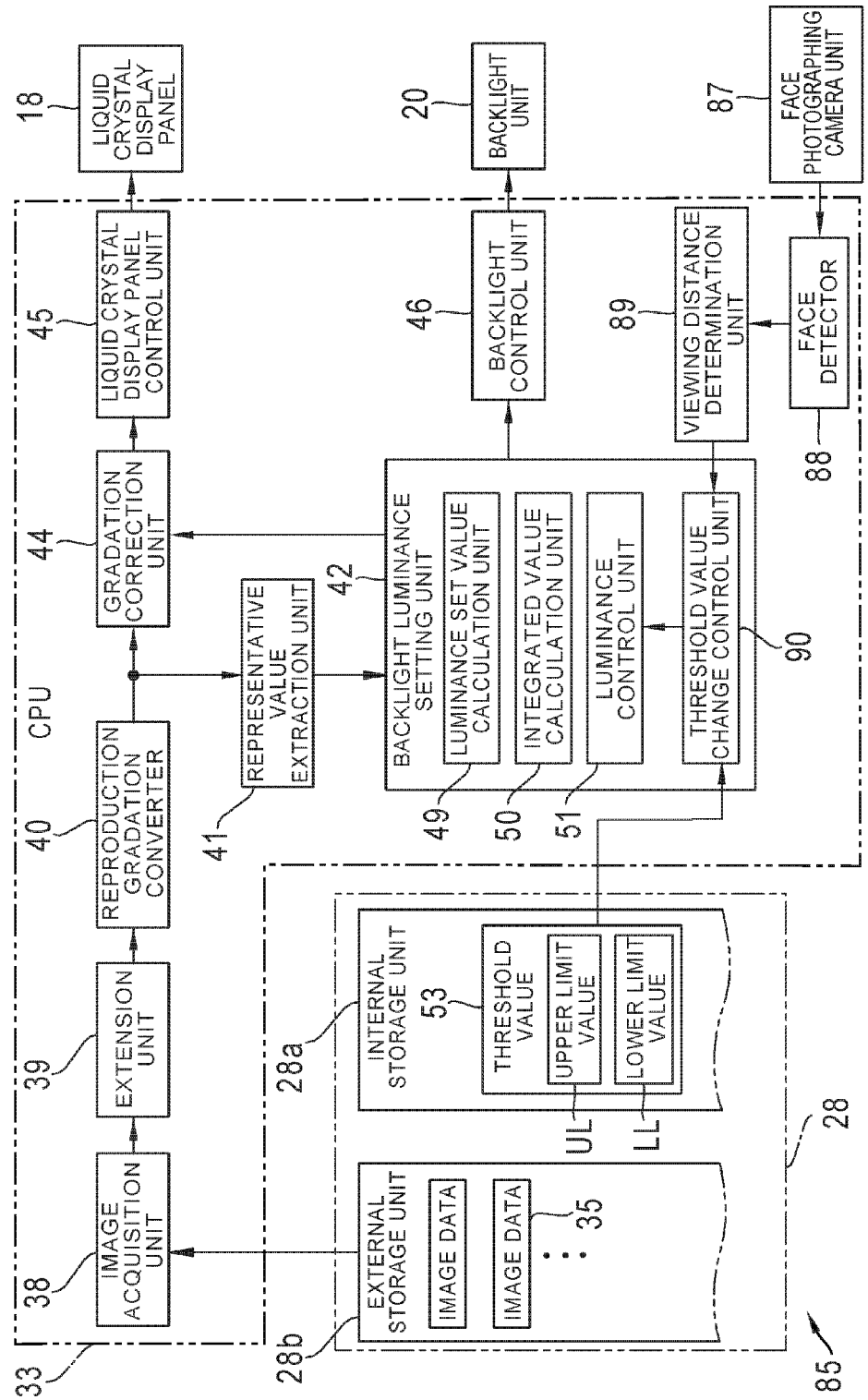
FIG. 26 is a functional block diagram of a CPU of a tablet terminal of a sixth embodiment.

Next, with reference to FIG. 26, a tablet terminal 85 of the sixth embodiment of the present invention will be described. Although the threshold value 53 is changed in accordance with the illuminance of the periphery of the liquid crystal display unit 12 in the fifth embodiment described above, it also depends on the viewing distance VL (refer to FIG. 7) whether the user H feels glare of a display image. For example, even if backlight luminance (display luminance) is the same, as the viewing distance VL decreases, the user H more easily feels glare of a display image, and conversely as the viewing distance VL increases, the user H feels darker of the display image. As a result, it is impossible to view a clear display image. Thus, in the tablet terminal 85, the upper limit value UL and the lower limit value LL are changed in accordance with the viewing distance VL.

The tablet terminal 85 has the essentially same configuration as that of the first embodiment except that the tablet terminal 85 includes a face photographing camera unit 87, a face detector 88, and a viewing distance determination unit 89, and the backlight luminance setting unit 42 is provided with a threshold value change control unit (second threshold value change control unit) 90. Thus, a component having the same function and configuration as those of the first embodiment described above is designated by the same reference numeral as that of the first embodiment so that description of the component is appropriately omitted.

The face photographing camera unit 87, for example, is provided near the liquid crystal display unit 12 to photograph the face of the user H. Face photographing image data acquired by photographing of the face photographing camera unit 87 is output to the face detector 88.

The face detector 88 applies well-known face detection processing to the face photographing image data received from the face photographing camera unit 87 to detect a size and the like of a face area of the user H in the face photographing image data. The face detector 88 outputs information on the size and the like of the face area of the user H, detected by the face detection processing, to the viewing distance determination unit 89 as face detection information.

The viewing distance determination unit 89 determines a length of the viewing distance VL on the basis of the face detection information received from the face detector 88. For example, as a size of the face area of the user H in the face photographing image data increases, the viewing distance VL decreases. Thus, if a relationship between a size of a face area and the viewing distance VL is acquired in advance, the viewing distance determination unit 89 can determine a length of the viewing distance VL from the face detection information. The viewing distance determination unit 89 outputs the determination result of the viewing distance VL to the threshold value change control unit 90.

Figure 27:
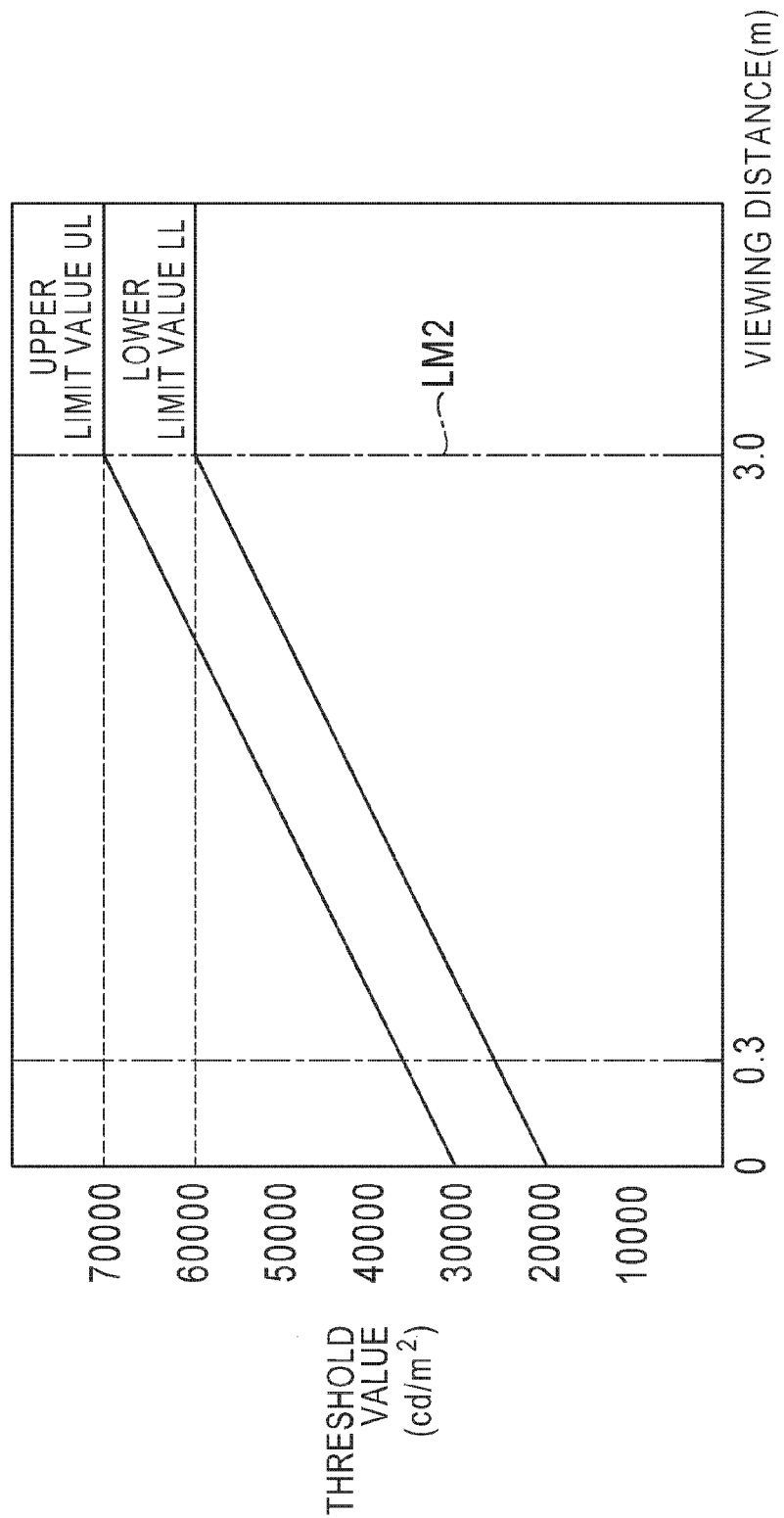
FIG. 27 is a graph showing correspondence between a viewing distance, and an upper limit value and a lower limit value of an integrated value.

As shown in FIG. 27, the threshold value change control unit 90 changes the upper limit value UL and the lower limit value LL of the threshold value 53 read out from the internal storage unit 28$a$, on the basis of the determination result of the viewing distance determination unit 89. Specifically, the threshold value change control unit 90 increases the upper limit value UL and the lower limit value LL as the viewing distance VL increases, and conversely reduces the upper limit value UL and the lower limit value LL as the viewing distance VL decreases. In addition, as with the fifth embodiment, the threshold value change control unit 90 fixes each of the upper limit value UL and the lower limit value LL at a fixed value (the UL is 70000 cd/m$^2$, and the LL is 60000 cd/m$^2$, in FIG. 27) if the viewing distance VL exceeds a preset distance upper limit value LM2.

Returning to FIG. 26, the threshold value change control unit 90 outputs the upper limit value UL and the lower limit value LL corresponding to the viewing distance VL to the luminance control unit 51. The luminance control unit 51 performs correction processing of each of the luminance set values L(m) on the basis of the upper limit value UL and the lower limit value LL, received from the threshold value change control unit 82, and the integrated value LS described before.

As above, since the threshold value 53 is changed in accordance with the viewing distance VL in the tablet terminal 85 of the sixth embodiment, it is possible to display a clear image suitable for viewing without making a viewer feel the image to be glaring in the liquid crystal display unit 12 regardless of the viewing distance VL.

In the sixth embodiment described above, although the viewing distance determination unit 89 determines a length of the viewing distance VL on the basis of the face detection information, the length of the viewing distance VL may be determined by using public known various methods. For example, a transmission and reception sensor using an infrared ray may be provided in a periphery of the liquid crystal display unit 12 to determine a length of the viewing distance VL by detecting a time by which a reflection of an infrared ray emitted to the user H returns.

Seventh Embodiment

Figure 28:
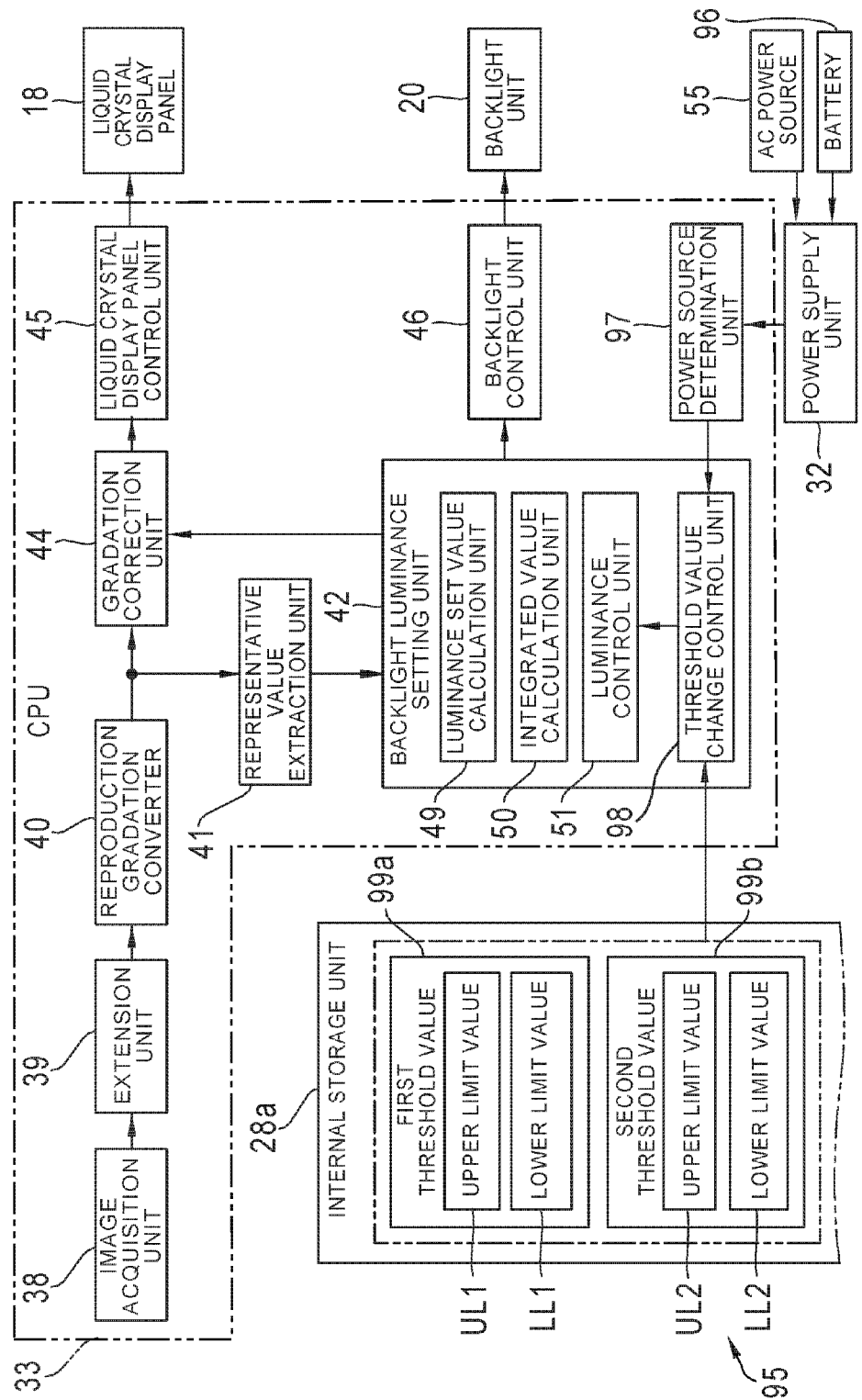
FIG. 28 is a functional block diagram of a CPU of a tablet terminal of a seventh embodiment.

Next, with reference to FIG. 28, a tablet terminal 95 of the seventh embodiment of the present invention will be described. Although the threshold value 53 is changed in accordance with the illuminance of the periphery of the liquid crystal display unit 12 and the viewing distance VL in the fifth and sixth embodiments, described above respectively, in the tablet terminal 95, a threshold value is changed depending on a type of power source.

The tablet terminal 95 operates by using power supplied from the AC power source (external power source) 55 or a battery 96. In addition, the tablet terminal 95 has the essentially same configuration as that of the first embodiment except that the tablet terminal 95 includes a power source determination unit 97 and a threshold value change control unit (third threshold value change control unit) 98 provided in the backlight luminance setting unit 42, and the internal storage unit 28$a$ stores a first threshold value 99$a$ and a second threshold value 99$b$. Thus, a component having the same function and configuration as those of the first embodiment described above is designated by the same reference numeral as that of the first embodiment so that description of the component is appropriately omitted. Various power sources other than the AC power source 55 may be available for the external power source of the present invention.

An upper limit value UL1 and a lower limit value LL1 of the first threshold value 99$a$ are the same values as the upper limit value UL and the lower limit value LL of the threshold value 53 of the first embodiment, respectively. In addition, an upper limit value UL2 of the second threshold value 99$b$ is set to be smaller than the upper limit value UL1, and a lower limit value LL2 thereof is set to be smaller than the lower limit value LL1.

The power source determination unit 97 determines whether the power supply unit 32 receives power from either the AC power source 55 or the battery 96 to output the determination result to the threshold value change control unit 98.

In a case where the power supply unit 32 receives power from the AC power source 55 on the basis of the determination result by the power source determination unit 97, the threshold value change control unit 98 acquires the upper limit value UL1 and the lower limit value LL1 of the first threshold value 99$a$ from the internal storage unit 28$a$ to output them to the luminance control unit 51. In this case, the luminance control unit 51 performs correction processing of each of the luminance set values L(m) on the basis of the upper limit value UL1 and the lower limit value LL1, and the integrated value LS described before.

In addition, in a case where the power supply unit 32 receives power from the battery 96 on the basis of the power source determination result by the power source determination unit 97, the threshold value change control unit 98 acquires the upper limit value UL2 and the lower limit value LL2 of the second threshold value 99$b$ from the internal storage unit 28$a$ to output them to the luminance control unit 51. In this case, the luminance control unit 51 performs correction processing of each of the luminance set values L(m) on the basis of the upper limit value UL2 and the lower limit value LL2, and the integrated value LS described before.

As above, in a case where power is supplied from the battery 96 in the seventh embodiment, each of the luminance set values L(m) is corrected on the basis of the upper limit value UL2 and the lower limit value LL2 that are set to be lower than the upper limit value UL1 and the lower limit value LL1 in a case where power is supplied from the AC power source 55. Thus, each of the luminance set values L(m) in a case where power is supplied from the battery 96 is set lower than that in a case where power is supplied from the AC power source 55. As a result, in a case where power is supplied from the battery 96, it is possible to reduce power consumption by reducing backlight luminance.

In addition, at least any two of the fifth to seventh embodiments described above may be appropriately combined. Further, the fifth to seventh embodiments described above, and any one of the second to fourth embodiments described above, may be combined. In this case, even in a case where the internal storage unit 28a stores the upper limit value ULa and the lower limit value LLa as a fixed value in advance in the third embodiment, the upper limit value ULa and the lower limit value LLa may be changed by using the methods described in the fifth to seventh embodiments described above.

Eighth Embodiment

Figure 29:
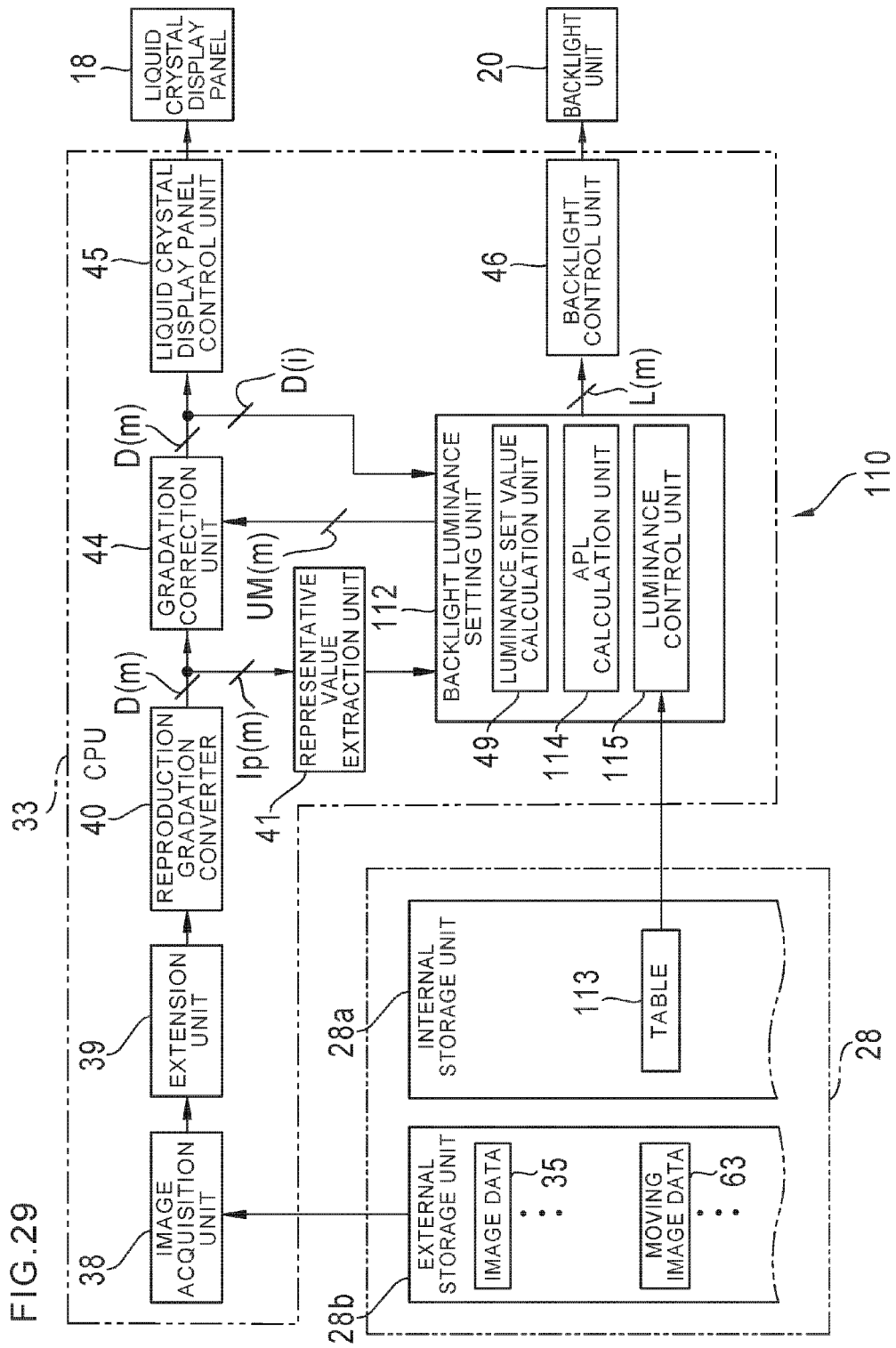
FIG. 29 is a functional block diagram of a CPU of a tablet terminal of an eighth embodiment.

Next, with reference to FIG. 29, a tablet terminal 110 of the eighth embodiment of the present invention will be described. In each of the embodiments described above, an integrated value LS of the luminance set value L(m) for each of the segment areas 22(m) is acquired to perform correction in which each of the luminance set values L(m) is multiplied by the coefficients (KU and KL) determined so that the integrated value LS becomes within in a threshold value. On the other hand, the tablet terminal 110 performs correction in which each of the luminance set values L(m) is multiplied by a coefficient determined on the basis of a calculation result of an APL(average luminance level) of image data for one screen.

The tablet terminal 110 has the essentially same configuration as that of the tablet terminals 10 and 60 of the first and second embodiments, described above respectively, except that the CPU 33 serves as a backlight luminance setting unit 112 and the internal storage unit (correspondence storage unit) 28a stores a table (correspondence) 113. Thus, a component having the same function and configuration as those of the first and second embodiments described above is designated by the same reference numeral as that of the first and second embodiments so that description of the component is appropriately omitted.

The backlight luminance setting unit 112 includes an APL calculation unit (average luminance level calculation unit) 114, and a luminance control unit 115 along with the luminance set value calculation unit 49 described before. The APL calculation unit 114 calculates an APL of image data D(m) after the gradation correction processing, for one screen (such as image data (0) to image data (63)). Specifically, in a case where: a pixel value of image data D(m) for one screen is indicated as D(i); a pixel number in a vertical direction is indicated as $H_G$; and a pixel number in a horizontal direction is indicated as $L_G$, the APL can be calculated from the following expression: APL=$\Sigma$D(i)/($H_G \times L_G$), i=0 to ($H_G \times L_G$−1). Since the APL is an average value of pixel values D(i) of image data D(m) for one screen, the APL corresponds to the statistic of video signal levels of image data of the present invention. Hereinafter, "image data D(m) for one screen after the gradation correction processing" is abbreviated as simply "gradation correction image data D(m)".

In the present embodiment, the APL is expressed by percentage. If the APL is 100%, the entire image is a white image to allow the image to be the brightest. Conversely, if the APL is 0%, the image is the darkest. The APL calculation unit 114 outputs a calculation result of the APL to the luminance control unit 115.

The luminance control unit 115 determines a coefficient kC on the basis of the APL calculated by the APL calculation unit 114 with reference to the table 113 stored in the internal storage unit 28a, and corrects the luminance set value L(m) of each of the segment areas 22(m) by multiplying the luminance set value L(m) by the coefficient kC.

Figure 30:
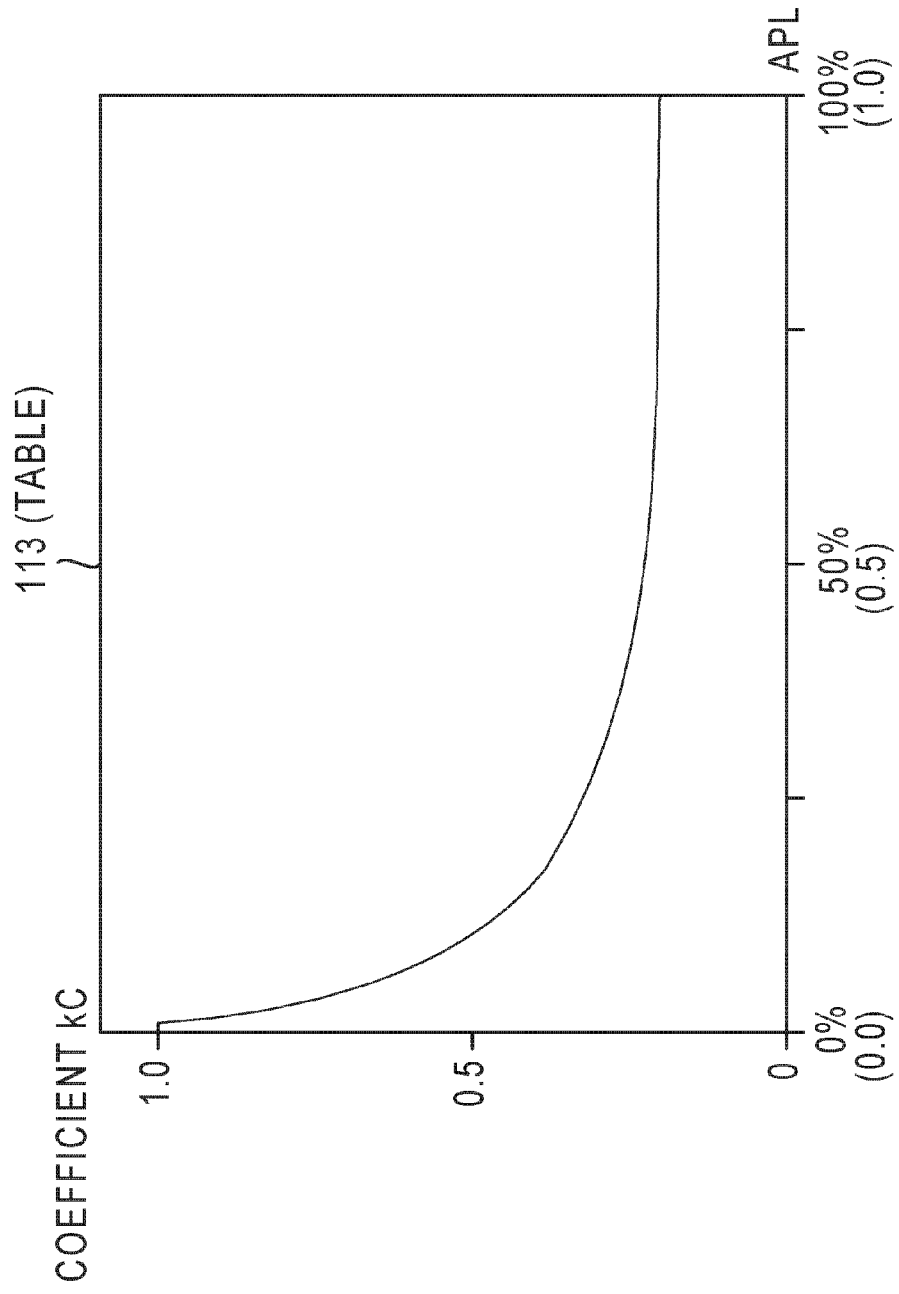
FIG. 30 is an illustration for describing a table.

As shown in FIG. 30, the table 113 shows a correspondence between a preset APL suitable for viewing and the coefficient kC. The table 113 is set on the basis of the characteristics A described before. Here, in order to acquire a clear image suitable for viewing without making a viewer feel the image to be glaring, as described before, it is preferable that a peak of display luminance in a case where the APL is set at 100% (full white display) under the conditions shown in FIG. 7 (illuminance is 200 (lx), the viewing distance VL is 0.5 m, and AC power source drive) is set to be not less than 500 cd/m$^2$ and not more than 1000 cd/m$^2$. Thus, in the table 113, an APL of image data D(m) for one screen is set as a parameter, and the coefficient kC for correcting each of the luminance set values L(m) is determined so that a peak of display luminance in a case where the APL is 100% becomes within the range described above. The coefficient kC may be appropriately determined by experiment or simulation. Accordingly, the luminance control unit 115 can determine a coefficient kC corresponding to the APL calculated by the APL calculation unit 114 with reference to the table 113. That is, the coefficient kC is determined from the APL corresponding to the statistic of video signal levels of image data of the present invention.

Returning to FIG. 29, each of the luminance set values L(m) to which multiplication processing of the coefficient kC by the luminance control unit 115 has been applied is output to the backlight control unit 46. The backlight control unit 46 controls backlight luminance of each of the illumination units 23(m) on the basis of each of the luminance set values L(m) received from the backlight luminance setting unit 112.

In addition, when a moving image based on the moving image data 63 is displayed, essentially as with the second embodiment described above, each of the luminance set values L(m) is corrected by frame image data. That is, each of the APL calculation unit 114 and the luminance control unit 115 performs calculation of an APL, determination of a coefficient kC, and the multiplication processing, for each of the frame image data sets 63a (refer to FIG. 12).

(Operation of Eighth Embodiment (Display Control Processing on Still Image))

Next, with reference to the flow chart shown in FIG. 31, operation of the tablet terminal 110 having the configuration above, particularly display control processing on a still image, will be described. Since a flow from acquisition of the image data 35 to the calculation processing of the luminance set value L(m) for each of the segment areas 22(m) and to the gradation correction processing of image data D(m) is identical with the flow of the first embodiment (step S1 to step S5, and step S7 to step S9) shown in FIG. 8, hereinafter description of the flow is omitted.

By the processing to step S9 described above, the luminance set value calculation unit 49 outputs a calculation result of each of the luminance set values L(m) to the luminance control unit 115. In addition, the gradation correction unit 44 outputs each of the image data sets (m) to which the gradation correction processing has been applied to the luminance control unit 115. Subsequently, the correction processing of each of the luminance set values L(m) (hereinafter referred to as luminance set value correction processing) starts (step S90).

The APL calculation unit 114 calculates an APL from an average value ($\Sigma D(i)/(H_G \times L_G)$) of all pixel values D(i) of the gradation correction image data D(m) (step S91). The APL calculation unit 114 outputs a calculation result of the APL to the luminance control unit 115.

First, the luminance control unit 115, on the basis of the APL received from the APL calculation unit 114, determines a coefficient kC corresponding to the APL with reference to the table 113 stored in the internal storage unit 28a (step S92). Subsequently, the luminance control unit 115 multiplies each of the luminance set values L(m) received from the luminance set value calculation unit 49 by the coefficient kC to output each of the luminance set values L(m) to which the coefficient multiplication processing has been applied to the backlight control unit 46 (step S93).

Hereinafter, as with the first embodiment, an image based on the image data 35 is displayed in the display area of the LCD panel 18 (step S22). Then, if selection operation (such as display switching operation) of new image data 35 is performed in the operation panel 19 or the like (YES in step S23), the processing of each step described before is repeatedly performed. In addition, when operation of slide show display is performed in the operation unit 15 or the like, the processing of each step described before is repeatedly performed at a fixed time interval.

(Display Control Processing on Moving Image)

Figure 13:
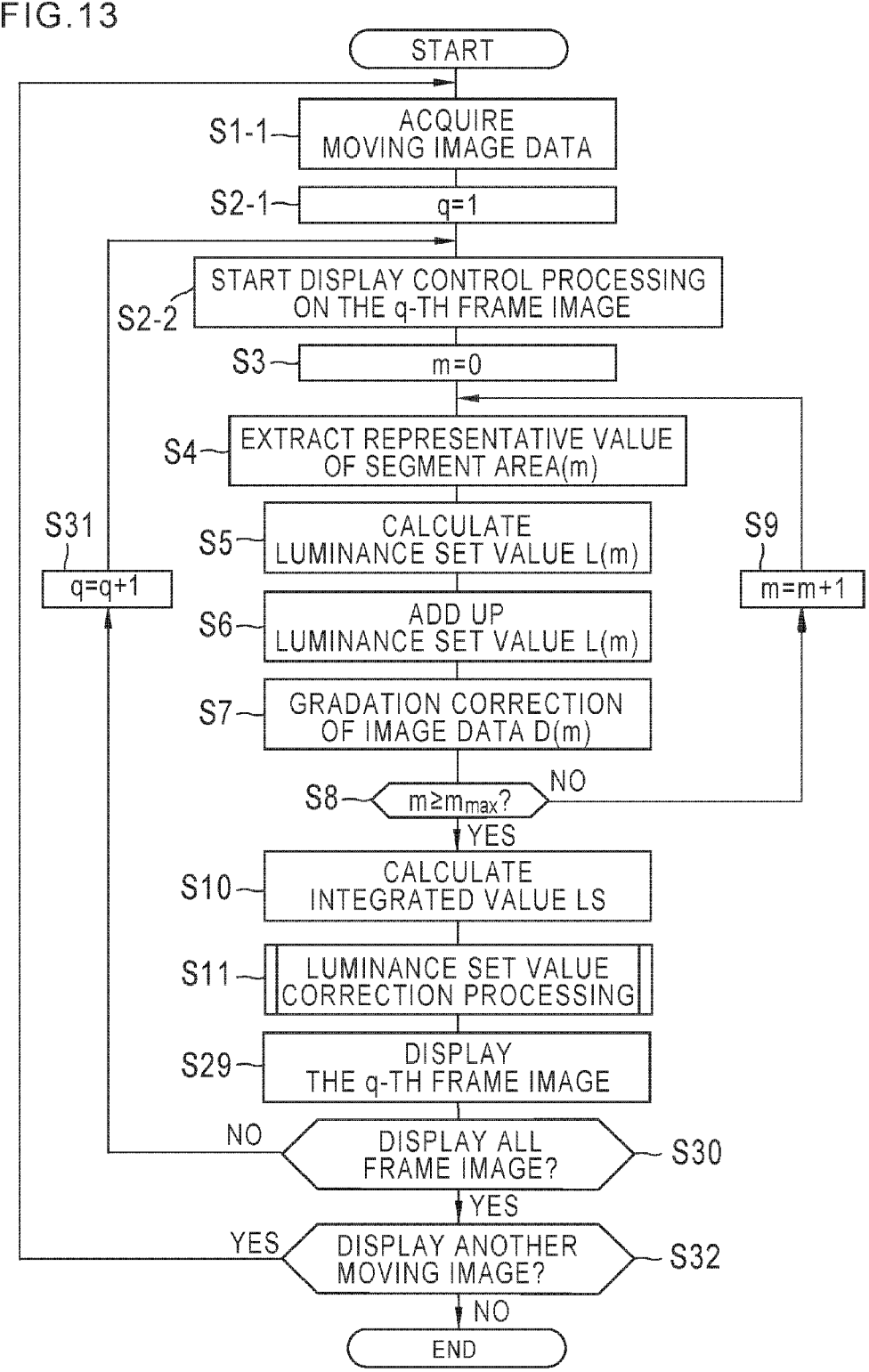
FIG. 13 is a flow chart showing a flow of display control processing of the second embodiment.
Figure 31:
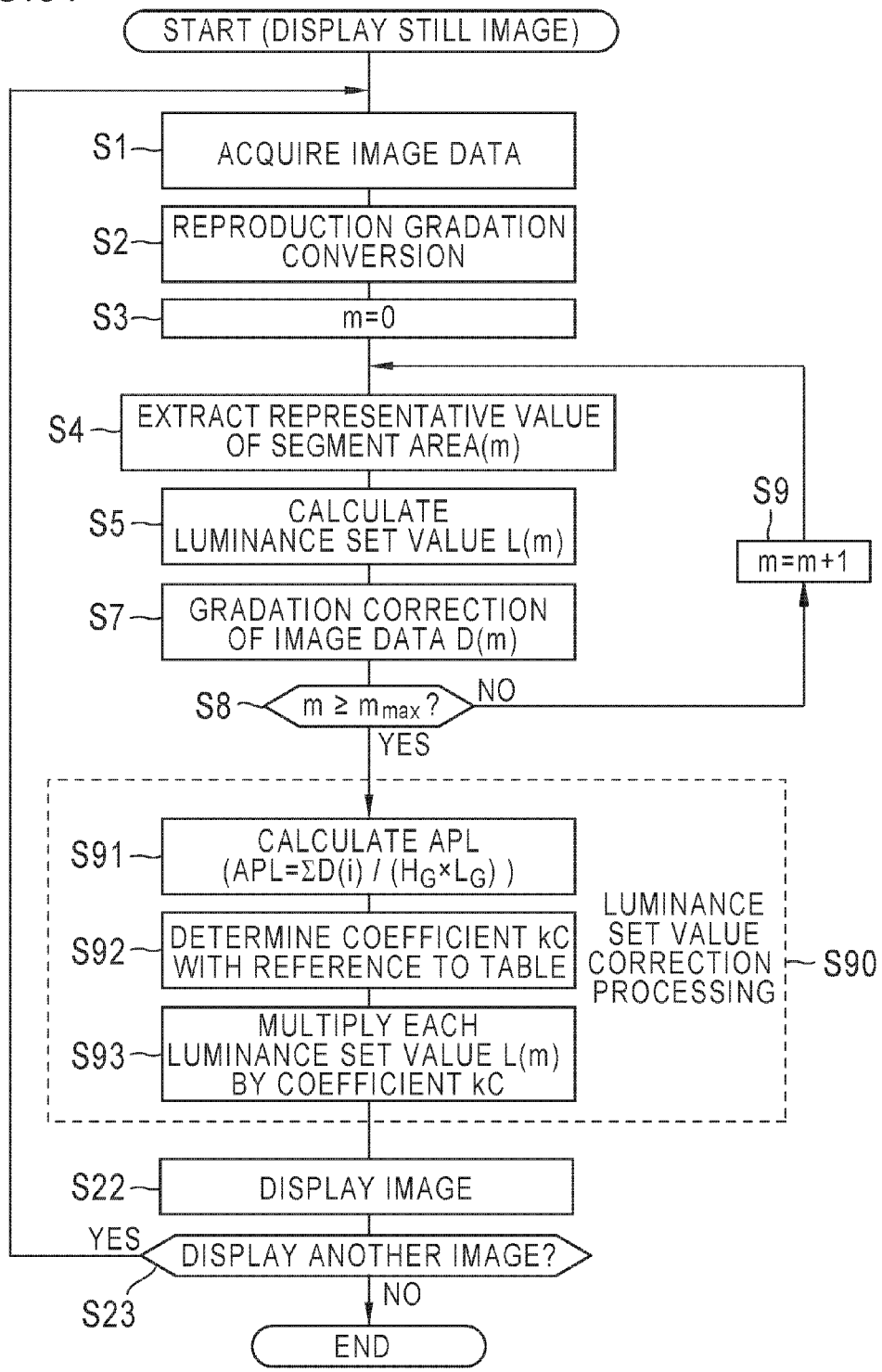
FIG. 31 is a flow chart showing a flow of display control processing of a still image of the eighth embodiment.
Figure 32:
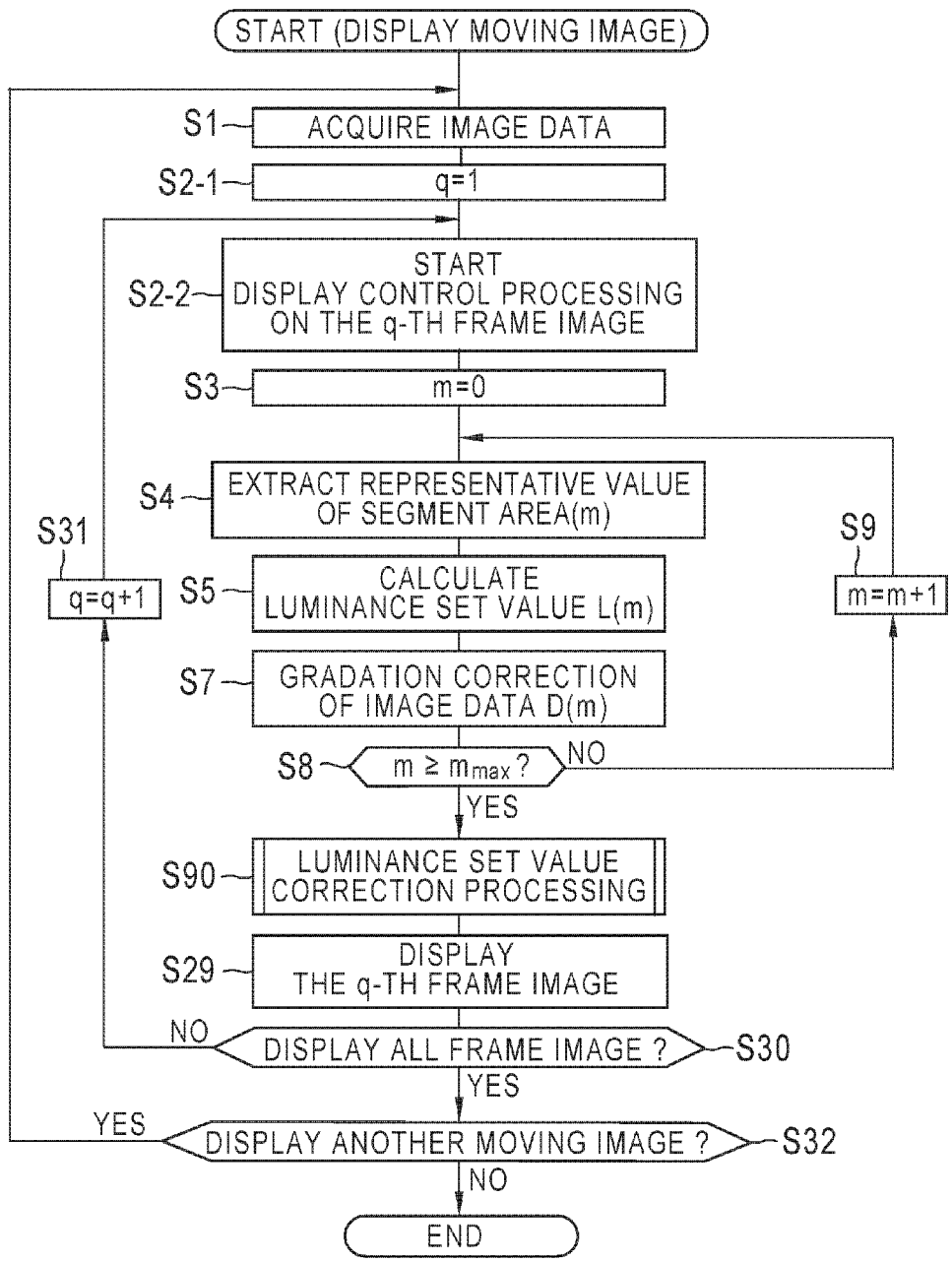
FIG. 32 is a flow chart showing a flow of display control processing on a moving image of the eighth embodiment.

As shown in FIG. 32, display control processing on a moving image of the tablet terminal 110 is formed by eliminating step S6 from the flow of display control of the second embodiment shown in FIG. 13 and by replacing step S10 and step S11 of the flow with step S90 shown in FIG. 31. That is, for each of the frame image data sets 63a of the moving image data 63, the following processing is performed: the calculation of the luminance set value L(m) for each of the segment areas 22(m), the gradation correction of the image data D(m), the calculation of an APL, the determination of a coefficient kC, the multiplication processing, and image display processing. Accordingly, a moving image based on the moving image data 63 is displayed.

(Operation and Effect of Eighth Embodiment)

As above, in the eighth embodiment of the present invention, the luminance set value L(m) is corrected so that a peak of display luminance in a case where the APL is set at 100% can be adjusted within a range of 500 cd/m$^2$ to 1000 cd/m$^2$. In addition, since each of the luminance set values L(m) is uniformly multiplied by the coefficient kC, it is prevented that backlight luminance of a bright section (such as the moon) in a case where an image at a low APL (such as the night sky) is displayed becomes a preset upper limit value or less like the comparative example shown in the portion (B) in FIG. 10 described before. Accordingly, it is prevented that a contrast ratio of a display image decreases to degrade image quality of the display image like the comparative example. As a result, as with the first embodiment, it is possible to acquire a clear display image without reducing a contrast ratio. In addition, since the calculation is simple to allow the coefficient to be acquired in parallel with processing for the BLD control, it is possible to speed up the processing as well as to reduce costs of the tablet terminal 110.

Ninth Embodiment

Figure 33:
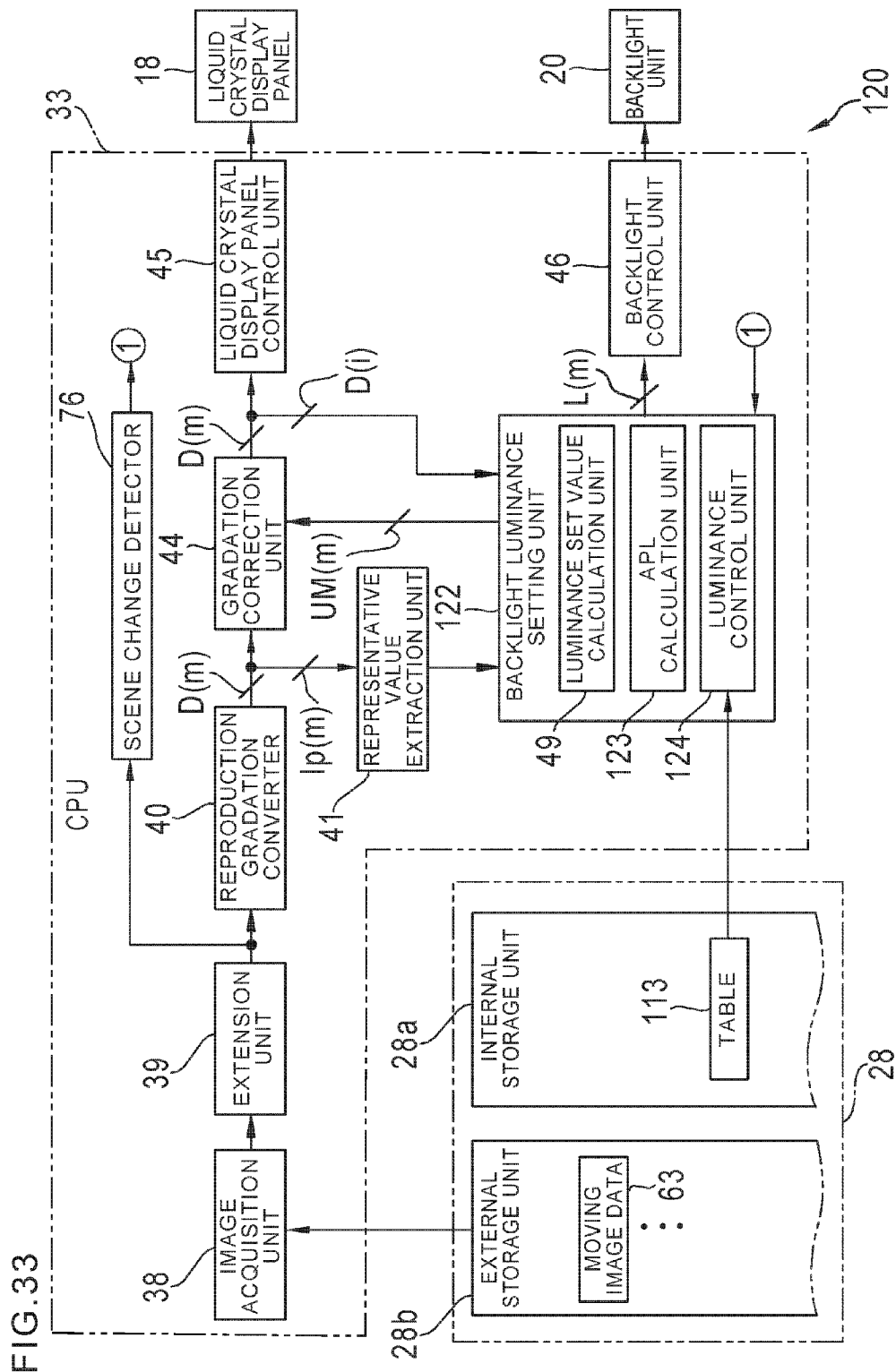
FIG. 33 is a functional block diagram of a CPU of a tablet terminal of a ninth embodiment.

Next, with reference to FIG. 33, a tablet terminal 120 of the third embodiment of the present invention will be described. Although each of the luminance set values L(m) is corrected by a frame in a case where a moving image is displayed in the eighth embodiment, in the tablet terminal 120, as with the third and fourth embodiments, each of the luminance set values L(m) is corrected by a frame group or a scene.

The tablet terminal 120 has the essentially same configuration as that of the tablet terminal 75 of the fourth embodiment described above except that the CPU 33 serves as a backlight luminance setting unit 122 and the internal storage unit 28a stores the table 113 of the eighth embodiment. Thus, a component having the same function and configuration as those of the fourth and eighth embodiments described above is designated by the same reference numeral as that of the fourth and eighth embodiments so that description of the component is appropriately omitted.

The backlight luminance setting unit 122 includes an APL calculation unit (average luminance level calculation unit) 123, and a luminance control unit 124 along with the luminance set value calculation unit 49 described before. Each of the APL calculation unit 123 and the luminance control unit 124 performs calculation of an APL, and correction of the luminance set value L(m), in units of a frame group or a scene, on the basis of a detection result of the scene change detector 76.

In a case where the scene change detector 76 detects no scene change in the frame group FG, the APL calculation unit 123 calculates an APL in units of a frame group. Specifically, the APL calculation unit 123 calculates the APL from an average value of all pixel values D(i) of the gradation correction image data D(m) corresponding to any frame image data set 63a in the frame group FG. That is, the APL calculation unit 123 calculates an APL of any frame image data set 63a in the frame group FG as a representative APL of the frame group FG to output the calculation result to the luminance control unit 124.

On the other hand, in a case where the scene change detector 76 detects a scene change in the frame group FG, the APL calculation unit 123 calculates an APL in units of a scene. For example, a case where the frame group FG is composed of the n-th frame image data 63a, the (n+1)-th frame image data 63a, . . . , and the (n+k)-th frame image data 63a, and where a scene change has occurred between the (n+1)-th frame image data 63a and the (n+2)-th frame image data 63a, will be described. In this case, the APL calculation unit 123 calculates an APL of any frame image data set 63a in a scene including the (n+1)-th frame image data 63a to the (n+2)-th frame image data 63a, as a representative APL of the scene. Subsequently, the APL calculation unit 123 calculates an APL of any frame image data set 63a in a subsequent scene including the (n+2)-th frame image data 63a to the (n+k)-th frame image data 63a, as a representative APL of the subsequent scene. The APL calculation unit 123 outputs also a calculation result of an APL for every scene to the luminance control unit 124.

The APL of any frame image data set 63a in the frame group FG or a scene is not limited to an APL of one frame image data set 63a, and may be a representative value (such as an average value, a maximum value, and a minimum value) of APLs of a plurality of frame image data sets 63a.

In a case where the scene change detector 76 detects no scene change in the frame group FG, the luminance control unit 124 determines the coefficient kC for each of the frame groups FG on the basis of a calculation result of an APL for each of the frame groups FG received from the APL calculation unit 123 with reference to the table 113 stored in the internal storage unit 28a. Subsequently, the luminance control unit 124 multiplies each of the luminance set values L(m) of respective corresponding frame groups FG by the coefficient kC for each of the frame groups FG. Accordingly, each of the luminance set values L(m) is corrected by a frame group.

On the other hand, in a case where the scene change detector 76 detects a scene change in the frame group FG, the luminance control unit 124 determines the coefficient kC for each of scenes on the basis of a calculation result of an APL for each of the scenes received from the APL calculation unit 123 with reference to the table 113 stored in the internal storage unit 28a. Subsequently, the luminance control unit 124 multiplies each of the luminance set values L(m) of respective corresponding scenes by the coefficient kC for each of the scenes. Accordingly, each of the luminance set values L(m) is corrected by a scene in the frame group FG. The luminance control unit 124 outputs each of the corrected luminance set values L(m) to the backlight control unit 46.

The scene change detector 76 calculates APLs of respective two continuous frame image data sets 63a to determine whether a difference between the APLs exceeds a preset threshold value or not, thereby detecting whether there is an occurrence of a scene change. In addition, it is possible to set ON/OFF of detection of a scene change by the scene change detector 76 in the operation unit 15 or the like, and in a case where the detection of a scene change is set to be OFF, calculation of an APL in units of a frame group, and correction of the luminance set value L(m), are performed.

(Operation (Scene Change Detection OFF) of Ninth Embodiment)

Figure 34:
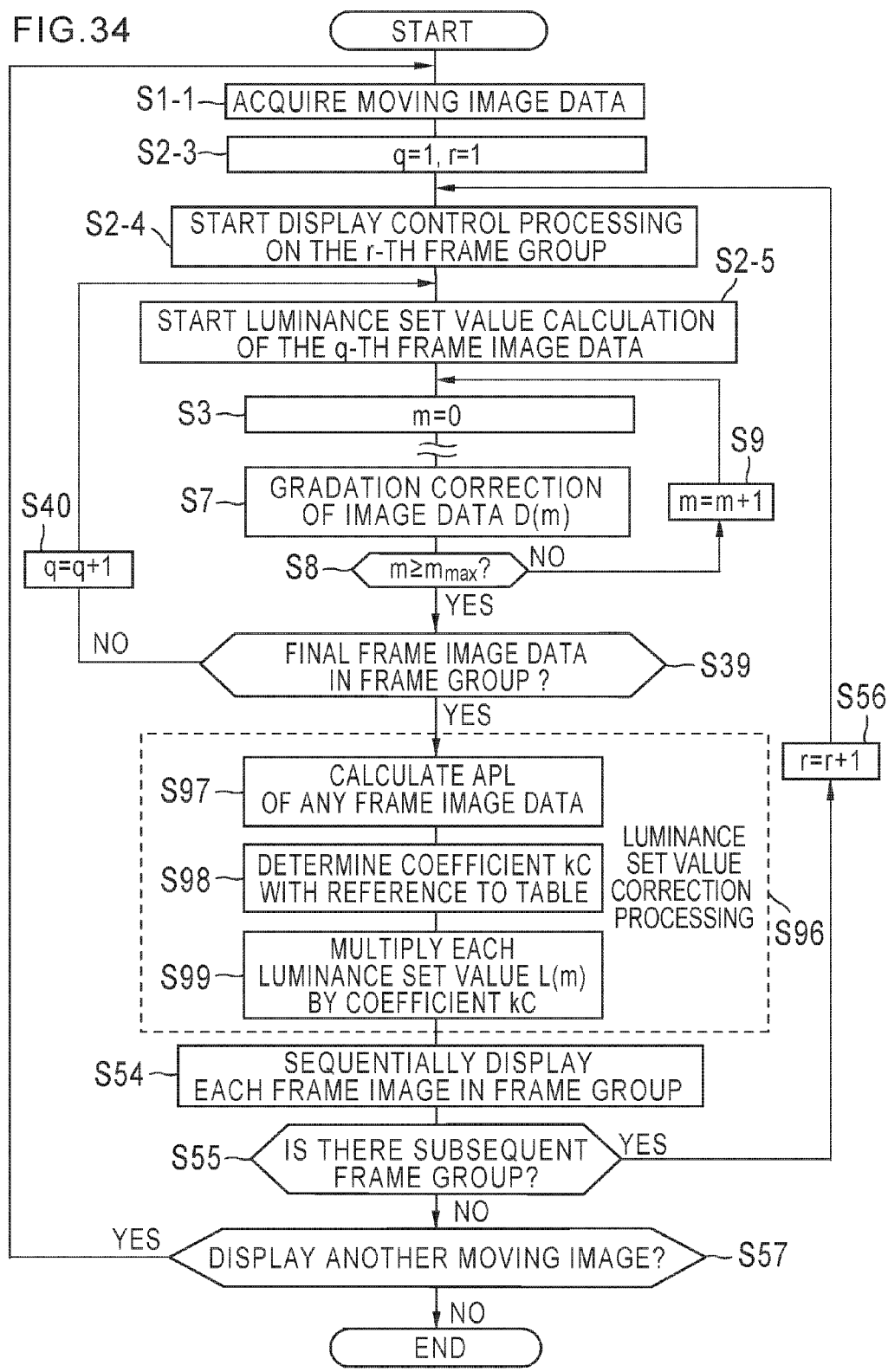
FIG. 34 is a flow chart showing a flow of correction processing of a luminance set value in a case where a scene change does not occur in the ninth embodiment.

Next, with reference to the flow chart shown in FIG. 34, operation of the tablet terminal 120 having the configuration above, particularly display control processing on a moving image in a case where the detection of a scene change is turned off, will be described. Since the processing of step S1-1 to step S39 (step S6 is omitted) is essentially identical with the processing of the third embodiment shown in FIG. 17, hereinafter a description of the processing is omitted.

When the processing to step S39 described above is completed, the luminance set value correction processing in units of a frame group starts (step S96).

The APL calculation unit 123 calculates an APL from an average value of all pixel values D(i) of gradation correction image data D(m) corresponding to any frame image data set 63a in the first frame group FG, such as the leading frame image data set 63a (step S97). Then, the APL calculation unit 123 outputs a calculation result of an APL of the first frame group FG to the luminance control unit 124.

The luminance control unit 124 determines a coefficient kC of the first frame group FG on the basis of the APL received from the APL calculation unit 123, with reference to the table 113 stored in the internal storage unit 28a (step S98). Subsequently, the luminance control unit 115 multiplies each of the luminance set values L(m) of the first frame group FG received from the luminance set value calculation unit 49 by the coefficient kC to output each of the luminance set values L(m) to which the coefficient multiplication processing has been applied to the backlight control unit 46 in numerical order of frames (step S99).

Hereinafter, as with the third embodiment (refer to FIG. 17), a frame image based on each of the frame image data sets 63a of the first frame group FG is sequentially displayed in a display area of the LCD panel 18 (step S54). Then, display control processing identical with the display control processing on the first frame group FG described above is applied to also other frame groups FG (step S55 and step S56). Accordingly, a moving image based on the moving image data 63 is displayed. When selection operation of new moving image data 63 is performed in the operation unit 15 or the like (step S57), the processing of each step described before is repeatedly performed so that a moving image based on the new moving image data 63 is displayed.

In the ninth embodiment (scene change detection OFF), at the same timing as that of the third embodiment shown in FIG. 19 described before, the calculation SA of the luminance set value L(m), the gradation correction SB, and the correction SC of the luminance set value L(m) (here, calculation of an APL, and determination and multiplication of a coefficient kC) are performed. Then, after the correction SC, a frame image of the previous frame group FG is displayed. Here, the calculation of an APL and the determination of a coefficient kC in the correction SC may start after the gradation correction SB of the frame image data set 63a to be a calculation object of the APL (such as the n-th frame image data set 63a).

(Operation and Effect (Scene Change Detection OFF) of Ninth Embodiment)

As above, in the tablet terminal 120 of the ninth embodiment, as with the tablet terminal 66 of the third embodiment, since each of the luminance set values L(m) is corrected by a frame group, a flicker of a moving image is reduced as compared with the second embodiment in which each of the luminance set values L(m) is corrected by a frame image. In addition, it is possible to reduce a calculation load of the CPU 33.

(Operation (Scene Change Detection ON) of Ninth Embodiment)

Figure 35:
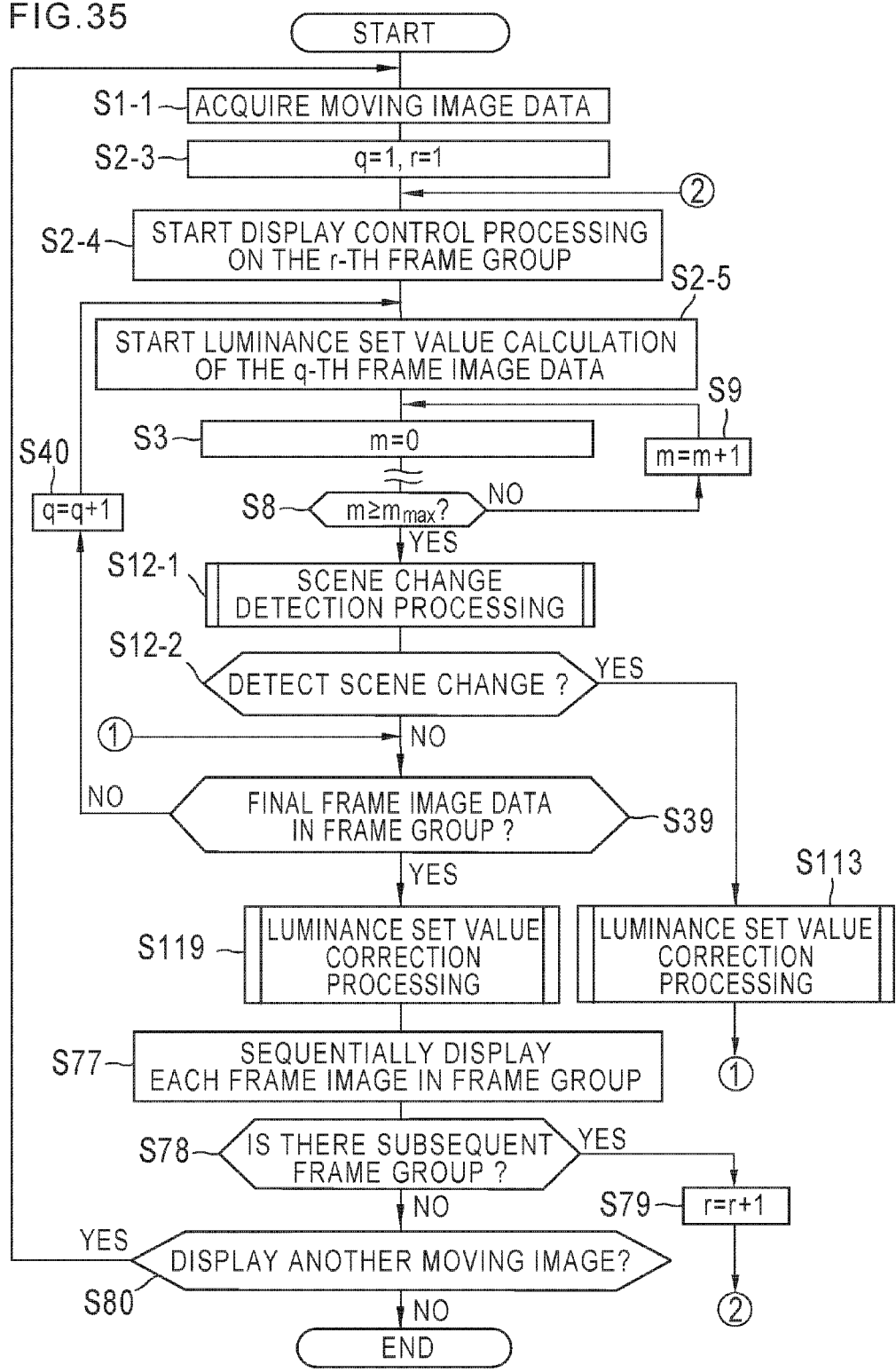
FIG. 35 is a flow chart showing a flow of correction processing of a luminance set value in a case where a scene change occurs in the ninth embodiment.

Next, with reference to the flow chart shown in FIG. 35, display control processing on a moving image in a case where the detection of a scene change is turned on in the tablet terminal 120 having the configuration above, will be described. Since a flow of processing in a case where no scene change is detected in the frame group FG is essentially identical with the display control processing shown in FIG. 34, hereinafter only a case where a scene change is detected will be described.

In addition, since the processing from step S1 to step S39 is essentially identical with the processing shown in FIG. 34 in a case where detection of a scene change is turned off, hereinafter a description of the processing is omitted. In the ninth embodiment, differently from the processing shown in FIG. 34, the scene change detector 76 detects whether a scene change has occurred between each of the frame image data sets 63a or not (S12-1).

(Detection Processing of Scene Change)

Figure 36:
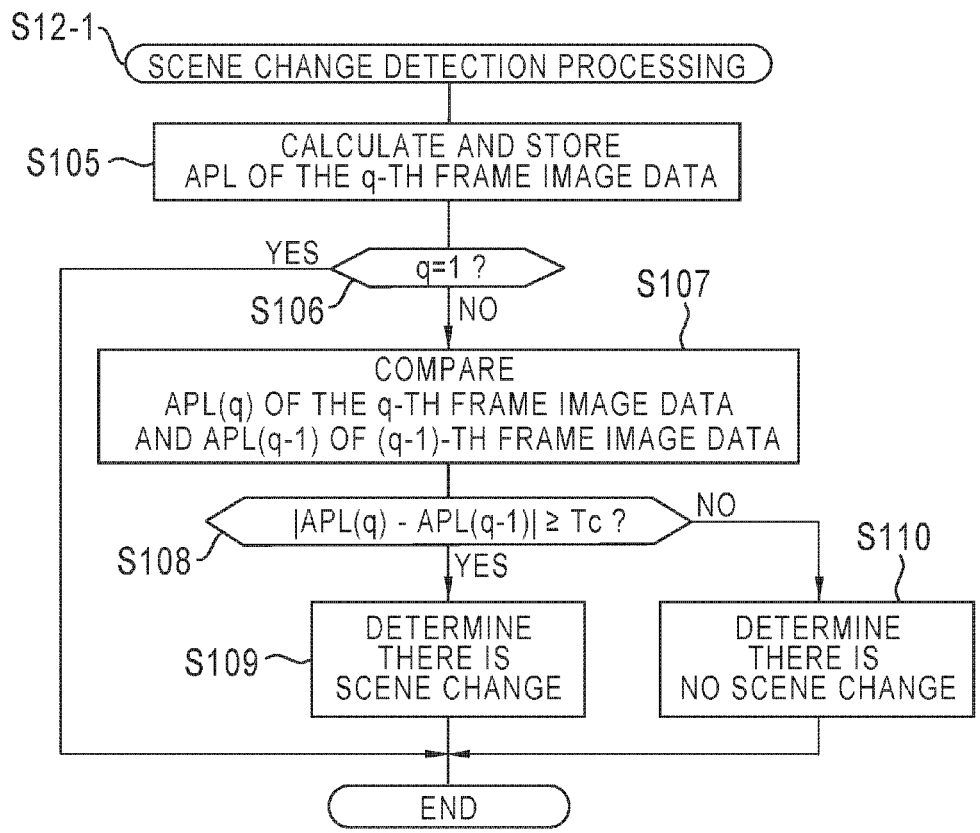
FIG. 36 is a flow chart showing a flow of scene change detection processing.

As shown in FIG. 36, the scene change detector 76 sequentially calculates an APL of the frame image data set 63a sequentially output from the extension unit 39 to store the APL (step S105). Then, when calculating and storing an APL(q) of the q-th (here, q≥2) frame image data set 63a, the scene change detector 76 compares the APL(q) and an APL(q−1) of the (q−1)-th frame image data sets 63a previously stored (step S106 and step S107).

Subsequently, in a case where an absolute value of a difference between the APL(q) and the APL(q−1) is not less than a preset scene change threshold value Tc (YES in step S108), the scene change detector 76 determines that a scene change has occurred between the (q−1)-th frame image data 63a and the q-th frame image data 63a. Conversely, in a case where the absolute value of the difference is less than the scene change threshold value Tc (NO in step S108), the scene change detector 76 determines that no scene change has occurred between the (q−1)-th frame image data 63a and the q-th frame image data 63a (step S110). Accordingly, it is possible to detect whether a scene change has occurred between two continuous frame image data sets 63a or not.

In a case where a scene change is detected in the (n+2)-th frame image data 63a, for example, the scene change detector 76 outputs the detection result to the backlight luminance setting unit 122 (the APL calculation unit 123, and the luminance control unit 124) (YES in step S12-2).

(Luminance Set Value Correction Processing)

Figure 37:
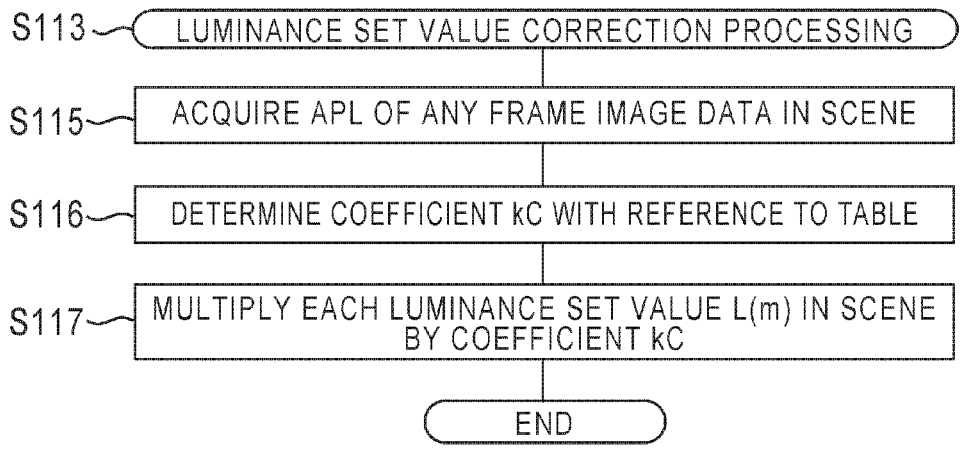
FIG. 37 is a flow chart showing a flow of correction processing of a luminance set value in FIG. 35.

As shown in FIG. 37, the APL calculation unit 123 and the luminance control unit 124 determine that the first frame image data set 63a to the (n+1)-th frame image data 63a in the first frame group FG belong to the same scene on the basis of a detection result of the scene change detector 76 to start correction of the luminance set value L(m) in units of a scene (step S113).

First, the APL calculation unit 123 calculates an APL from an average value of all pixel values D(i) of gradation correction image data D(m) corresponding to any frame image data set 63a in the same scene, such as the leading frame image data set 63a (step S115). Then, the APL calculation unit 123 outputs a calculation result of an APL of the scene to the luminance control unit 124.

The luminance control unit 124, on the basis of the APL received from the APL calculation unit 123, determines a coefficient kC corresponding to the APL of the scene with reference to the table 113 stored in the internal storage unit 28a (step S116). Subsequently, the luminance control unit 124 multiplies each of the luminance set values L(m) of the same scene (from the first frame image data set 63a to the (n+1)-th frame image data 63a) received from the luminance set value calculation unit 49 by the coefficient kC (step S107). Then, the luminance control unit 124 outputs each of the luminance set values L(m) to which the coefficient multiplication processing has been applied to the backlight control unit 46. Each of the luminance set values L(m) is also temporarily stored in the backlight control unit 46.

Returning to FIG. 35, calculation of each of the luminance set values L(m) of other frame image data sets 63a of the first frame group FG, and the gradation correction processing of the image data D(m), are performed (step S2-5, step S3 to step S5, step S7 to step S9, step S12-1, step 12-2, and step S40). In this case, if the scene change detector 76 detects a scene change (YES in step S12-2), the processing of step S115 to step S117 shown in FIG. 37 is performed again. In order to prevent description from being complicated, there is provided a description with the assumption that no scene change is detected between each of the other frame image data sets 63a (NO in step S12-2).

Subsequently, the APL calculation unit 123 and the luminance control unit 124 start operating. The APL calculation unit 123 and the luminance control unit 124 determine that all of the other frame image data sets 63a in the first frame group FG belong to the same scene to start correction of the luminance set value L(m) in units of a scene (step S119). Accordingly, the processing of step S115 to S117 shown in FIG. 37 described before is performed again.

Specifically, calculation of an APL of the gradation correction image data D(m) corresponding to any frame image data set 63a in the same scene, determination of a coefficient kC, and processing of multiplying each of the luminance set values L(m) of the same scene by the coefficient kC, are performed. Then, each of the luminance set values L(m) to which the coefficient multiplication processing has been applied is output to the backlight control unit 46 from the luminance control unit 124.

Hereinafter, as with the fourth embodiment (refer to FIG. 21), a frame image based on each of the frame image data sets 63a of the first frame group FG is sequentially displayed in a display area of the LCD panel 18 (step S54). Then, display control processing identical with the display control processing on the first frame group FG described above is applied to also other frame groups FG (YES in step S78, and step S79). Accordingly, a moving image based on the moving image data 63 is displayed. When selection operation of new image data 63 is performed in the operation unit 15 or the like (step S80), the processing of each step described before is repeatedly performed so that a moving image based on the new moving image data 63 is displayed.

In the ninth embodiment (scene change detection ON), at the same timing as that of the fourth embodiment shown in FIG. 23 described before, the calculation SA of the luminance set value L(S), the gradation correction SB, and the correction SC of the luminance set value L(m) (here, calculation of an APL, and determination and multiplication of a coefficient kC) are performed. Then, after the correction SC, a frame image of the previous frame group FG is displayed. Here, the calculation of an APL and the determination of a coefficient kC in the correction SC may start after the gradation correction SB of the frame image data set 63a to be a calculation object of the APL.

(Operation and Effect (Scene Change Detection ON) of Ninth Embodiment)

As above, in the tablet terminal 120 of the ninth embodiment, since each of the luminance set values L(m) is corrected by a scene as with the tablet terminal 75 of the fourth embodiment, it is possible to apply optimum correction to each of the luminance set values L(m) even if a scene change occurs in the frame group FG, as with the fourth embodiment.

Tenth Embodiment

Figure 38:
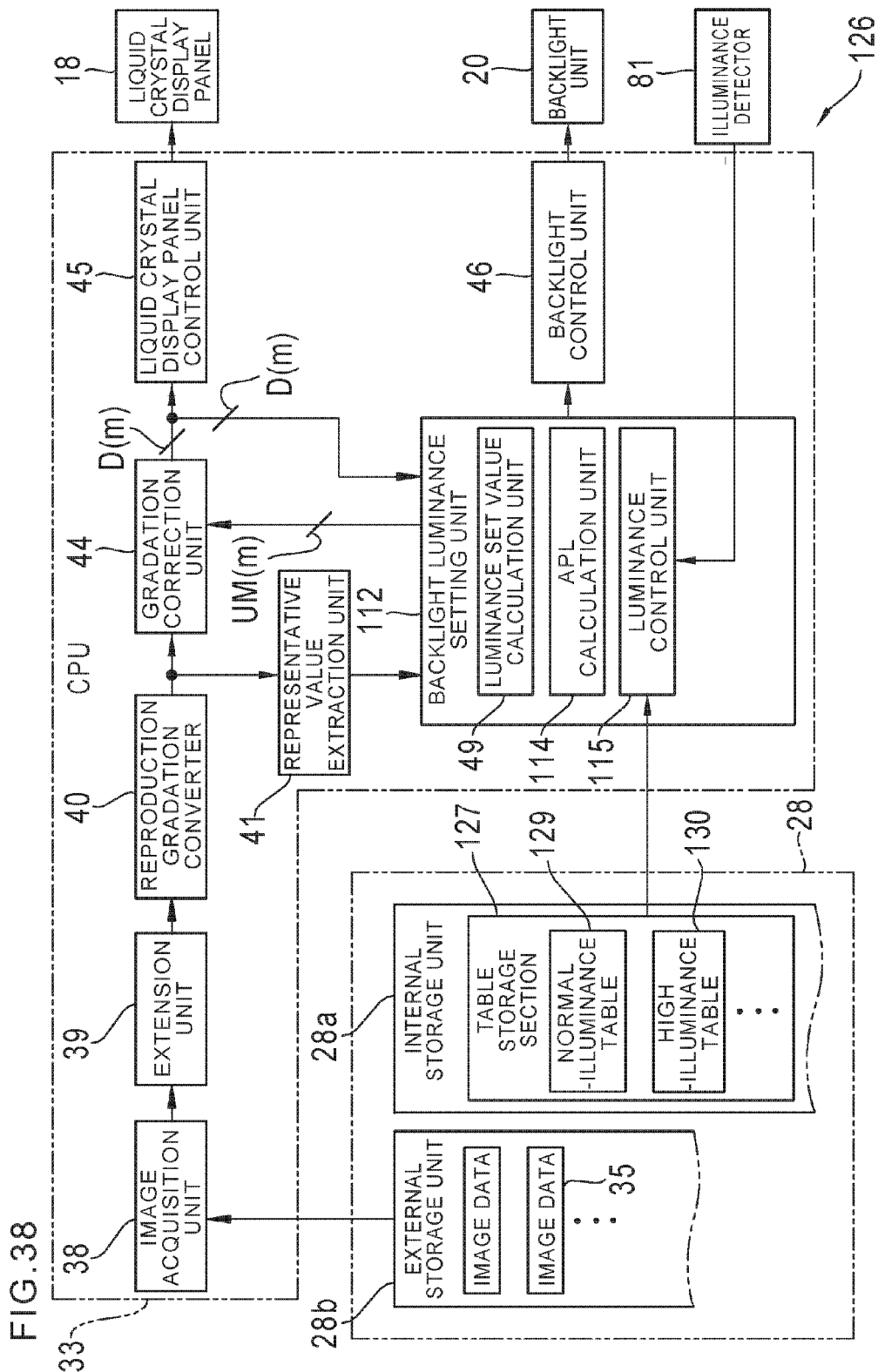
FIG. 38 is a functional block diagram of a CPU of a tablet terminal of a tenth embodiment.

Next, with reference to FIG. 38, a tablet terminal 126 of the tenth embodiment of the present invention will be described. Although the luminance set value correction processing is performed by using the common table 113 regardless of illuminance of the periphery of the liquid crystal display unit 12 in the eighth and ninth embodiments described above, as described in the fifth embodiment above, it depends on the illuminance of the periphery of the liquid crystal display unit 12 whether a user feels a display image to be glaring. Thus, in the tablet terminal 126, a kind of table to be used for the luminance set value correction processing is changed in accordance with the illuminance of the periphery of the liquid crystal display unit 12.

The tablet terminal 126 has the essentially same configuration as that of the tablet terminal 110 of the eighth embodiment described above except that the tablet terminal 126 includes the illuminance detector 81 of the fifth embodiment described above and the internal storage unit 28a is provided with a table storage section 127. Thus, a component having the same function and configuration as those of the fifth and eighth embodiments described above is designated by the same reference numeral as that of the fifth and eighth embodiments so that description of the component is appropriately omitted.

The table storage section 127 stores a normal-illuminance table 129 and a high-illuminance table 130, for example. The normal-illuminance table 129 is identical with the table 113 of the eighth embodiment described above.

Figure 39:
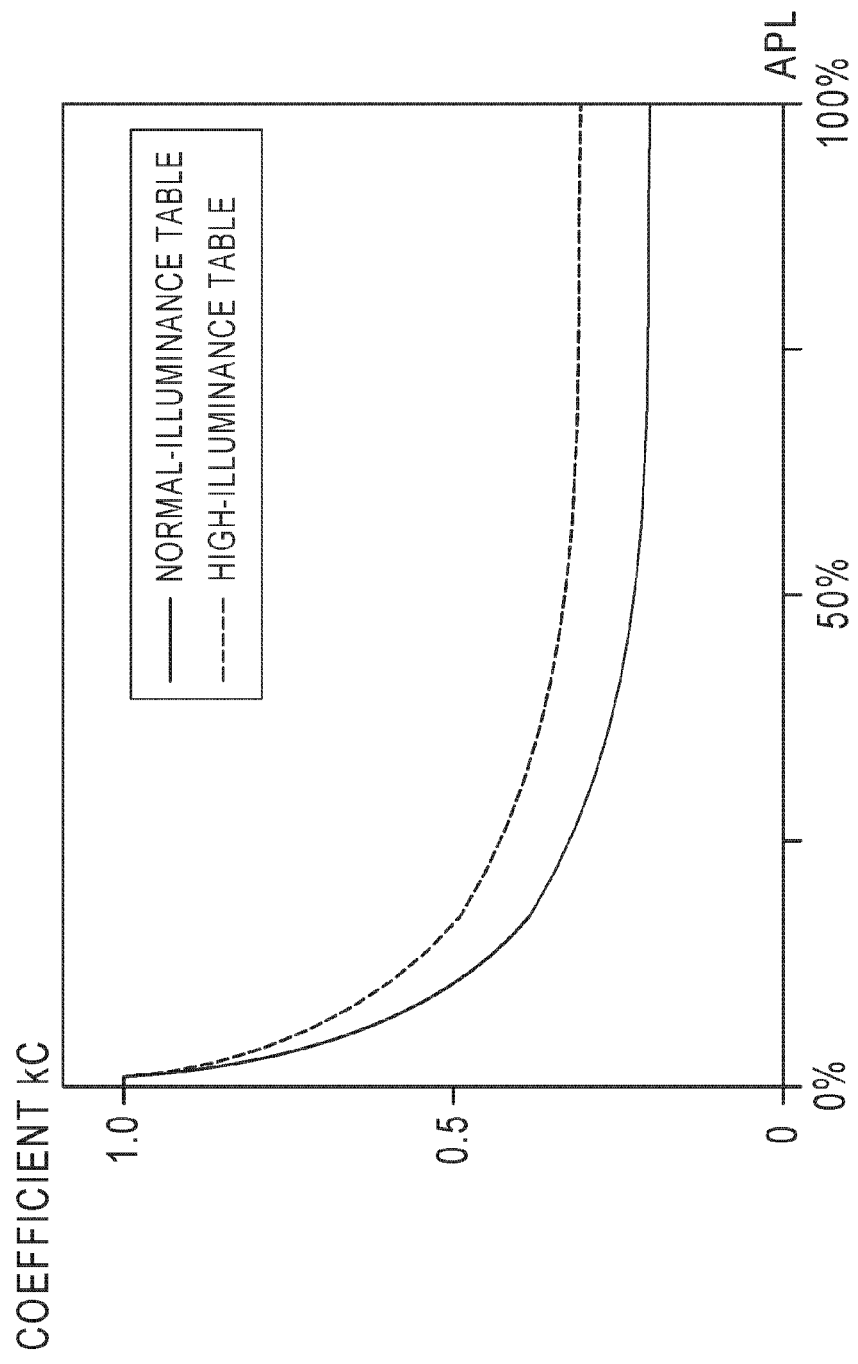
FIG. 39 is an illustration for describing tables for normal and high illuminance.

As shown in FIG. 39, a coefficient kC for every APL is set higher in the high-illuminance table 130 than in the normal-illuminance table 129. Thus, in a case where the luminance set value correction processing is performed by using the high-illuminance table 130, each of the luminance set values L(m) is high as compared with a case where the luminance set value correction processing is performed by using the normal-illuminance table 129.

Returning to FIG. 38, the luminance control unit 115 of the tenth embodiment selects a kind of table to be used for the luminance set value correction processing from among tables in the table storage section 127 in accordance with a detection result of the illuminance detector 81. In a case where a detection result of the illuminance detector 81 is equal to or less than a predetermined illuminance threshold value, for example, the luminance control unit 115 selects the normal-illuminance table 129 from among the tables in the table storage section 127 to perform the luminance set value correction processing on the basis of the normal-illuminance table 129 and a calculation result of the APL calculation unit 114. Conversely, in a case where the detection result of the illuminance detector 81 is more than the illuminance threshold value, the luminance control unit 115 selects the high-illuminance table 130 from among the tables in the table storage section 127 to perform the luminance set value correction processing on the basis of the high-illuminance table 130 and the calculation result of the APL calculation unit 114.

As above, in the tablet terminal 126 of the tenth embodiment, a kind of table to be used in the luminance set value correction processing is changed in accordance with illuminance of the periphery of the liquid crystal display unit 12, so that it is possible to make backlight luminance higher than normal if the illuminance of the periphery is high. Accordingly, as with the fifth embodiment described above, it is possible to display a clear image suitable for viewing without making a viewer feel the image to be glaring in the liquid crystal display unit 12 regardless of intensity of the illuminance of the periphery.

The table storage section 127 may stores three or more kinds of illuminance table each of which has a different coefficient kC in accordance with intensity of the illuminance of the periphery. In this case, the luminance control unit 115 selects one table from among the three of more kinds of illuminance table on the basis of a detection result of the illuminance detector 81 to perform the luminance setting correction processing.

In addition, in the tenth embodiment described above, although there has been described a case where the luminance set value correction processing is performed for displaying a still image, the present invention is also applicable to a case where the luminance set value correction processing is performed by a frame, a frame group, and a scene, when a moving image is displayed.

Eleventh Embodiment

Figure 40:
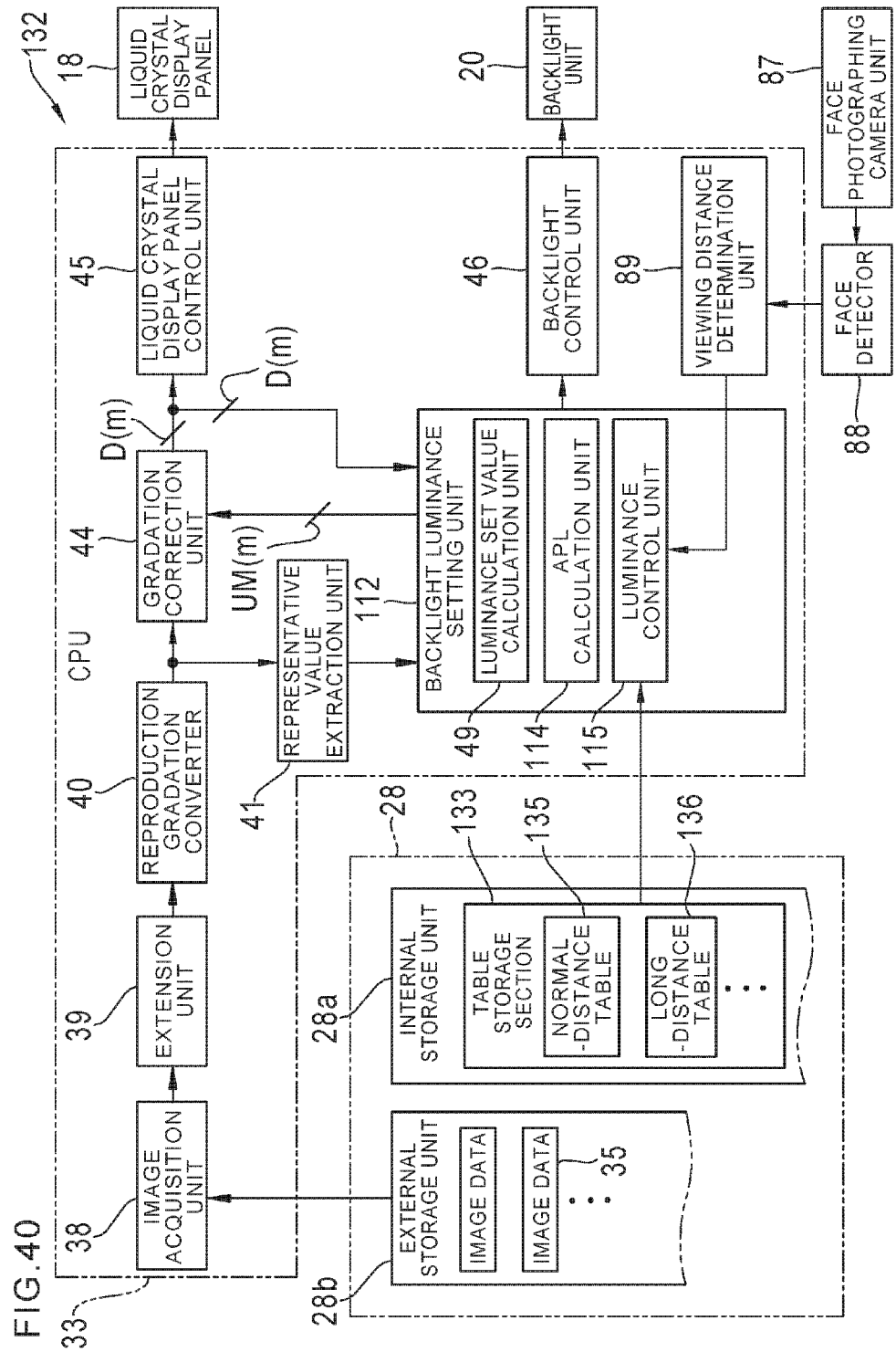
FIG. 40 is a functional block diagram of a CPU of a tablet terminal of an eleventh embodiment.

Next, with reference to FIG. 40, a tablet terminal 132 of the eleventh embodiment of the present invention will be described. In the tenth embodiment described above, a kind of table to be used for the luminance set value correction processing is changed in accordance with the illuminance of the periphery of the liquid crystal display unit 12, however, it also depends on the viewing distance VL (refer to FIG. 7) whether a user feels a display image to be glaring, as described in the sixth embodiment above. Thus, in the tablet terminal 132, a kind of table to be used for the luminance set value correction processing is changed in accordance with the viewing distance VL.

The tablet terminal 132 has the essentially same configuration as that of the tablet terminal 110 of the eighth embodiment described above except that the tablet terminal 132 includes the face photographing camera unit 87, the face detector 88, and the viewing distance determination unit 89, of the sixth embodiment described above, and that the internal storage unit 28a is provided with a table storage section 133. Thus, a component having the same function and configuration as those of the sixth and eighth embodiments described above is designated by the same reference numeral as that of the sixth and eighth embodiments so that description of the component is appropriately omitted.

The table storage section 133 stores a normal-distance table 135 and a long-distance table 136, for example. The normal-distance table 135 is identical with the table 113 of the eighth embodiment described above.

Figure 41:
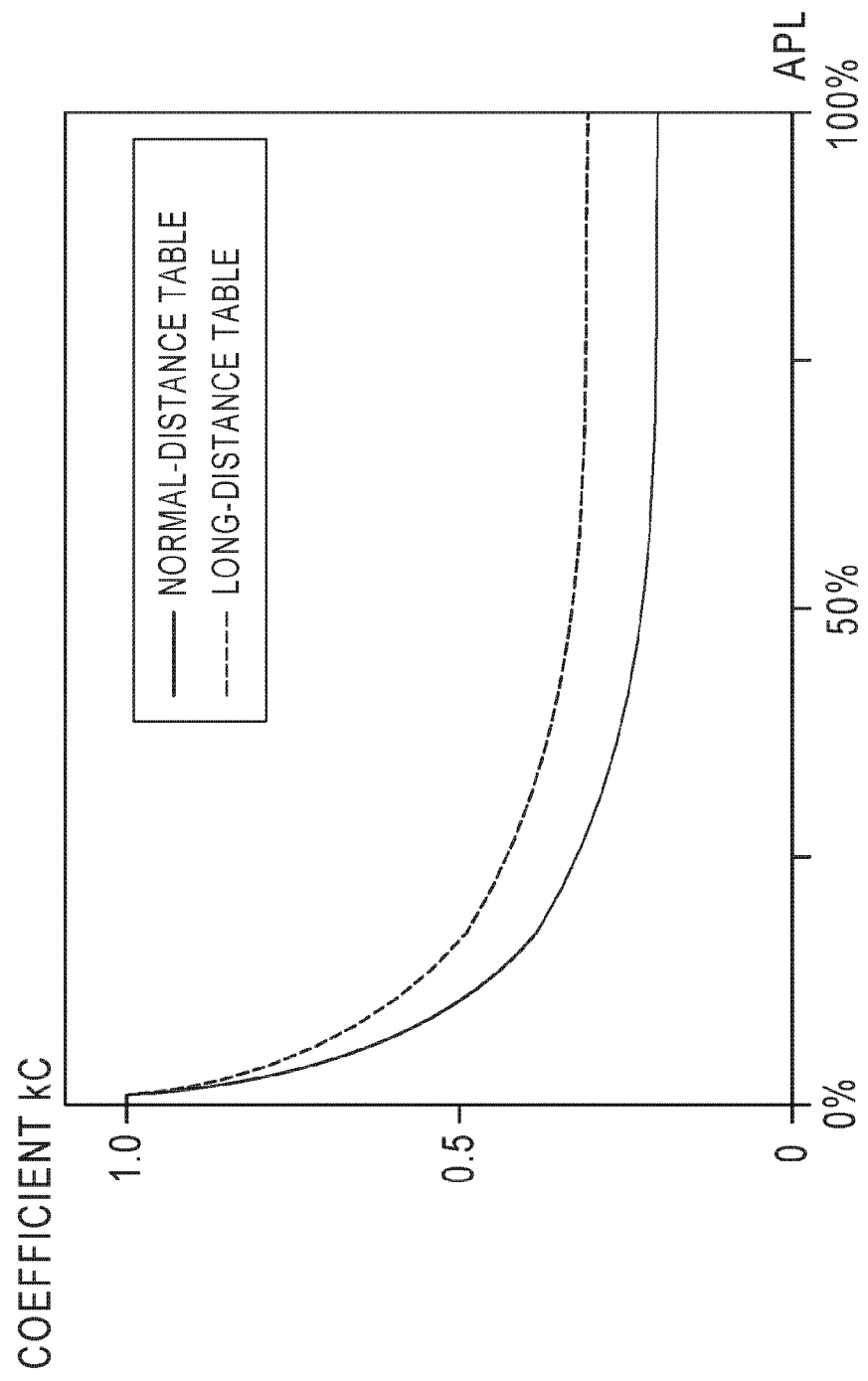
FIG. 41 is an illustration for describing tables for normal and long distances.

As shown in FIG. 41, a coefficient kC for every APL is set higher in the long-distance table 136 than in the normal-distance table 135. Thus, in a case where the luminance set value correction processing is performed by using the long-distance table 136, each value of the luminance set values L(m) is high as compared with a case where the luminance set value correction processing is performed by using the normal-distance table 135.

Returning to FIG. 40, the luminance control unit 115 of the eleventh embodiment selects a kind of table to be used for the luminance set value correction processing from among tables in the table storage section 133 in accordance with a detection result of the viewing distance determination unit 89. In a case where a detection result of the viewing distance determination unit 89 is equal to or less than a predetermined distance threshold value, for example, the luminance control unit 115 selects the normal-distance table 135 from among the tables in the table storage section 133 to perform the luminance set value correction processing on the basis of the normal-distance table 135 and a calculation result of the APL calculation unit 114. Conversely, in a case where the detection result of the viewing distance determination unit 89 is more than the distance threshold value, the luminance control unit 115 selects the long-distance table 136 from among the tables in the table storage section 133 to perform the luminance set value correction processing on the basis of the long-distance table 136 and the calculation result of the APL calculation unit 114.

As above, in the tablet terminal 126 of the eleventh embodiment, a kind of table to be used in the luminance set value correction processing is changed in accordance with a viewing distance VL, so that it is possible to make backlight luminance higher than normal if the viewing distance VL is long. Accordingly, as with the sixth embodiment described above, it is possible to display a clear image suitable for viewing without making a viewer feel the image to be glaring in the liquid crystal display unit 12 regardless of a viewing distance VL.

The table storage section 127 may stores three or more kinds of illuminance table each of which has a different coefficient kC in accordance with a viewing distance VL. In this case, the luminance control unit 115 selects one table from among the three of more kinds of illuminance table on the basis of a detection result of the viewing distance determination unit 89 to perform the luminance setting correction processing.

In addition, in the eleventh embodiment described above, although there has been described a case where the luminance set value correction processing is performed for displaying a still image, the present invention is also applicable to a case where the luminance set value correction processing is performed by a frame, a frame group, and a scene, when a moving image is displayed. Further, a method of determining a viewing distance VL also is not particularly limited, as with the sixth embodiment described above.

Twelfth Embodiment

Figure 42:
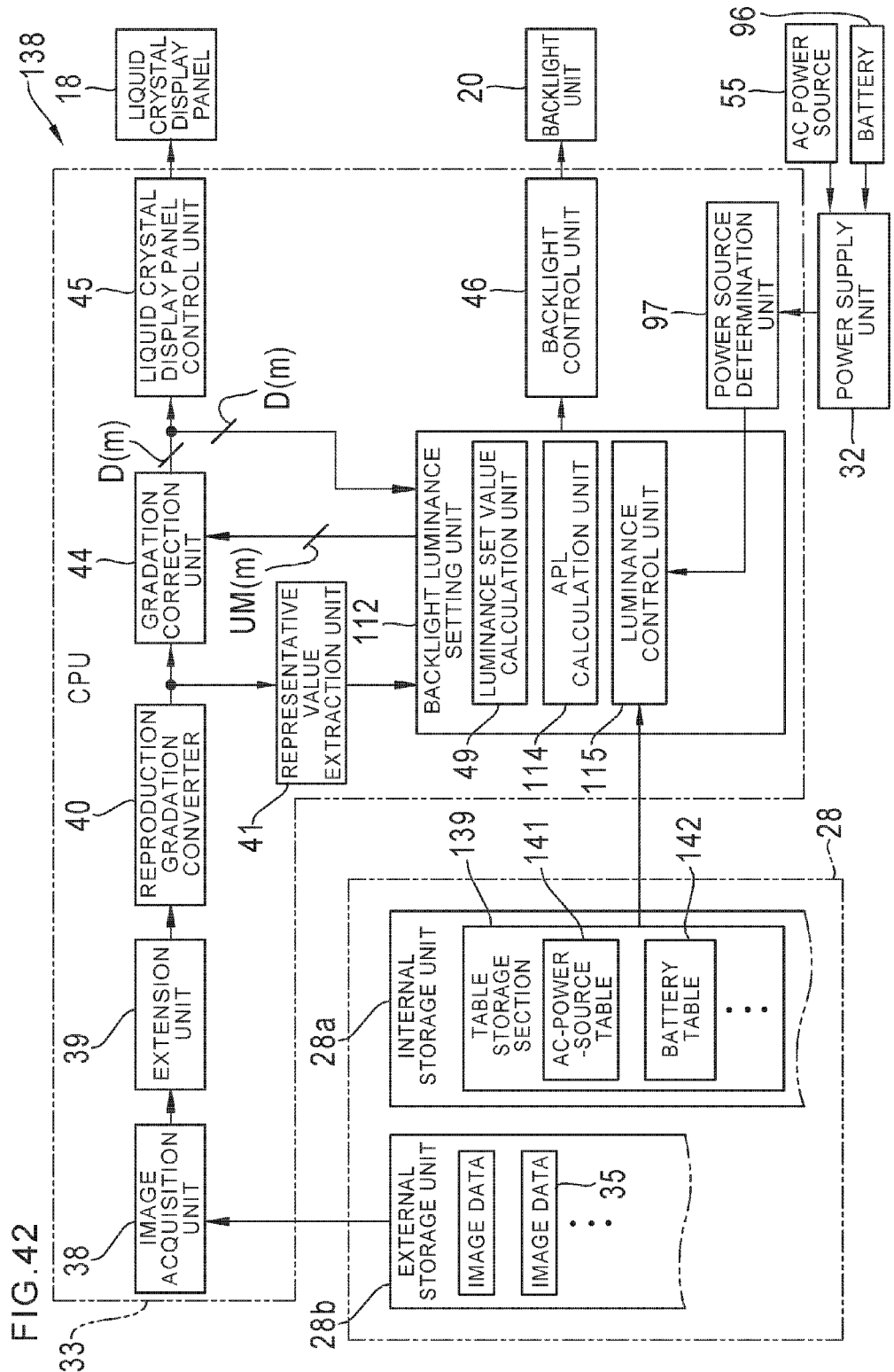
FIG. 42 is a functional block diagram of a CPU of a tablet terminal of a twelfth embodiment.

Next, with reference to FIG. 42, a tablet terminal 138 of the twelfth embodiment of the present invention will be described. In the tenth and eleventh embodiments described above, a kind of table to be used in the luminance set value correction processing is changed in accordance with illuminance and a viewing distance VL, however, in the tablet terminal 138, a kind of table to be used in the luminance set value correction processing is changed in accordance with a kind of power source, as with the seventh embodiment described above.

The tablet terminal 138 has the essentially same configuration as that of the tablet terminal 110 of the eighth embodiment described above except that the tablet terminal 138 includes the battery 96, the power source determination unit 97, and the like, of the seventh embodiment described above and the internal storage unit 28a is provided with a table storage section 139. Thus, a component having the same function and configuration as those of the seventh and eighth embodiments described above is designated by the same reference numeral as that of the seventh and eighth embodiments so that description of the component is appropriately omitted.

The table storage section 139 stores an AC-power-source table 141 and a battery table 142, for example. The AC-power-source table 141 is identical with the table 113 of the eighth embodiment described above.

Figure 43:
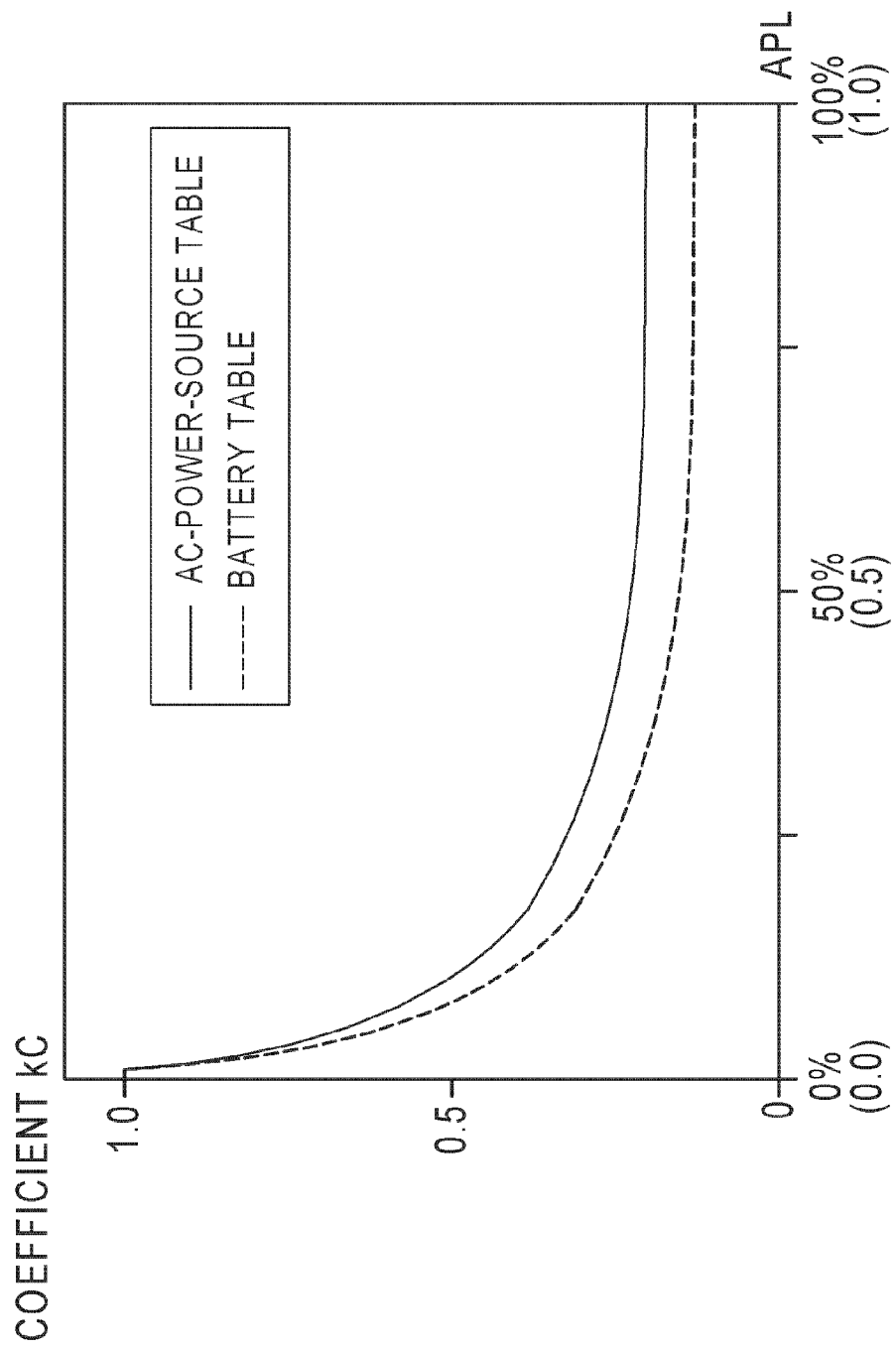
FIG. 43 is an illustration for describing tables for an AC power source and a battery.

As shown in FIG. 43, a coefficient kC for every APL is set lower in the battery table 142 than in the AC-power-source table 141. Thus, in a case where the luminance set value correction processing is performed by using the battery table 142, each of the luminance set values L(m) is low as compared with a case where the luminance set value correction processing is performed by using the AC-power-source table 141.

Returning to FIG. 42, the luminance control unit 115 of the twelfth embodiment selects a kind of table to be used for the luminance set value correction processing from among tables in the table storage section 139 in accordance with a determination result of the power source determination unit 97. In a case where the power supply unit 32 receives power from the AC power source 55, for example, the luminance control unit 115 selects the AC-power-source table 141 from among the tables in the table storage section 139 to perform the luminance set value correction processing on the basis of the AC-power-source table 141 and a calculation result of the APL calculation unit 114. Conversely, in a case where the power supply unit 32 receives power from the battery 96, the luminance control unit 115 selects the battery table 142 from among the tables in the table storage section 139 to perform the luminance set value correction processing on the basis of the battery table 142 and the calculation result of the APL calculation unit 114.

As above, in the tablet terminal 138 of the twelfth embodiment, each of the luminance set values L(m) in a case where power is supplied from the battery 96 is set lower than that in a case where the tablet terminal 138 is driven by using the AC power source. As a result, since backlight luminance can be reduced in a case where power is supplied from the battery 96, it is possible to reduce power consumption.

In addition, in the twelfth embodiment described above, although there has been described a case where the luminance set value correction processing is performed for displaying a still image, the present invention is also applicable to a case where the luminance set value correction processing is performed by a frame, a frame group, and a scene, when a moving image is displayed.

Thirteenth Embodiment

Figure 44:
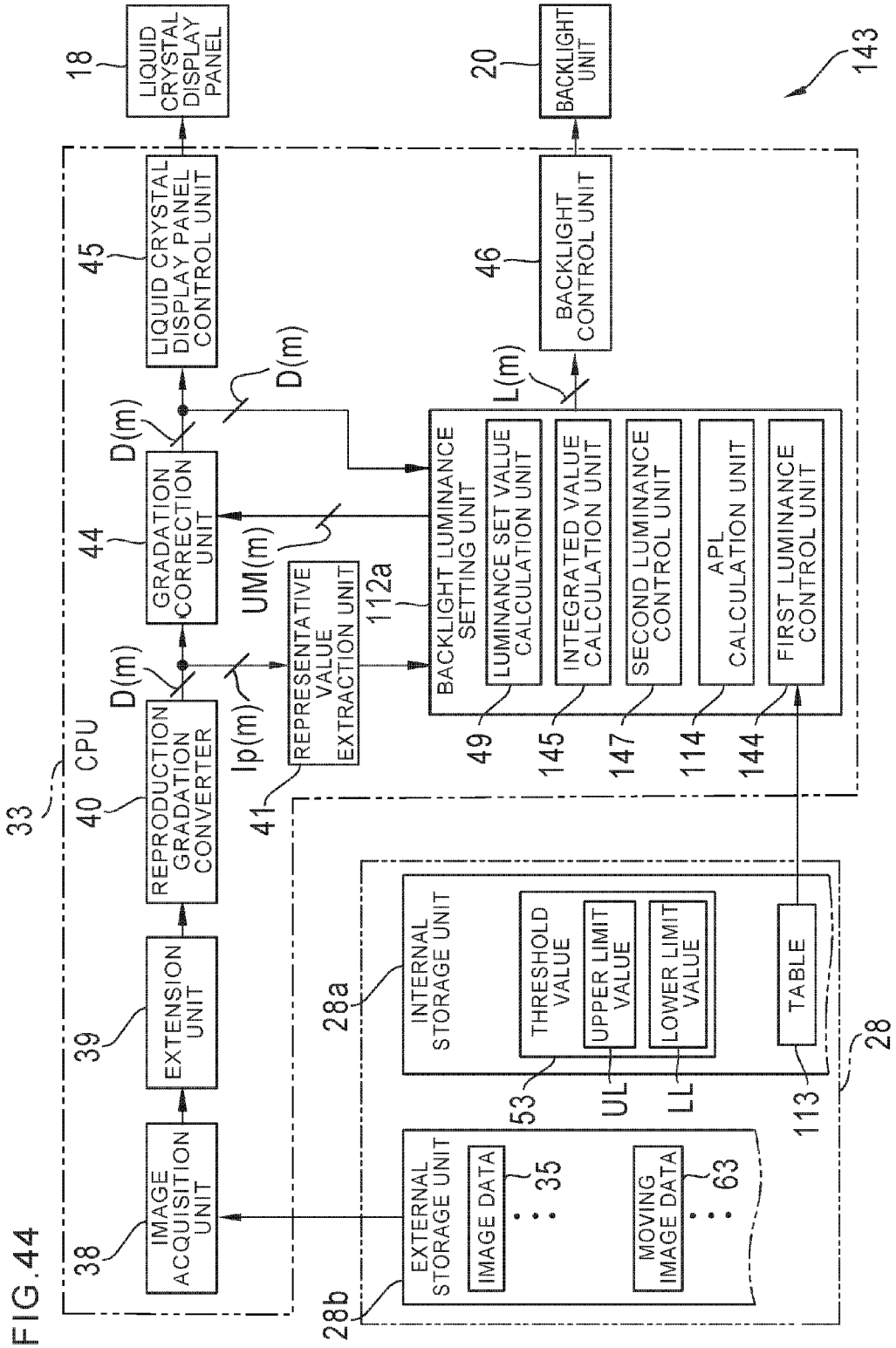
FIG. 44 is a functional block diagram of a CPU of a tablet terminal of a thirteenth embodiment.

Next, with reference to FIG. 44, a tablet terminal 143 of the thirteenth embodiment of the present invention will be described. In a case where correction of multiplying each of luminance set values L(m) by a coefficient kC determined on the basis of an APL of image data D(m) for one screen is performed as with the eighth and ninth embodiments described above, inclination of a maximum luminance with respect to an APL may be steep in an image at a low APL to increase variation of the maximum luminance for every image. The term, inclination of a maximum luminance, here, indicates an inclination on a low APL side (left side) of a characteristics curve, which is not shown, indicating a relationship between a maximum luminance suitable for viewing (a vertical axis) and an APL (a horizontal axis), and the characteristics curve has a steeper inclination as the APL decreases. Since the characteristics curve is created on the basis of data acquired by subjective evaluation or the like, there is a difference from actual conditions (for example, if actual characteristics has the same curve as the characteristics curve, the curve being displaced in a horizontal direction by a fixed amount, a difference of the maximum luminance increases as the APL decreases).

On the other hand, in a method like the first to seventh embodiments described above, in which an integrated value LS of a luminance set value L(m) of each of the segment areas 22(m) is acquired, and each of the luminance set values L(m) is multiplied by a coefficient (KU or KL) that is determined so that the integrated value LS is within a threshold value, variation of a maximum luminance for every image is reduced as compared with the methods of the eighth and ninth embodiments described above. However, in the methods of the first to seventh embodiments, it is required to repeatedly multiply each of the luminance set values L(m) by the coefficient (KU or KL) until the integrated value LS becomes within the threshold value, so that calculation in correction processing sometimes takes time. Thus, in the tablet terminal 143, while variation of a maximum luminance for every image is reduced, calculation time in the correction processing is shortened.

The tablet terminal 143 performs both of the luminance set value correction processing of the tablet terminal 10 of the first embodiment, and the luminance set value correction processing of the tablet terminal 110 of the eighth embodiment. The tablet terminal 143 has the essentially same configuration as that of the tablet terminals 10 and 110 of the first and eighth embodiments described above, respectively, except that the CPU 33 serves as a backlight luminance setting unit 112a and the internal storage unit 28a stores the threshold value 53 and the table 113. Thus, a component having the same function and configuration as those of the first and eighth embodiments described above is designated by the same reference numeral as that of the first and eighth embodiments so that description of the component is appropriately omitted.

The backlight luminance setting unit 112a includes a first luminance control unit 144, an integrated value calculation unit 145, and a second luminance control unit 147, along with the luminance set value calculation unit 49 and the APL calculation unit 114, described before.

The first luminance control unit 144 is essentially identical with the luminance control unit 115 of the eighth embodiment (refer to FIG. 29) described above. Differently from the eighth embodiment, the first luminance control unit 144 outputs each of the luminance set values L(m) to which the coefficient multiplication processing has been applied (hereinafter simply referred to as a corrected luminance set value L(m)) to the integrated value calculation unit 145.

The integrated value calculation unit 145 adds up each of the corrected luminance set values L(m) received from the first luminance control unit 144 to calculate an integrated value LSX (refer to FIG. 45), and outputs the integrated value LSX to the second luminance control unit 147.

The second luminance control unit 147 is essentially identical with the luminance control unit 51 of the first embodiment (refer to FIG. 4) described above. The second luminance control unit 147 determines whether the integrated value LSX is within the predetermined threshold value 53, and if it is determined in negative, each of the luminance set values L(m) is corrected by using the method shown in FIG. 9 described before (except that the integrated value LS in FIG. 9 is replaced with the integrated value LSX). The second luminance control unit 147 outputs each of the corrected luminance set values L(m) to the backlight control unit 46.

(Operation of Thirteenth Embodiment)

Figure 45:
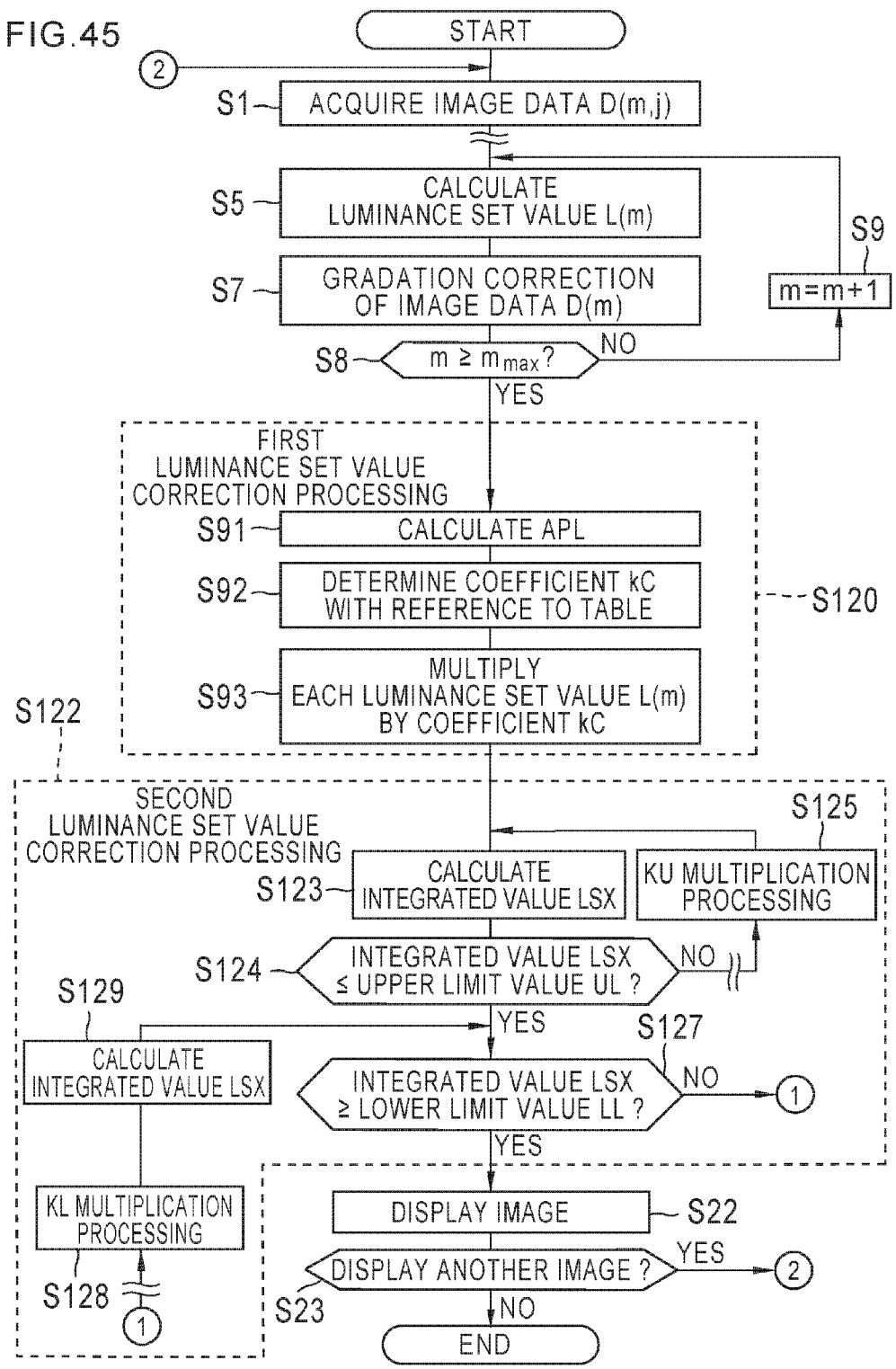
FIG. 45 is a flow chart showing a flow of display control processing of the thirteenth embodiment.

Next, with reference to the flow chart shown in FIG. 45, operation of the tablet terminal 143 having the configuration above, particularly display control processing on a still image, will be described. Since the processing of step S1 to step S9 is identical with the processing of the eighth embodiment (step S1 to step S5, and step S7 to step S9) shown in FIG. 31, hereinafter a description of the processing is omitted.

(First Luminance Set Value Correction Processing)

Subsequently, first luminance set value correction processing by the APL calculation unit 114 and the first luminance control unit 144 starts (step S120). Since the first luminance set value correction processing is essentially identical with the luminance set value correction processing of the eighth embodiment shown in FIG. 31 described before (step S90), hereinafter a specific description of the processing is omitted. Differently from the eighth embodiment, however, the first luminance control unit 144 multiplies each of the luminance set values L(m) by the coefficient kC, and then outputs each of the corrected luminance set value L(m) to the integrated value calculation unit 145.

(Second Luminance Set Value Correction Processing)

After the first luminance set value correction processing is ended, the integrated value calculation unit 145 and the second luminance control unit 147 starts second luminance set value correction processing (step S122).

First, the integrated value calculation unit 145 adds up each of the corrected luminance set values L(m) received from the first luminance control unit 144 to calculate an integrated value LSX, and outputs the integrated value LSX to the second luminance control unit 147 (step S123). Subsequently, if the integrated value LSX is larger than the upper limit value UL (NO in step S124), the second luminance control unit 147 performs the subtraction processing (not shown), the KU multiplication processing (S125), and the integrated value calculation processing (S123), as with step S14 to step S17 shown in FIG. 9 described before. Then, the second luminance control unit 147 repeatedly performs each processing (the subtraction processing, the KU multiplication processing, and the integrated value calculation processing) until the integrated value LSX becomes equal to or less than the upper limit value UL (YES in step S124).

Conversely, if the integrated value LSX is smaller than the lower limit value LL (NO in step S127), the second luminance control unit 147 performs the addition processing (not shown), the KL multiplication processing (5128), and the integrated value calculation processing (S129), as with step S18 to step S21 shown in FIG. 9 described before. Then, the second luminance control unit 147 repeatedly performs each processing (the subtraction processing, the KL multiplication processing, and the integrated value calculation processing) until the integrated value LSX becomes equal to or more than the lower limit value LL (YES in step S127). If it is determined as YES in step S127, the second luminance control unit 147 outputs each of the corrected luminance set values L(m) to the backlight control unit 46.

Up to this point, the second luminance set value correction processing is ended. In this case, in the present embodiment, since the first luminance set value correction processing is performed in advance, it is possible to reduce an amount of deviation of each of the luminance set values L(m) from the threshold value 53 (the upper limit value UL, and the lower limit value LL) as compared with the amount of deviation thereof in a state before the first luminance set value correction processing. As a result, in the second luminance set value correction processing, the number of cycles, in a case where the KU multiplication processing, the KL multiplication processing, and the like are repeatedly performed, can be reduced, so that it is possible to shorten calculation time required for the correction processing.

Hereinafter, as with the first embodiment, an image based on the image data 35 is displayed in the display area of the LCD panel 18 (step S22). Then, if selection operation (such as display switching operation) of new image data 35 is performed in the operation panel 19 or the like (YES in step S23), the processing of each step described before is repeatedly performed. In addition, when operation of slide show display is performed in the operation unit 15 or the like, the processing of each step described before is repeatedly performed at a fixed time interval.

(Operation and Effect of Thirteenth Embodiment)

As above, in the thirteenth embodiment of the present invention, since the first luminance set value correction processing is performed in advance before the second luminance set value correction processing in which variation of a maximum luminance for every image is reduced, it is possible to reduce calculation time in the second luminance set value correction processing. As a result, while variation of a maximum luminance is reduced, calculation time of the correction processing is shortened.

In addition, in the thirteenth embodiment described above, although there has been described a case where the luminance set value correction processing is performed for displaying a still image, even when a moving image is displayed, it is possible to perform each of the first and second luminance set value correction processing steps by a frame, a frame group, and a scene, by appropriately combining each of the embodiments described above.

(Others)

Although the threshold value or the table is previously stored in the internal storage unit 28a in each of the embodiments described above, the threshold value or the table may be acquired from the outside through the Internet or the like to be temporarily stored in the external storage unit 28b, a RAM, or the like, for example. In this case, the external storage unit 28b, the RAM, or the like, serves as the threshold value storage unit or the correspondence storage unit of the present invention.

In each of the embodiments described above, although the LED 24 is used as a light source of each of the illumination units 23(m), various light sources other than the LED are available.

In each of the embodiments described above, as shown in FIG. 6, the gradation correction unit 44 applies the gradation correction processing (gain-up) to image data D(m) on the basis of a UM(m) for each of the segment areas 22(m). In this case, since the LED 24 (refer to FIG. 2) is arranged at a central portion of the illumination unit 23(m), backlight luminance distribution in the segment area 22(m) (illumination unit 23(m)) is not a flatness distribution as shown in FIG. 6, but a mountain-shaped distribution (normally, the Gaussian distribution). In addition, there is also leaked light from adjacent segment areas 22(m). Thus, actual backlight luminance distribution in the segment area 22(m) may be estimated from the luminance set value L(m) set on the basis of the UM(m) and characteristics of a light source such as the LED 24 so that the gradation correction processing is applied to image data D(m) on the basis of the estimation result.

In each of the embodiments described above, whenever the KU multiplication processing is repeatedly performed, the coefficient KU is reduced stepwise, but the coefficient KU (KU<1) may be a fixed value. In addition, whenever the KL multiplication processing is repeatedly performed, the coefficient KL is increased stepwise, but the coefficient KL (KL>1) may be a fixed value.

In the first to seventh, and the thirteenth embodiments, described above, each of the upper and lower limit values UL and LL corresponding to the first threshold value of the present invention; the upper and lower limit values ULa and LLa (UL and LL×the number of frames in a frame group) corresponding to the second threshold value thereof; and the upper and lower limit values ULb and LLb (UL and LL×the number of frames in a scene) corresponding to the third threshold value thereof, that is, a magnitude of the threshold per image is set at the same value (UL and LL), but each of them may be different. For example, as the number of images of a frame image to be a calculation object of the integrated value increases, a magnitude of the threshold value per image described above may be appropriately increased or reduced.

In the eighth to thirteenth embodiments described above, the luminance set value correction processing is performed by using a table showing correspondence between an APL suitable for viewing and the coefficient kC, but the luminance set value correction processing may be performed by using various correspondences such as a calculation expression showing the correspondence between an APL suitable for viewing and the coefficient kC, for example.

In each of the embodiments described above, although there has been described the tablet terminal as a liquid crystal display device of the present invention for example, the present invention is also applicable to various portable terminals such as a smartphone, a cellular phone, and a PDA, a TV, a photo frame, various liquid crystal display devices such as a monitor and a display, and the like. In a case where the present invention is applied to a smartphone, the smartphone has a basic configuration that is essentially identical with the configuration of each of the smartphones described above except that the voice input/output unit 27 shown in FIG. 3 serves as a call unit having a calling function. In addition, in a case where the present invention is applied to a smartphone, it is also possible to use a foldable structure, and a configuration having a slide mechanism, as a body of the smartphone.

What is claimed is:

1. A liquid crystal display device comprising:
   a liquid crystal display unit that includes a liquid crystal display panel, and a backlight unit capable of individually controlling luminance of each of a plurality of segment areas into which a display area of the liquid crystal display panel is divided;
   an image data acquisition unit that acquires image data;
   a luminance set value calculation unit that calculates a luminance set value of each of the segment areas on the basis of luminance information in the image data corresponding to each of the segment areas;
   a luminance control unit that controls luminance of each of the segment areas by multiplying the luminance set value of each of the segment areas by a coefficient determined on the basis of a statistic of a video signal level of the image data;
   an integrated value calculation unit that calculates a first integrated value as the statistic by adding up the luminance set value of each of the segment areas for one screen in the image data on the basis of a calculation result of the luminance set value calculation unit; and
   a threshold value storage unit that stores a preset range of the first integrated value suitable for viewing as a first threshold value,
   wherein the luminance control unit determines a coefficient KU, where KU<1, as the coefficient and repeatedly multiplies each of the luminance set values by the coefficient KU until the first integrated value is within the range of the first threshold value in a case where the first integrated value is larger than the range of the first threshold value, and the luminance control unit determines a coefficient KL, where KL>1, as the coefficient and repeatedly multiplies each of the luminance set values by the coefficient KL until the first integrated value is within the range of the first threshold value in a case where the first integrated value is smaller than the range of the first threshold value.

2. The liquid crystal display device according to claim 1, wherein in a case where the image data acquisition unit acquires moving image data,
   the luminance set value calculation unit calculates the luminance set value of each of the segment areas for each of frame image data sets constituting the moving image data,
   the integrated value calculation unit adds up the luminance set value for each of a plurality of frame groups into which the respective frame image data sets are divided to calculate a second integrated value for each of the frame groups, and
   the luminance control unit preforms first acquisition processing of acquiring a second threshold value showing a preset range of the second integrated value suitable for viewing, and in a case where the second integrated value calculated by the integrated value calculation unit is out of the range of the second threshold value, the luminance control unit preforms first correction processing of determining the coefficient for correcting the second integrated value so that the second integrated value is within the range of the second threshold value, and correcting the second integrated value by multiplying each of the luminance set values of the frame group corresponding to the second integrated value by the coefficient.

3. The liquid crystal display device according to claim 2, wherein the luminance control unit performs the first acquisition processing in such a manner that the luminance control unit acquires the second threshold value determined on the basis of the first threshold value and the number of the frame image data sets belonging to the frame group.

4. The liquid crystal display device according to claim 2, wherein the luminance control unit performs the first correction processing in such a manner that the luminance control unit determines a coefficient KU, where KU<1, as the coefficient and repeatedly multiplies each of the luminance set values by the coefficient KU until the second integrated value is within the range of the second threshold value in a case where the second integrated value is larger than the range of the second threshold value, and that the luminance control unit determines a coefficient KL, where KL>1, as the coefficient and repeatedly multiplies each of the luminance set values by the coefficient KL until the second integrated value is within the range of the second threshold value in a case where the second integrated value is smaller than the range of the second threshold value.

5. The liquid crystal display device according to claim 2, further comprising
a scene change detector that detects a scene change in the frame group,
wherein the integrated value calculation unit adds up the luminance set value of each of the segment areas for each of scenes in the frame group to calculate a third integrated value for each of the scenes in a case where the scene change detector detects the scene change, and
the luminance control unit performs second acquisition processing of acquiring a third threshold value for each of the scenes showing a preset range of the third integrated value suitable for viewing in a case where the scene change is detected, and the luminance control unit performs second correction processing of determining the coefficient for correcting the third integrated value so that the third integrated value is within the range of the third threshold value to correct the third integrated value by multiplying each of the luminance set values of the scene corresponding to the third integrated value by the coefficient in a case where the third integrated value calculated by the integrated value calculation unit is out of the range of the corresponding third threshold value.

6. The liquid crystal display device according to claim 5, wherein the luminance control unit performs the second acquisition processing in such a manner that the luminance control unit acquires the third threshold value determined on the basis of the first threshold value and the number of the frame image data sets belonging to each of the scenes.

7. The liquid crystal display device according to claim 5, wherein the luminance control unit performs the second correction processing in such a manner that the luminance control unit determines a coefficient KU, where KU<1, as the coefficient and repeatedly multiplies each of the luminance set values by the coefficient KU until the third integrated value is within the range of the third threshold value in a case where the third integrated value is larger than the range of the third threshold value, and that the luminance control unit determines a coefficient KL, where KL>1, as the coefficient and repeatedly multiplies each of the luminance set values by the coefficient KL until the third integrated value is within the range of the third threshold value in a case where the third integrated value is smaller than the range of the third threshold value.

8. The liquid crystal display device according to claim 1, further comprising:
an illuminance detector that detects illuminance of a periphery of the liquid crystal display device; and
a first threshold value change control unit that increases an upper limit value and a lower limit value of the first threshold value as the illuminance increases, and that reduces the upper limit value and the lower limit value as the illuminance decrease, on the basis of a detection result of the illuminance detector.

9. The liquid crystal display device according to claim 8, wherein the first threshold value change control unit fixes each of the upper limit value and the lower limit value to a constant value in a case where the illuminance detected by the illuminance detector is higher than a preset upper limit value of the illuminance.

10. The liquid crystal display device according to claim 1, further comprising:
a viewing distance determination unit that determines a viewing distance from the display area to a viewer; and
a second threshold value change control unit that increases the upper limit value and the lower limit value of the first threshold value as the viewing distance becomes longer, and that reduces the upper limit value and the lower limit value thereof as the viewing distance becomes shorter, on the basis of a determination result of the viewing distance determination unit.

11. The liquid crystal display device according to claim 10, wherein the second threshold value change control unit fixes each of the upper limit value and the lower limit value to a constant value in a case where the viewing distance determined by the viewing distance determination unit is greater than a predetermined upper limit value of the viewing distance.

12. The liquid crystal display device according to claim 1, further comprising:
a power supply unit that receives power from any one of an external power source and a battery;
a power source determination unit that determines whether or not the power supply unit receives the power from the battery; and
a third threshold value change control unit that reduces the upper limit value and the lower limit value of the first threshold value in a case where the power supply unit receives the power from the battery as compared with a case where the power supply unit receives the power from the external power source, on the basis of a determination result of the power source determination unit.

13. The liquid crystal display device according to claim 1, wherein the first threshold value defines a range of the first integrated value so that a peak of display luminance is not less than 500 cd/m$^2$ and not more than 1000 cd/m$^2$ in a case where an average luminance level of a display image displayed in the display area is 100%.

* * * * *